US010185426B2

(12) United States Patent
Kurasawa et al.

(10) Patent No.: US 10,185,426 B2
(45) Date of Patent: Jan. 22, 2019

(54) DISPLAY APPARATUS WITH TOUCH DETECTION FUNCTION AND ELECTRONIC APPARATUS

(71) Applicant: Japan Display Inc., Tokyo (JP)

(72) Inventors: Hayato Kurasawa, Tokyo (JP); Koji Ishizaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/631,710

(22) Filed: Jun. 23, 2017

(65) Prior Publication Data
US 2017/0285826 A1 Oct. 5, 2017

Related U.S. Application Data

(63) Continuation of application No. 14/525,781, filed on Oct. 28, 2014, now Pat. No. 9,721,536.

(30) Foreign Application Priority Data

Dec. 16, 2013 (JP) .................................. 2013-258834

(51) Int. Cl.
*G06F 3/041* (2006.01)
*G06F 3/044* (2006.01)
(Continued)

(52) U.S. Cl.
CPC ............ *G06F 3/0412* (2013.01); *G06F 3/044* (2013.01); *G06F 3/047* (2013.01); *G06F 3/0416* (2013.01);
(Continued)

(58) Field of Classification Search
CPC ................................ G06F 3/044; G06F 3/0412
See application file for complete search history.

(56) References Cited

U.S. PATENT DOCUMENTS 8,786,557 B2 7/2014 Noguchi et al.
9,052,766 B2 * 6/2015 Dunphy ................ G06F 3/0412
(Continued)

FOREIGN PATENT DOCUMENTS

CN 101681221 A 3/2010
CN 102541376 A 7/2012
(Continued)

OTHER PUBLICATIONS

Taiwanese Office Action dated Apr. 6, 2016 for corresponding Taiwanese Application No. 103137266.
(Continued)

*Primary Examiner* — Xuemei Zheng
(74) *Attorney, Agent, or Firm* — Michael Best & Friedrich LLP

(57) ABSTRACT

A display apparatus with a touch detection function includes: a substrate; a display area including a plurality of pixels; a touch detection electrode including a plurality of small electrode portions; a plurality of wiring portions electrically coupling the small electrode portions to a terminal portion formed; and a plurality of drive electrodes forming capacitance between the drive electrodes and the touch detection electrode. The small electrode portions each include one conductive thin wire in which one first thin wire segment and one second thin wire segment are coupled in a first direction, the first thin wire segment makes a first angle with respect to the first direction, the second thin wire segment makes a second angle with respect to the first direction, and the wiring portions each include the one first thin wire segment and the one second thin wire segment that are coupled in the first direction.

19 Claims, 39 Drawing Sheets

(51) Int. Cl.
*G09G 5/18* (2006.01)
*G06F 3/047* (2006.01)
*G09G 3/36* (2006.01)

(52) U.S. Cl.
CPC ............ *G09G 3/36* (2013.01); *G09G 5/18* (2013.01); *G09G 2300/0413* (2013.01); *G09G 2300/0452* (2013.01); *G09G 2320/0266* (2013.01)

(56) References Cited

U.S. PATENT DOCUMENTS

| | | |
|---|---|---|
| 2010/0182273 A1 | 7/2010 | Noguchi et al. |
| 2010/0214262 A1 | 8/2010 | Ishizaki et al. |
| 2010/0253646 A1 | 10/2010 | Hiratsuka |
| 2012/0044202 A1* | 2/2012 | Ishizaki ............ G02F 1/13338 345/174 |
| 2012/0081324 A1 | 4/2012 | Philipp |
| 2012/0113071 A1 | 5/2012 | Kawaguchi et al. |
| 2013/0278528 A1 | 10/2013 | Ishizaki et al. |
| 2014/0092036 A1 | 4/2014 | Lin et al. |
| 2014/0146013 A1 | 5/2014 | Noguchi et al. |
| 2014/0152921 A1* | 6/2014 | Yashiro ............ G06F 3/044 349/12 |
| 2014/0292718 A1 | 10/2014 | Noguchi et al. |
| 2015/0091842 A1* | 4/2015 | Shepelev ............ G06F 3/044 345/174 |
| 2016/0342255 A1 | 11/2016 | Noguchi et al. |

FOREIGN PATENT DOCUMENTS

| | | |
|---|---|---|
| CN | 103092417 A | 5/2013 |
| JP | 2009-244958 A | 10/2009 |
| JP | 20069-244958 A | 10/2009 |
| JP | 2010-182277 A | 8/2010 |
| JP | 2010-191504 A | 9/2010 |
| JP | 2010-197576 A | 9/2010 |
| JP | 2012-103797 A | 5/2012 |
| KR | 10-2010-0097018 A | 9/2010 |
| KR | 10-2010-0127164 A | 12/2010 |
| TW | 201415312 A | 4/2014 |

OTHER PUBLICATIONS

Korean Office Action dated May 31, 2016 for corresponding Korean Patent Application No. 10-2014-0178282.
Japanese Office Action dated Oct. 4, 2016, for corresponding Japanese Patent Application No. 2013-258834.
Korean Office Action dated Feb. 27, 2017, for corresponding Korean Patent Application No. 10-2014-0178282.
Chinese Office Action dated Apr. 19, 2017, for corresponding Chinese Patent Application No. 201410772663.5.

\* cited by examiner

| | DISPLAY PERIOD | TOUCH DETECTION PERIOD | DISPLAY PERIOD | TOUCH DETECTION PERIOD |
|---|---|---|---|---|
| DRIVE ELECTRODE COML | COMDC | Tx | COMDC | Tx |
| SECOND GROUP ELECTRODES | X DETECTION ELECTRODES | Rx | X DETECTION ELECTRODES | Rx |
| FIRST GROUP ELECTRODES | Y DETECTION ELECTRODES | Rx | Y DETECTION ELECTRODES | Rx |

→ TIME

- 543 DISPLAY UNIT
- 542 KEYBOARD
- 541 BODY

- 551 UPPER HOUSING
- 554 DISPLAY
- 552 LOWER HOUSING

LOWER HOUSING
552

553
CONNECTION UNIT

551
UPPER HOUSING

UPPER HOUSING
551

552
LOWER HOUSING

DISPLAY APPARATUS WITH TOUCH DETECTION FUNCTION AND ELECTRONIC APPARATUS

CROSS-REFERENCE TO RELATED APPLICATIONS

The present application is a Continuation of application Ser. No. 14/525,781, filed Oct. 28, 2014, which claims priority from Japanese Application No. 2013-258834, filed on Dec. 16, 2013, the contents of which are incorporated by reference herein in its entirety.

BACKGROUND

1. Technical Field

The present disclosure relates to a display device and an electronic apparatus that are capable of detecting an external proximate object, and particularly to a display device with a touch detection function and an electronic apparatus that are capable of detecting an external proximate object based on a change in electrostatic capacitance.

2. Description of the Related Art

In recent years, touch detection devices commonly called touch panels that can detect an external proximate object have attracted attention. The touch panel is mounted on or integrated with a display device, such as a liquid crystal display device, and is used in a display device with a touch detection function. The display device with the touch detection function displays various button images, for example, on the display device so as to allow information input by using the touch panel as a substitute for typical mechanical buttons. The display device with the touch detection function having the touch panel as described above does not need an input device, such as a keyboard, a mouse, and a keypad, and thus tends to be more widely used also in a computer, a portable information terminal, such as a mobile phone device, a tablet, and so on.

Several types of the touch detection device exist, such as an optical type, a resistance type, and an electrostatic capacitance type. Using the electrostatic capacitance type touch detection device in the portable information terminal, for example, can achieve apparatuses that have a relatively simple structure and consume low power. For example, Japanese Patent Application Laid-open Publication No. 2010-197576 discloses a touch panel in which a translucent electrode pattern is made invisible.

Japanese Patent Application Laid-open Publication No. 2010-182277 describes an input device in which any of wiring lines that electrically conduct electrode elements is formed in a gap interposed between a first and a second electrode element adjacent to each other.

The display device with the touch detection function is further required to have lower-resistance touch detection electrodes to achieve a smaller thickness, a larger screen size, or a higher definition. A translucent conductive oxide such as indium tin oxide (ITO) is used as a material of translucent electrodes for the touch detection electrodes. An electrically conductive material such as a metallic material is effectively used for reducing the resistance of the touch detection electrodes. However, using the electrically conductive material such as a metallic material can cause a moiré pattern to be seen due to interference between pixels of the display device and the electrically conductive material such as a metallic material.

With an increase in being mounted on various electronic apparatuses, the display apparatus with the touch detection function is required to achieve an increase in degree of freedom in input operation by employing such as what is called multiple touch input in which a plurality of places are touched simultaneously, input using a pen, or what is called hovering input in which a finger or a pen tip is located above a touch surface.

For the foregoing reasons, there is a need for a display apparatus with touch detection function that can reduce a chance of a moiré pattern being visually recognized, and an electronic apparatus including the display apparatus with touch detection function.

SUMMARY OF THE INVENTION

According to an aspect, a display apparatus with a touch detection function includes: a substrate; a display area that includes a plurality of pixels arranged in a plane parallel to a principal surface of the substrate; a touch detection electrode that includes a plurality of small electrode portions arranged in a plane parallel to the principal surface of the substrate; a plurality of wiring portions that electrically couple the small electrode portions to a terminal portion formed outside the display area; and a plurality of drive electrodes that form capacitance between the drive electrodes and the touch detection electrode, wherein the small electrode portions each include at least one conductive thin wire in which at least one first thin wire segment and at least one second thin wire segment are coupled in a first direction, the first thin wire segment making a first angle with respect to the first direction, the second thin wire segment making a second angle with respect to the first direction, and the wiring portions each include the at least one first thin wire segment and the at least one second thin wire segment that are coupled in the first direction.

According to another aspect, an electronic apparatus includes: a display apparatus with a touch detection function that includes: a substrate; a display area that includes a plurality of pixels arranged in a plane parallel to a principal surface of the substrate; a touch detection electrode that includes a plurality of small electrode portions arranged in a plane parallel to the principal surface of the substrate; a plurality of wiring portions that electrically couple the small electrode portions to a terminal portion formed outside the display area; and a plurality of drive electrodes that form capacitance between the drive electrodes and the touch detection electrode. The small electrode portions each include at least one conductive thin wire in which at least one first thin wire segment and at least one second thin wire segment are coupled in a first direction, the first thin wire segment making a first angle with respect to the first direction, the second thin wire segment making a second angle with respect to the first direction, and the wiring portions each include the at least one first thin wire segment and the at least one second thin wire segment that are coupled in the first direction.

DETAILED DESCRIPTION

The following describes embodiments of the disclosure with reference to the accompanying drawings. The disclosure is made by way of examples. All modifications and changes that may be readily achieved by persons skilled in the art within the spirit of the invention are included in the scope of the invention. To explain the drawings clearer, the widths, thicknesses, and shapes of respective components may be more schematically illustrated than the actual ones. Those are illustrated by way of examples and do not limit the interpretation of the invention. In the present specification and the respective drawings, the same elements already described in the previous drawings are labeled with the same symbols and the detailed description thereof may be omitted. The constituent elements described below can also be combined as appropriate. The description will be made in the following order.

1. Basic example
2. First embodiment
3. Second embodiment
4. Third embodiment
5. Application examples (electronic apparatuses)

Figure 1:
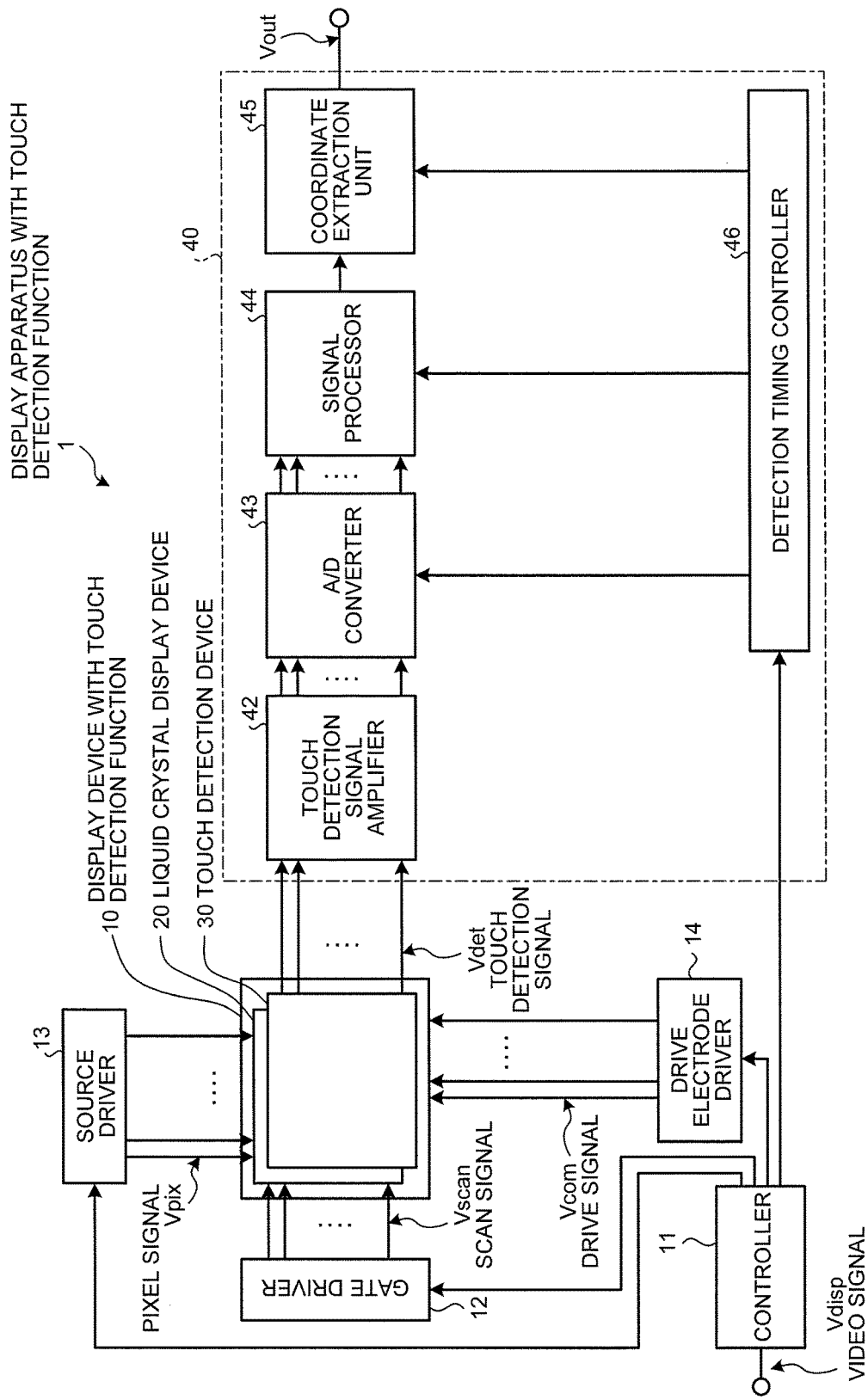
FIG. 1 is a block diagram illustrating a configuration example of a display apparatus with a touch detection function according to a basic example.

Examples in which a display apparatus with a touch detection function according to the above-mentioned embodiments is applied to electronic apparatuses 1. Basic Example Configuration Examples Overall Configuration Example FIG. 1 is a block diagram illustrating a configuration example of a display apparatus with a touch detection function according to a basic example of the present disclosure. The display apparatus 1 with a touch detection function includes a display device 10 with a touch detection function, a control unit 11, a gate driver 12, a source driver 13, a drive electrode driver 14, and a touch detection unit 40. The display apparatus 1 with the touch detection function is a display device in which the display device 10 with the touch detection function has a built-in touch detection function. The display device 10 with the touch detection function is a device obtained by integrating a liquid crystal display device 20 using liquid crystal display elements as display elements with an electrostatic capacitance type touch detection device 30. The display device 10 with the touch detection function may be a device obtained by mounting the electrostatic capacitance type touch detection device 30 on the liquid crystal display device 20 using the liquid crystal display elements as the display elements. The liquid crystal display device 20 may be, for example, an organic EL display device.

The liquid crystal display device 20 is a device that performs display by sequentially scanning one horizontal line at a time according to a scan signal Vscan fed from the gate driver 12, as will be described later. The control unit 11 is a circuit that feeds, based on an externally supplied video signal Vdisp, control signals to each of the gate driver 12, the source driver 13, the drive electrode driver 14, and the touch detection unit 40, and thus controls them so as to operate in synchronization with each other.

The gate driver 12 has a function to sequentially select, based on the control signal fed from the control unit 11, one horizontal line to be display-driven by the display device 10 with the touch detection function.

The source driver 13 is a circuit that feeds, based on the control signal fed from the control unit 11, pixel signals Vpix to respective sub-pixels SPix (to be described later) of the display device 10 with the touch detection function.

The drive electrode driver 14 is a circuit that feeds, based on the control signal fed from the control unit 11, a drive signal Vcom to drive electrodes COML (to be described later) of the display device 10 with the touch detection function.

The touch detection unit 40 is a circuit that detects, based on the control signal fed from the control unit 11 and touch detection signals Vdet fed from the touch detection device 30 of the display device 10 with the touch detection function, existence of a touch to (state, to be described later, of touch to or proximity of) the touch detection device 30, and if the touch exists, obtains, for example, coordinates of the touch in a touch detection region. The touch detection unit 40 includes a touch detection signal amplifier 42, an A/D converter 43, a signal processing unit 44, a coordinate extraction unit 45, and a detection timing control unit 46.

The touch detection signal amplifier 42 amplifies the touch detection signals Vdet fed from the touch detection device 30. The touch detection signal amplifier 42 may include a low-pass analog filter that removes high-frequency components (noise components) included in the touch detection signals Vdet to extract touch components, and outputs each of the touch components.

Basic Principle of Electrostatic Capacitance Type Touch Detection

Figure 2:
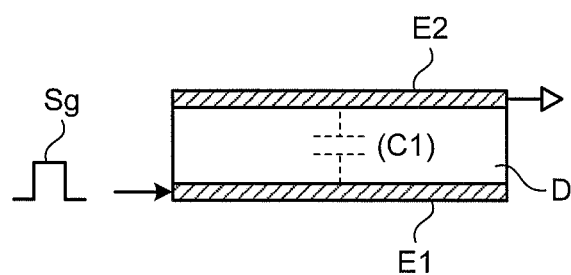
FIG. 2 is an explanatory diagram for explaining a basic principle of an electrostatic capacitance type touch detection system, the diagram illustrating a state in which a finger is neither in contact with nor in proximity of the device.
Figure 3:
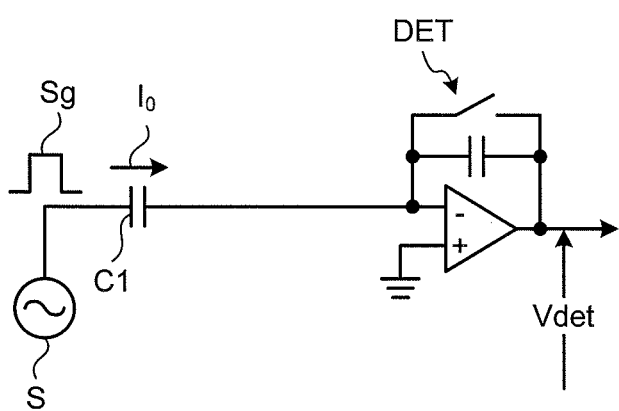
FIG. 3 is an explanatory diagram illustrating an example of an equivalent circuit in the state illustrated in FIG. 2 in which the finger is neither in contact with nor in proximity of the device.
Figure 4:
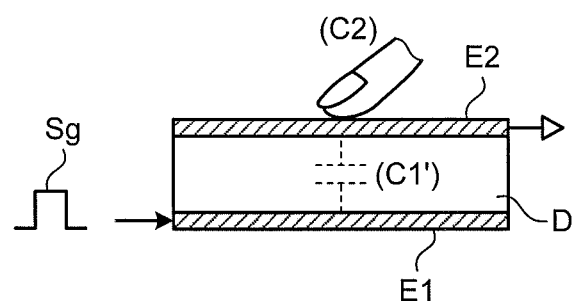
FIG. 4 is an explanatory diagram for explaining the basic principle of the electrostatic capacitance type touch detection system, the diagram illustrating a state in which the finger is in contact with or in proximity of the device.
Figure 5:
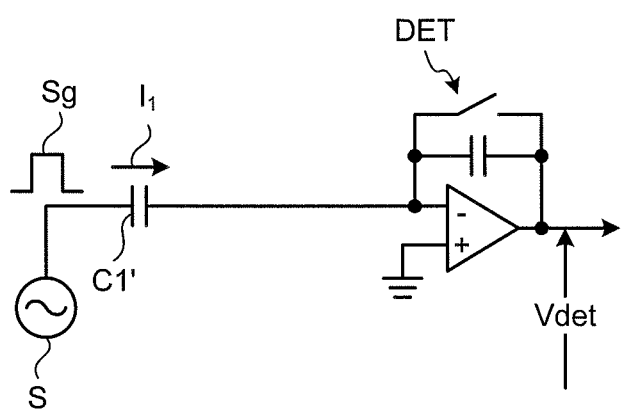
FIG. 5 is an explanatory diagram illustrating an example of the equivalent circuit in the state illustrated in FIG. 4 in which the finger is in contact with or in proximity of the device.
Figure 6:
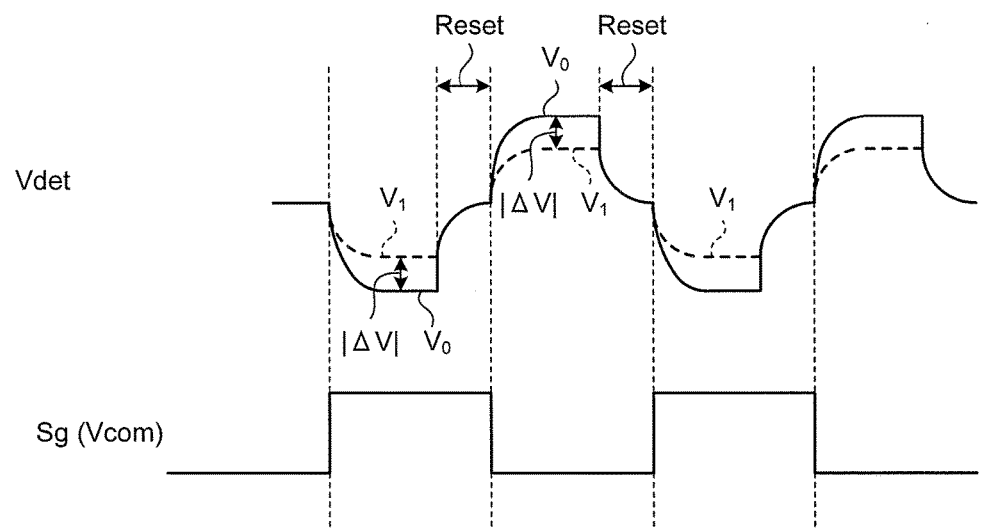
FIG. 6 is a diagram illustrating an example of waveforms of a drive signal and a touch detection signal.

The touch detection device 30 operates based on a basic principle of electrostatic capacitance type touch detection, and outputs the touch detection signals Vdet. A description will be made of the basic principle of the touch detection in the display apparatus 1 with the touch detection function of the present basic example with reference to FIGS. 1 to 6. FIG. 2 is an explanatory diagram for explaining the basic principle of the electrostatic capacitance type touch detection system, the diagram illustrating a state in which a finger is neither in contact with nor in proximity of the device. FIG. 3 is an explanatory diagram illustrating an example of an equivalent circuit in the state illustrated in FIG. 2 in which the finger is neither in contact with nor in proximity of the device. FIG. 4 is an explanatory diagram for explaining the basic principle of the electrostatic capacitance type touch detection system, the diagram illustrating a state in which the finger is in contact with or in proximity of the device. FIG. 5 is an explanatory diagram illustrating an example of the equivalent circuit in the state illustrated in FIG. 4 in which the finger is in contact with or in proximity of the device. FIG. 6 is a diagram illustrating an example of waveforms of the drive signal and the touch detection signal.

For example, as illustrated in FIGS. 2 and 4, capacitive elements C1 and C1' include each a pair of electrodes, that is, a drive electrode E1 and a touch detection electrode E2 that are arranged opposite to each other with a dielectric body D interposed therebetween. As illustrated in FIG. 3, the capacitive element C1 is coupled, at one end thereof, to an alternating signal source (drive signal source) S, and coupled, at the other end thereof, to a voltage detector (touch detection unit) DET. The voltage detector DET is, for example, an integration circuit included in the touch detection signal amplifier 42 illustrated in FIG. 1.

Applying an alternating-current rectangular wave Sg having a predetermined frequency (such as approximately several kilohertz to several hundred kilohertz) from the alternating signal source S to the drive electrode E1 (one end of the capacitive element C1) causes an output waveform (touch detection signal Vdet) to occur via the voltage detector DET coupled to the side of the touch detection electrode E2 (the other end of the capacitive element C1). The alternating-current rectangular wave Sg corresponds to a touch drive signal Vcomt (to be described later).

In the state (non-contact state) in which the finger is not in contact with (nor in proximity of) the device, a current $I_0$ corresponding to a capacitance value of the capacitive element C1 flows in association with the charge and discharge of the capacitive element C1, as illustrated in FIGS. 2 and 3. As illustrated in FIG. 6, the voltage detector DET converts a variation in the current $I_0$ corresponding to the alternating-current rectangular wave Sg into a variation in a voltage (waveform $V_0$ of a solid line).

In the state (contact state) in which the finger is in contact with (or in proximity of) the device, electrostatic capacitance C2 produced by the finger is in contact with or in proximity of the touch detection electrode E2, as illustrated in FIG. 4. Thus, a fringe component of the electrostatic capacitance existing between the drive electrode E1 and the touch detection electrode E2 is interrupted, and the electrostatic capacitance acts as the capacitive element C1' having a smaller capacitance value than that of the capacitive element C1. Referring to the equivalent circuit illustrated in FIG. 5, a current $I_1$ flows in the capacitive element C1'. As illustrated in FIG. 6, the voltage detector DET converts a variation in the current $I_1$ corresponding to the alternating-current rectangular wave Sg into a variation in a voltage (waveform $V_1$ of a dotted line). In this case, the waveform $V_1$ has a smaller amplitude than that of the above-described waveform $V_0$. This indicates that an absolute value $|\Delta V|$ of a voltage difference between the waveform $V_0$ and the waveform $V_1$ changes according to an influence of an object, such as a finger, approaching from the outside. To accurately detect the absolute value $|\Delta V|$ of the voltage difference between the waveform $V_0$ and the waveform $V_1$, the voltage detector DET preferably performs an operation including a period RESET during which the charge or discharge of the capacitor is reset by switching in the circuit in accordance with the frequency of the alternating-current rectangular wave Sg.

The touch detection device 30 illustrated in FIG. 1 is configured to perform the touch detection by sequentially scanning one detection block at a time according to the drive signals Vcom (touch drive signals Vcomt to be described later) fed from the drive electrode driver 14.

The touch detection device 30 is configured to output the touch detection signals Vdet from a plurality of touch detection electrodes TDL (to be described later) via the voltage detectors DET illustrated in FIG. 3 or 5 on a detection block by detection block basis, and feed the touch detection signals Vdet to the A/D converter 43 of the touch detection unit 40.

The A/D converter 43 is a circuit that samples each analog signal output from the touch detection signal amplifier 42 at a timing synchronized with the drive signals Vcom, and converts the sampled analog signal into a digital signal.

The signal processing unit 44 includes a digital filter that reduces frequency components (noise components) included in the output signals of the A/D converter 43 other than the frequency at which the drive signals Vcom have been sampled. The signal processing unit 44 is a logic circuit that detects existence of a touch to the touch detection device 30 based on the output signals of the A/D converter 43. The signal processing unit 44 performs processing to extract only a difference of voltage caused by the finger. The difference of voltage caused by the finger is the absolute value $|\Delta V|$ of the difference between the waveform $V_0$ and the waveform $V_1$ described above. The signal processing unit 44 may perform a calculation of averaging the absolute values $|\Delta V|$ for one detection block to obtain an average value of the absolute values $|\Delta V|$. This allows the signal processing unit 44 to reduce the influence of the noise. The signal processing unit 44 compares the detected difference of voltage caused by the finger with a predetermined threshold voltage. The signal processing unit 44 determines that the state is the contact state of the external proximate object approaching from the outside if the difference of voltage is equal to or larger than the threshold voltage, and determines that the state is the non-contact state of the external proximate object if the difference of voltage is smaller than the threshold voltage. The touch detection unit 40 can perform the touch detection in this manner.

The coordinate extraction unit 45 is a logic circuit that obtains touch panel coordinates of a touch when the touch is detected in the signal processing unit 44. The detection timing control unit 46 performs control so as to operate the A/D converter 43, the signal processing unit 44, and the coordinate extraction unit 45 in synchronization with each other. The coordinate extraction unit 45 outputs the touch panel coordinates as a signal output Vout.

Module

Figure 7:
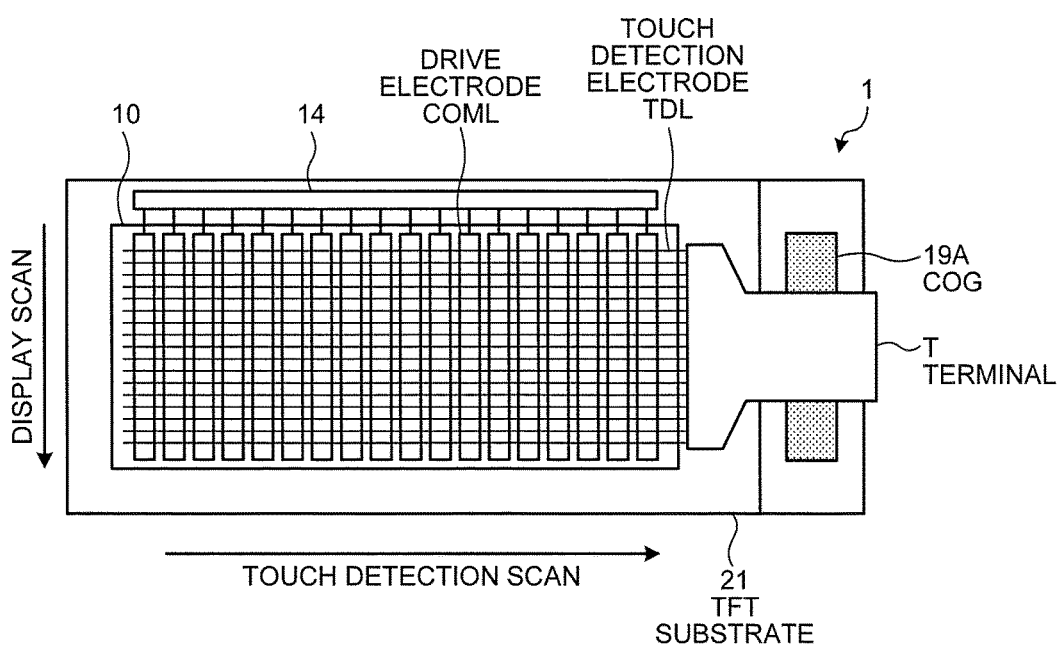
FIG. 7 is a diagram illustrating an example of a module implemented with the display apparatus with the touch detection function.
Figure 8:
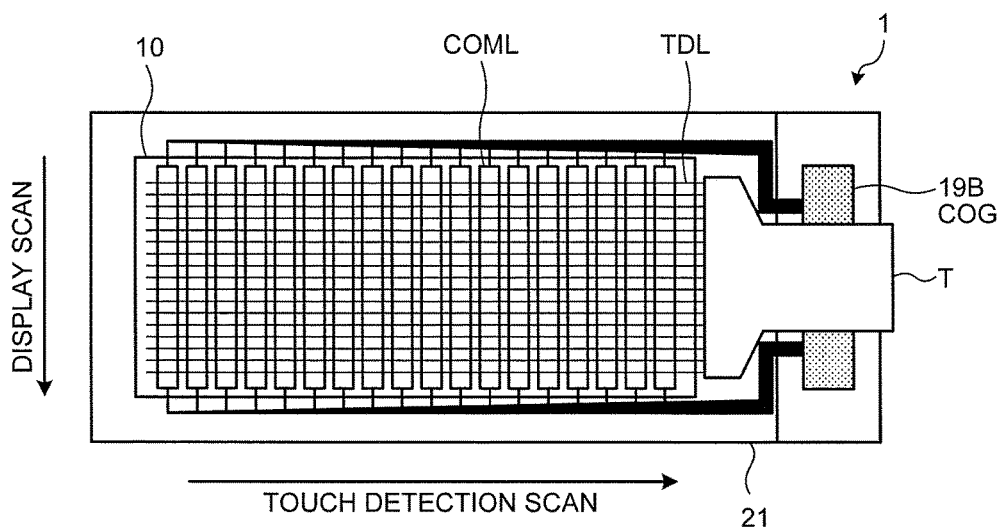
FIG. 8 is a diagram illustrating an example of a module implemented with the display apparatus with the touch detection function.

FIGS. 7 and 8 are diagrams each illustrating an example of a module implemented with the display apparatus with the touch detection function. When the display apparatus 1 with the touch detection function is mounted on a module, the above-described drive electrode driver 14 may be formed on a TFT substrate 21 that is a glass substrate, as illustrated in FIG. 7.

As illustrated in FIG. 7, the display apparatus 1 with the touch detection function includes the display device 10 with the touch detection function, the drive electrode driver 14, and a chip on glass (COG) 19A. The display device 10 with a touch detection function schematically illustrates, in a direction orthogonal to a surface of the TFT substrate 21 to be described later, the drive electrodes COML and the touch detection electrodes TDL that are formed so as to three-dimensionally intersect the drive electrodes COML. Specifically, the drive electrodes COML are formed in a direction along one side of the display device 10 with the touch detection function, and the touch detection electrodes TDL are formed in a direction along another side of the display device 10 with the touch detection function. The output of the touch detection electrodes TDL is coupled to the touch detection unit 40 mounted outside this module via a terminal unit T that is provided on the above-described other side of the display device 10 with the touch detection function and is composed of a flexible substrate, for example. The drive electrode driver 14 is formed on the TFT substrate 21 that is a glass substrate. The COG 19A is a chip mounted on the TFT substrate 21, and includes built-in circuits, such as the control unit 11, the gate driver 12, and the source driver 13 illustrated in FIG. 1, necessary for a display operation. The drive electrode driver 14 may be built into a COG 19B of the display apparatus 1 with the touch detection function, as illustrated in FIG. 8.

As illustrated in FIG. 8, the display apparatus 1 with the touch detection function includes the COG 19B. The COG 19B illustrated in FIG. 8 incorporates therein the drive electrode driver 14 in additions to the above-described circuits necessary for the display operation. In the display operation, the display apparatus 1 with the touch detection function performs line-sequential scanning one horizontal line at a time, as will be described later. In other words, the display apparatus 1 with the touch detection function performs display scanning parallel to a direction along one side of the display device 10 with the touch detection function. In a touch detection operation, the display apparatus 1 with the touch detection function performs the line-sequential scanning one detection line at a time by sequentially applying the drive signals Vcom to the drive electrodes COML.

Display Device with Touch Detection Function

Figure 9:
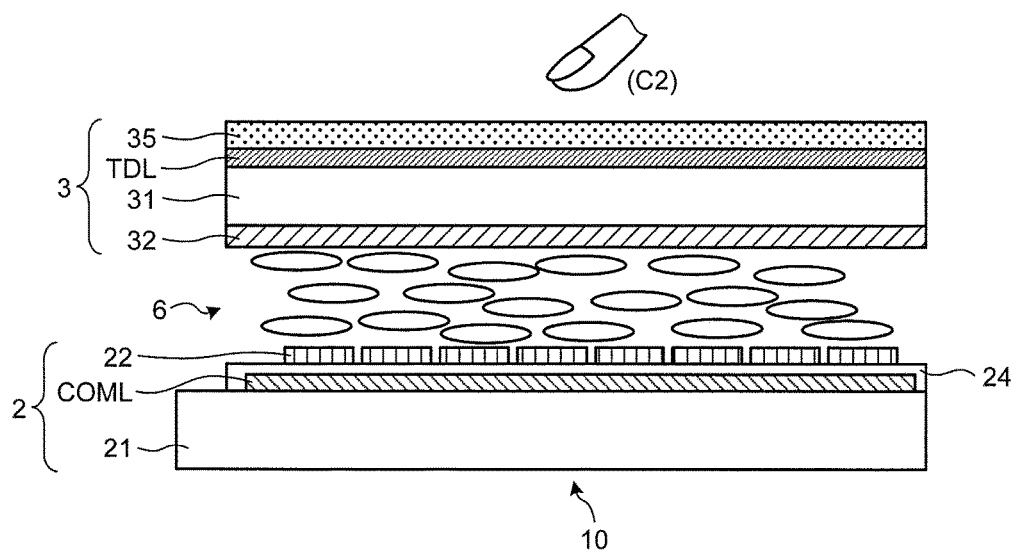
FIG. 9 is a cross-sectional view illustrating a schematic cross-sectional structure of a display device with a touch detection function according to the basic example.
Figure 10:
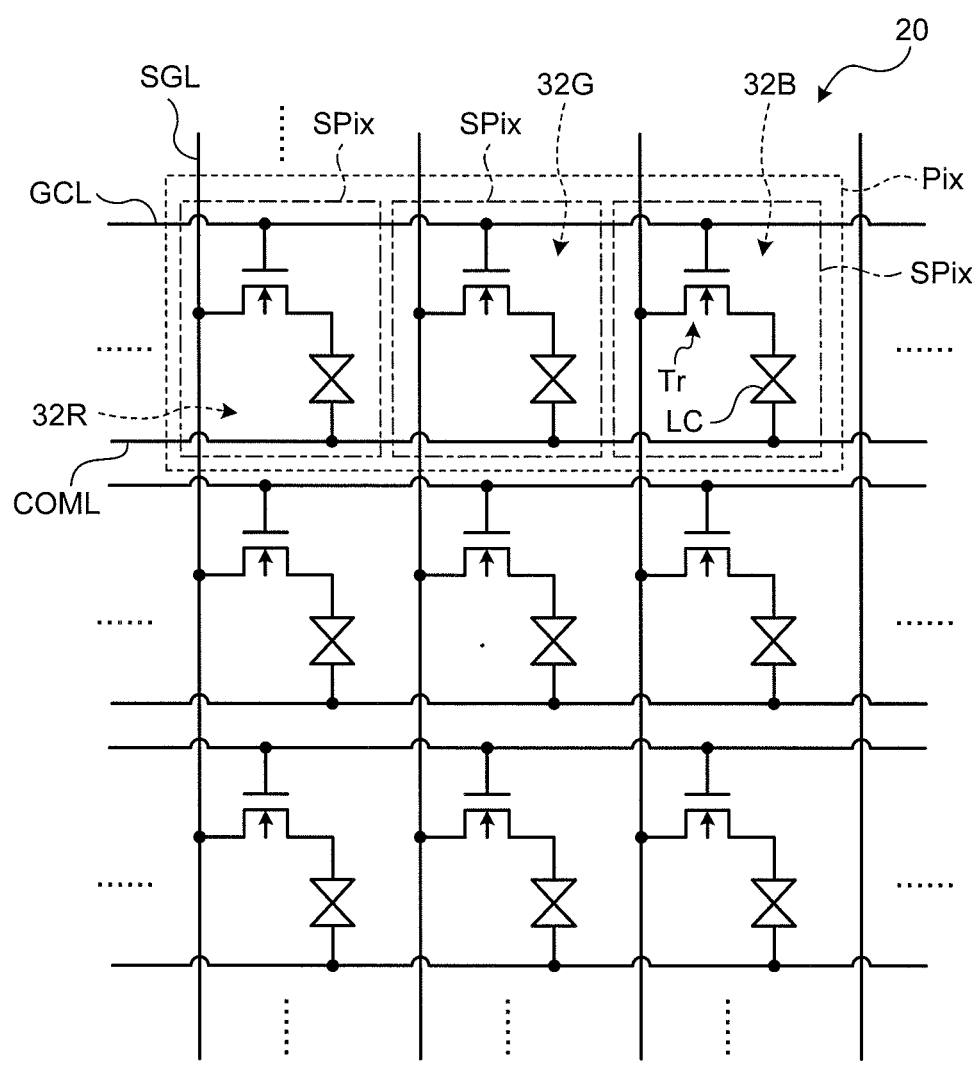
FIG. 10 is a circuit diagram illustrating a pixel arrangement of the display device with the touch detection function according to the basic example.

A configuration example of the display device 10 with the touch detection function will be described below in detail. FIG. 9 is a cross-sectional view illustrating a schematic cross-sectional structure of the display device with the touch detection function according to the present basic example. FIG. 10 is a circuit diagram illustrating a pixel arrangement of the display device with the touch detection function according to the present basic example. The display device 10 with the touch detection function includes a pixel substrate 2, a counter substrate 3 arranged facing a surface of the pixel substrate 2 in the direction orthogonal thereto, and a liquid crystal layer 6 inserted between the pixel substrate 2 and the counter substrate 3.

The pixel substrate 2 includes the TFT substrate 21 as a circuit substrate, a plurality of pixel electrodes 22 arranged in a matrix above the TFT substrate 21, the drive electrodes COML formed between the TFT substrate 21 and the pixel electrodes 22, and an insulation layer 24 insulating the pixel electrodes 22 from the drive electrodes COML. The TFT substrate 21 is provided with thin-film transistor (TFT) elements Tr of the respective sub-pixels SPix illustrated in FIG. 10, and with wiring, including signal lines SGL that feed the pixel signals Vpix to the respective pixel electrodes 22 illustrated in FIG. 9 and scan lines GCL that drive the respective TFT elements Tr. In this manner, the signal lines SGL extend in a plane parallel to the surface of the TFT substrate 21, and feed the pixel signals Vpix for displaying an image to the pixels. The liquid crystal display device 20 illustrated in FIG. 10 includes the sub-pixels SPix arranged in a matrix. Each of the sub-pixels SPix includes the TFT element Tr and a liquid crystal element LC. The TFT element Tr is constituted by a thin-film transistor, and in the present example, constituted by an n-channel metal oxide semiconductor (MOS) TFT. One of the source and the drain of the TFT element Tr is coupled to each of the signal lines SGL; the gate thereof is coupled to each of the scan lines GCL; and the other of the source and the drain thereof is coupled to one end of the liquid crystal element LC. The liquid crystal element LC is coupled, for example, at one end thereof, to the drain of the TFT element Tr, and at the other end thereof, to each of the drive electrodes COML.

The sub-pixel SPix illustrated in FIG. 10 is coupled by the scan line GCL with another sub-pixel SPix belonging to the same row of the liquid crystal display device 20. The scan line GCL is coupled with the gate driver 12, and is supplied with the scan signal Vscan from the gate driver 12. The sub-pixel SPix is coupled by the signal line SGL with another sub-pixel SPix belonging to the same column of the liquid crystal display device 20. The signal line SGL is coupled with the source driver 13, and is supplied with the pixel signals Vpix from the source driver 13. The sub-pixel SPix is further coupled by the drive electrode COML with another sub-pixel SPix belonging to the same row of the liquid crystal display device 20. The drive electrode COML is coupled with the drive electrode driver 14, and is supplied with the drive signal Vcom from the drive electrode driver 14. This means that the sub-pixels SPix belonging to the same one of the rows share one of the drive electrodes COML, in the present example. The drive electrodes COML of the present basic example extend parallel to the direction of extension of the scan lines GCL. The direction of extension of the drive electrodes COML of the present basic example may be, for example, but not limited to, a direction parallel to the direction of extension of the signal lines SGL.

The gate driver 12 illustrated in FIG. 1 applies the scan signals Vscan to the gates of the TFT elements Tr of pixels Pix via the scan line GCL illustrated in FIG. 10 so as to sequentially select, as a target of display driving, one row (one horizontal line) of the sub-pixels SPix formed in a matrix on the liquid crystal display device 20. The source driver 13 illustrated in FIG. 1 feeds the pixel signals Vpix via the signal lines SGL illustrated in FIG. 10 to the respective sub-pixels SPix constituting one horizontal line sequentially selected by the gate driver 12. The sub-pixels SPix are configured to display one horizontal line according to the pixel signals Vpix thus fed. The drive electrode driver 14 illustrated in FIG. 1 applies the drive signals Vcom to the drive electrodes COML in each block consisting of a predetermined number of the drive electrodes COML illustrated in FIGS. 7 and 8, and thus drives the drive electrodes COML on a block by block basis.

As describe above, the gate driver 12 sequentially selects one horizontal line on the liquid crystal display device 20 by driving the scan line GCL so as to perform the line-sequential scanning in a time-division manner. The source driver 13 feeds the pixel signals Vpix to the sub-pixels SPix belonging to one horizontal line so as to perform the display on the liquid crystal display device 20 on a horizontal line by horizontal line basis. The drive electrode driver 14 is configured to apply the drive signals Vcom to the block including the drive electrodes COML corresponding to the horizontal line while the display operation is performed.

Figure 11:
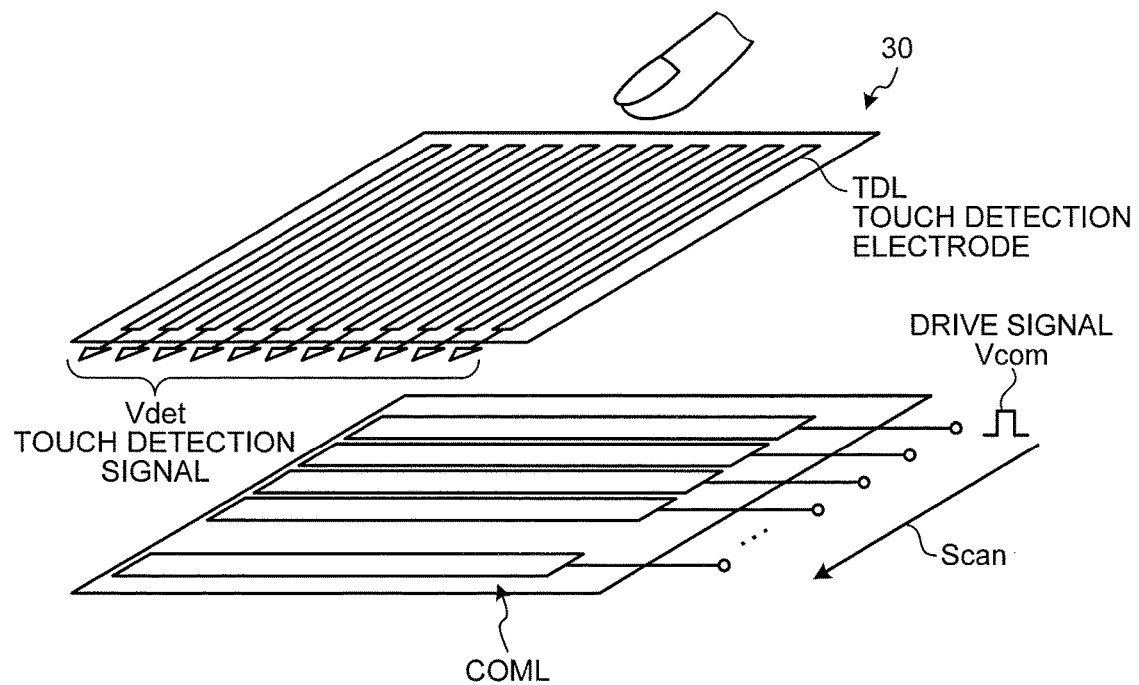
FIG. 11 is a perspective view illustrating a configuration example of drive electrodes and touch detection electrodes of the display device with the touch detection function according to the basic example.

The drive electrode COML according to the present basic example functions as a drive electrode of the liquid crystal display device 20, and also as a drive electrode of the touch detection device 30. FIG. 11 is a perspective view illustrating a configuration example of the drive electrodes and the touch detection electrodes of the display device with the touch detection function according to the present basic example. As illustrated in FIG. 9, the drive electrodes COML illustrated in FIG. 11 face the pixel electrodes 22 in the direction orthogonal to the surface of the TFT substrate 21. The touch detection device 30 includes the drive electrodes COML provided at the pixel substrate 2 and the touch detection electrodes TDL provided at the counter substrate 3. The touch detection electrodes TDL include stripe-like electrode patterns extending in the direction intersecting the extending direction of the electrode patterns of the drive electrodes COML. The touch detection electrodes TDL face the drive electrodes COML in the direction orthogonal to the surface of the TFT substrate 21. Each of the electrode patterns of the touch detection electrodes TDL is coupled to an input of the touch detection signal amplifier 42 of the touch detection unit 40. The electrode patterns intersecting each other provided by the drive electrodes COML and the touch detection electrodes TDL generate electrostatic capacitance at intersecting portions therebetween. The touch detection electrodes TDL and/or the drive electrodes COML (drive electrode blocks) are not limited to have a shape divided into a plurality of stripes. For example, the touch detection electrodes TDL and/or the drive electrodes COML (drive electrode blocks) may have a comb shape. Otherwise, the touch detection electrodes TDL and/or the drive electrodes COML (drive electrode blocks) only need to be divided into a plurality of pieces. The slits dividing the drive electrodes COML may have a straight-line shape or a curved-line shape.

When the touch detection device 30 performs the touch detection operation, this configuration causes the drive electrode driver 14 to perform driving so as to perform line-sequential scanning of the drive electrode blocks in a time-division manner. This leads to sequential selection of one detection block of the drive electrodes COML in a scan direction Scan. The touch detection device 30 outputs the touch detection signal Vdet from each of the touch detection electrodes TDL. The touch detection device 30 is configured to perform the touch detection of one detection block in this manner. This means that the drive electrode block corresponds to the drive electrode E1 whereas the touch detection electrode TDL corresponds to the touch detection electrode E2 in the above-described basic principle of touch detection, and the touch detection device 30 is configured to detect the touch according to the basic principle. As illustrated in FIG. 11, the electrode patterns intersecting each other constitute an electrostatic capacitance type touch sensor in a matrix form. This also enables detection of a position where the external proximate object is in contact therewith or in proximity thereof by scanning the entire touch detection surface of the touch detection device 30.

The liquid crystal layer 6 modulates light passing therethrough according to the state of an electric field, and includes liquid crystals of a horizontal electric field mode, such as a fringe field switching (FFS) mode or an in-plane switching (IPS) mode. An orientation film may be interposed between the liquid crystal layer 6 and the pixel substrate 2, and between the liquid crystal layer 6 and the counter substrate 3, which are illustrated in FIG. 9.

The counter substrate 3 includes a glass substrate 31 and a color filter 32 formed on one surface of the glass substrate 31. The touch detection electrodes TDL serving as detection electrodes of the touch detection device 30 are formed on the other surface of the glass substrate 31, and a polarizing plate 35 is further disposed on top of the touch detection electrodes TDL.

In the color filter 32 illustrated in FIG. 9, for example, color regions colored in three colors of red (R), green (G), and blue (B) are periodically arranged, and these color regions 32R, 32G, and 32B (refer to FIG. 10) of the three colors of R, G, and B correspond to the above-described respective sub-pixels SPix illustrated in FIG. 10. The color regions 32R, 32G, and 32B constitute each of the pixels Pix as a set. The pixels Pix are arranged in a matrix along directions parallel to the scan lines GCL and the signal lines SGL, and form a display area Ad to be described later. The color filter 32 faces the liquid crystal layer 6 in the direction orthogonal to the TFT substrate 21. Thus, the sub-pixels SPix can perform monochromatic display. The color filter 32 may have a combination of other colors as long as being colored in different colors from each other. The color filter 32 is not indispensable. Thus, an area not covered with the color filter 32 (i.e., not colored sub-pixels SPix) may exist.

Operations and Effects

The following describes the operations and effects of the display apparatus 1 with the touch detection function in the basic example.

The drive electrode COML functions as a common drive electrode of the liquid crystal display device 20 and also functions as a drive electrode of the touch detection device 30. As a result, the drive signals Vcom for display operation and for touch detection operation may affect each other's operations. The drive signals Vcom are thus applied to the drive electrode COML separately in a display period B in which the display operation is performed and in a touch detection period A in which the touch detection operation is performed. The drive electrode driver 14 applies the drive signal Vcom as a display drive signal in the display period B in which the display operation is performed. The drive electrode driver 14 applies the drive signal Vcom as a touch drive signal in the touch detection period A in which the touch detection operation is performed. In the following description, the drive signal Vcom serving as the display drive signal is described as a display drive signal Vcomd while the drive signal Vcom serving as the touch drive signal is described as the touch drive signal Vcomt.

Overview of Overall Operation

The controller 11 supplies the control signal to each of the gate driver 12, the source driver 13, the drive electrode driver 14, and the touch detection unit 40 on the basis of the video signal Vdisp externally supplied to control them such that they operate in synchronization with each other. In the display period B, the gate driver 12 supplies the scan signals Vscan to the liquid crystal display device 20 to sequentially select one horizontal line to be driven for display. In the display period B, the source driver 13 supplies the pixel signals Vpix to the respective pixels Pix included on the horizontal line selected by the gate driver 12.

In the display period B, the drive electrode driver 14 applies the display drive signal Vcomd to the drive electrode block related to one horizontal line. For each touch detection period A, the drive electrode driver 14 applies the touch drive signal Vcomt to the drive electrode block related to the touch detection operation. As a result, the detection blocks are selected one by one. In the display period B, the display apparatus 10 with the touch detection function performs the display operation on the basis of the signals supplied by the gate driver 12, the source driver 13, and the drive electrode driver 14. In the touch detection period A, the display apparatus 10 with the touch detection function performs the touch detection operation on the basis of the signal supplied by the drive electrode driver 14, and outputs the touch detection signal Vdet from the touch detection electrode TDL. The touch detection signal amplifier 42 amplifies and then outputs the touch detection signal Vdet. The A/D converter 43 converts the analog signal output from the touch detection signal amplifier 42 into the digital signal at a timing synchronized with the touch drive signal Vcomt. The signal processor 44 detects existence of a touch to the touch detection device 30 on the basis of the output signal from the A/D converter 43. The coordinate extraction unit 45 obtains the touch panel coordinates of the touch when the touch is detected by the signal processor 44.

Detailed Operation

Figure 12:
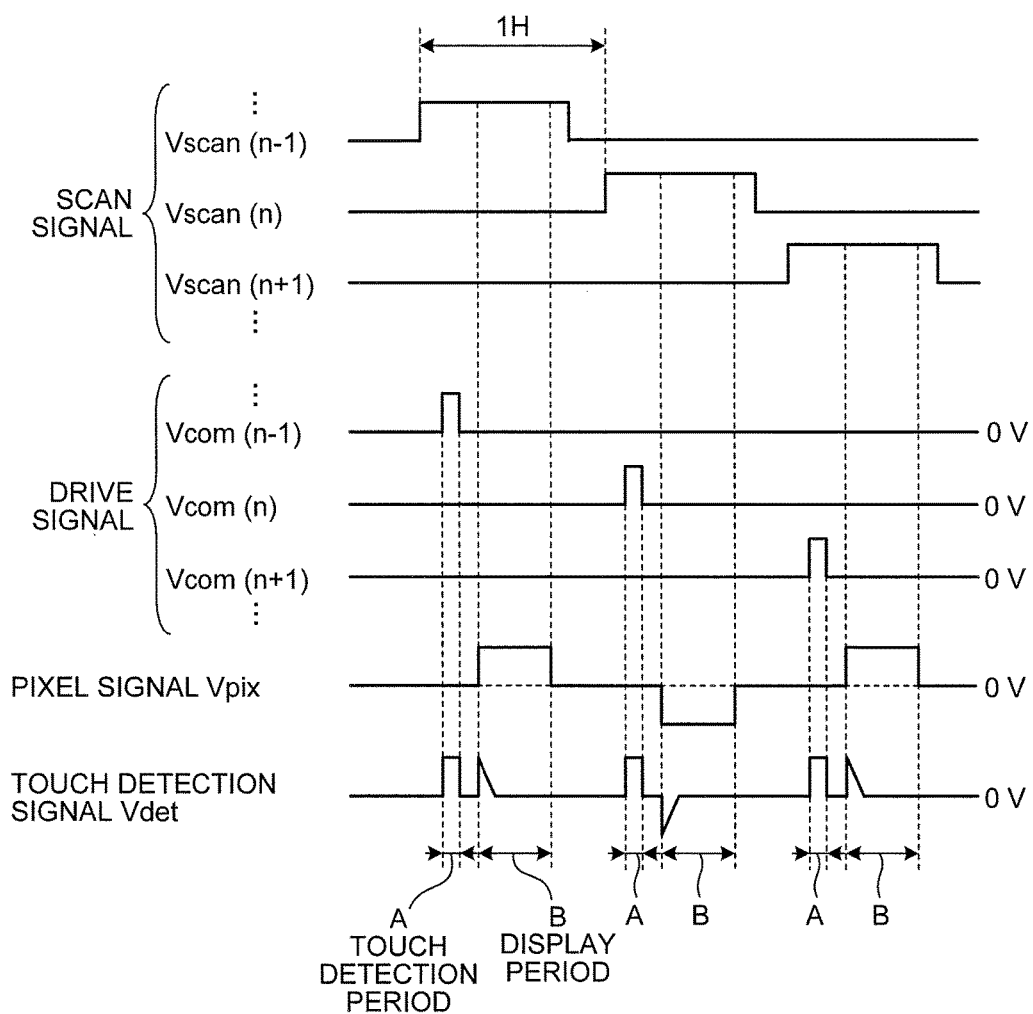
FIG. 12 is a timing waveform diagram illustrating an operation example of the display apparatus with the touch detection function according to the basic example.

The following describes a detailed operation of the display apparatus 1 with the touch detection function. FIG. 12 is a timing waveform diagram illustrating an operation example of the display apparatus with the touch detection function according to the basic example. As illustrated in FIG. 12, the liquid crystal display device 20 sequentially scans adjacent scan lines GCL of the (n−1)-th, n-th, and (n+1)-th rows out of the scan lines GCL, one horizontal line at a time, in accordance with the scan signals Vscan supplied from the gate driver 12 to perform display. In a similar manner, the drive electrode driver 14 supplies the drive signals to adjacent drive electrodes COML of the (n−1)-th, n-th, and (n+1)-th columns out of the drive electrodes COML of the display device 10 with the touch detection function on the basis of the control signal supplied from the controller 11.

In this manner, the display apparatus 1 with the touch detection function performs the touch detection operation (in the touch detection period A) and the display operation (in the display period B) in a time-division manner for each one horizontal display period (1H). In the touch detection operation, the scanning of the touch detection is performed by selecting a different drive electrode COML and applying thereto the drive signal Vcom for each one horizontal display period 1H. The operation is described below in detail.

The gate driver 12 applies the scan signal Vscan to the scan line GCL of the (n−1)-th row. The level of the scan signal Vscan (n−1) thus changes from a low level to a high level. This causes one horizontal display period 1H to start.

In the touch detection period A, the drive electrode driver 14 applies the drive signal Vcom to the drive electrode COML of the (n−1)-th column. The level of the drive signal Vcom (n−1) thus changes from a low level to a high level. The drive signal Vcom (n−1) is transmitted to the touch detection electrode TDL via the capacitance and thus the touch detection signal Vdet changes. Next, a change in the level of the drive signal Vcom (n−1) from the high level to the low level changes the touch detection signal Vdet in the same manner. The waveform of the touch detection signal Vdet in the touch detection period A corresponds to the touch detection signal Vdet in the above-described basic principle of touch detection. The A/D converter 43 performs the touch detection by A/D-converting the touch detection signal Vdet in the touch detection period A. This is how the display apparatus 1 with the touch detection function performs the touch detection for one detection line.

In the display period B, the source driver 13 applies the pixel signals Vpix to the signal lines SGL to perform display for one horizontal line. As illustrated in FIG. 12, the changes in the pixel signals Vpix can be transmitted to the touch detection electrode TDL via parasitic capacitance to change the touch detection signal Vdet. The influence of the changes in the pixel signals Vpix on the touch detection can be reduced by causing the A/D converter 43 not to perform the A/D conversion in the display period B. After the source driver 13 completes the supply of the pixel signals Vpix, the gate driver 12 changes the level of the scan signal Vscan (n−1) of the scan signal line GCL of the (n−1)-th row from the high level to the low level. Thus, the one horizontal display period ends.

The gate driver 12 applies the scan signal Vscan to the scan line GCL of the n-th row that is different from the previous one. The level of the scan signal Vscan (n) thus changes from the low level to the high level. This causes the next one horizontal display period to start.

In the next touch detection period A, the drive electrode driver 14 applies the drive signal Vcom to the drive electrode COML of the n-th column that is different from the previous one. The A/D converter 43 A/D-converts a change in the touch detection signal Vdet. The touch detection for this detection line is thus performed.

Next, in the display period B, the source driver 13 applies the pixel signals Vpix to the signal lines SGL to perform display for one horizontal line. The drive electrode driver 14 applies the display drive signal Vcomd as a common potential to the drive electrode COML. The potential of the display drive signal Vcomd is a low-level potential of the drive signal Vcomt in the touch detection period A, for example. The display apparatus 1 with the touch detection function of the basic example performs dot inversion driving, so that the pixel signals Vpix applied by the source driver 13 have a polarity opposite to that in the previous horizontal display period. After this display period B ends, this horizontal display period 1H ends.

From then on, the display apparatus 1 with the touch detection function repeats the operation described above to perform the display operation by scanning the entire display surface and also to perform the touch detection operation by scanning the entire touch detection surface.

In one horizontal display period (1H), the display apparatus 1 with the touch detection function performs the touch detection operation during the touch detection period A and the display operation during the display period B. Performing the touch detection operation and the display operation in separate periods in this manner allows the display apparatus 1 with the touch detection function to perform both the touch detection operation and the display operation in the same horizontal display period, and to reduce the influence of the display operation on the touch detection.

Arrangement of Touch Detection Electrodes

Figure 13:
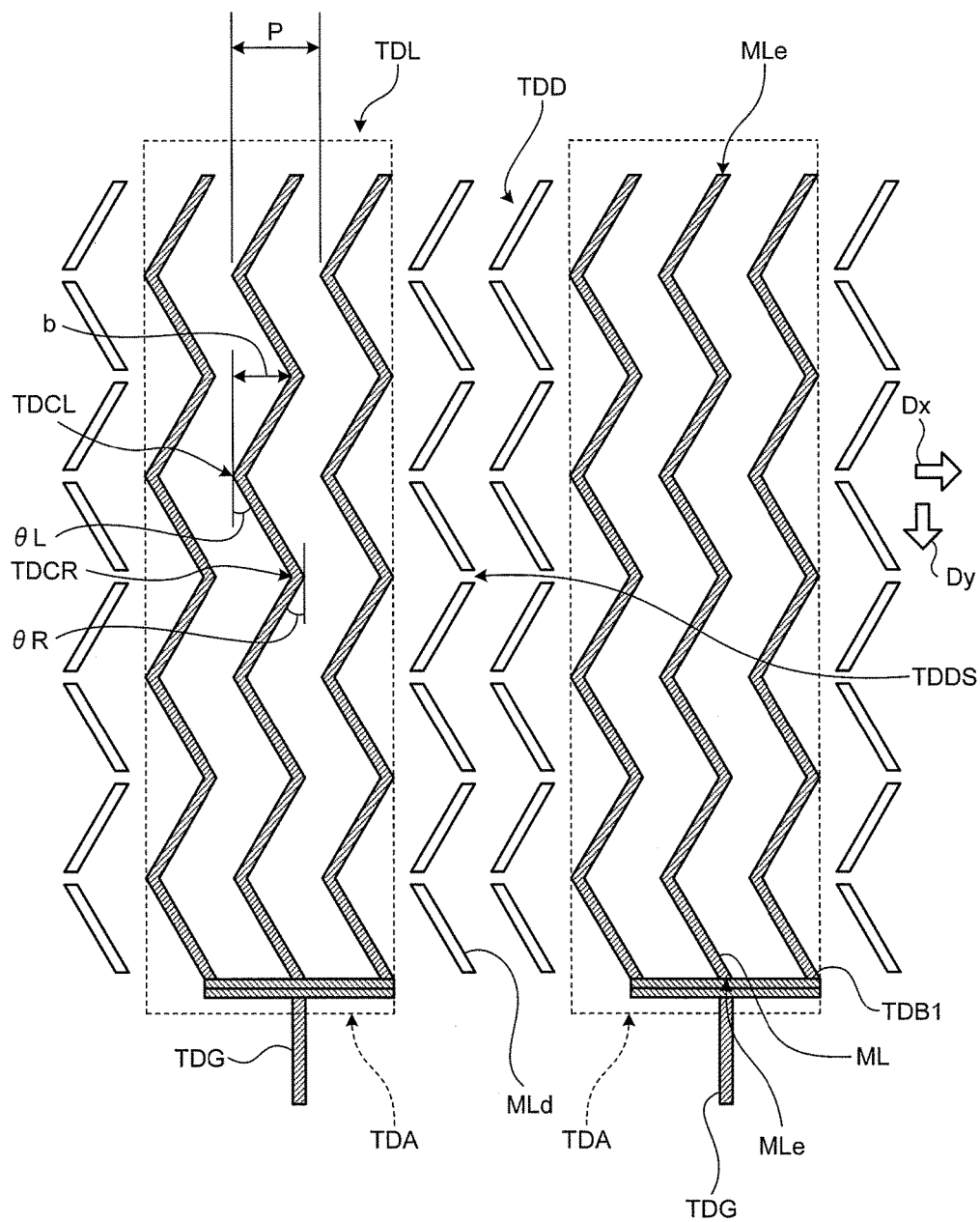
FIG. 13 is a schematic diagram illustrating an arrangement of the touch detection electrodes according to the basic example.
Figure 14:
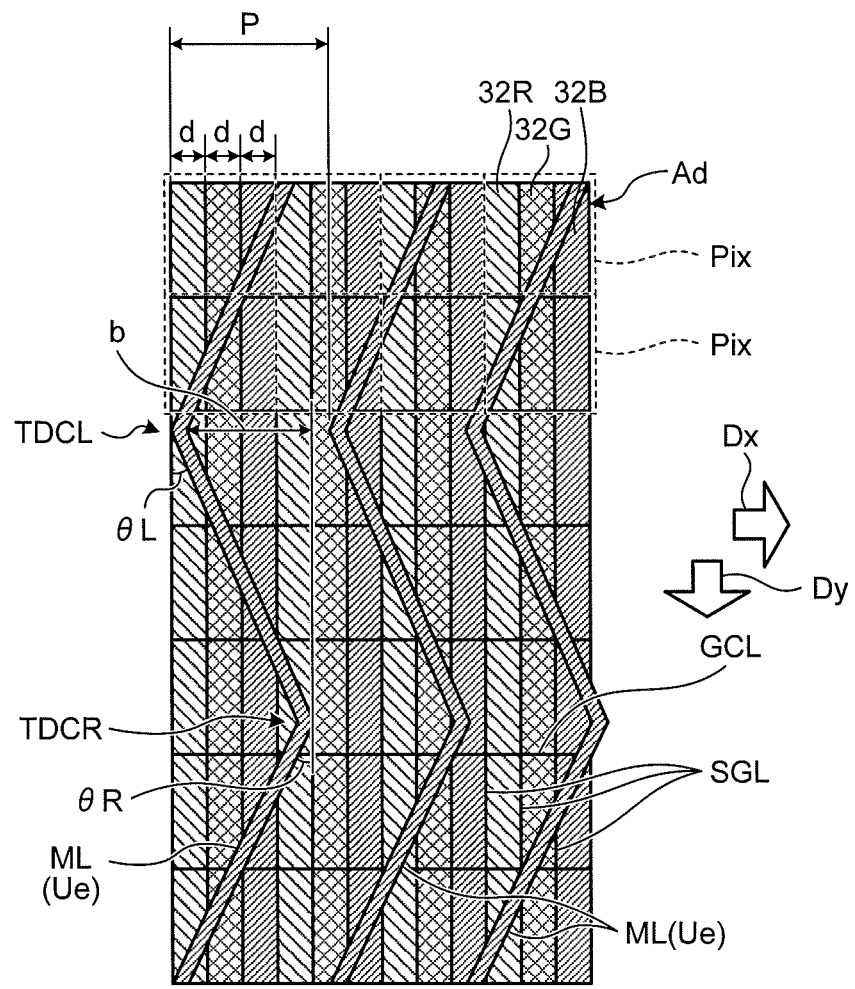
FIG. 14 is a schematic diagram for explaining a relation between the touch detection electrodes according to the basic example and respective color regions.

FIG. 13 is a schematic diagram illustrating an arrangement of the touch detection electrodes according to the basic example. FIG. 14 is a schematic diagram for explaining a relation between the touch detection electrodes according to the basic example and respective color regions.

As illustrated in FIG. 13, each of the touch detection electrodes TDL according to the basic example includes a plurality of conductive thin wires ML in a plane parallel to the counter substrate 3. The conductive thin wires ML extend in the same direction as the extending direction of the color regions of the respective colors, which are described later, in an overall view. The conductive thin wires ML according to the basic example have the same shape, for example. In the touch detection electrode TDL, the conductive thin wires ML are coupled at an end MLe in a color region direction Dy with each other via a first conductive portion TDB1, and belong to a detection area TDA. In the detection area TDA, the conductive thin wires ML are conductive with each other and extend with a certain space between each other. A conductive thin wire space P is a space between the adjacent conductive thin wires ML in a color region orthogonal direction Dx. The conductive thin wire space P according to the basic example is constant, for example. The extending direction of the conductive thin wires ML according to the basic example is a direction of a straight line connecting one end MLe and the other end MLe of the conductive thin wire ML. The extending direction of the conductive thin wires ML is the longitudinal direction of the conductive thin wire ML.

The multiple detection areas TDA extend with a certain space between each other. The first conductive portions TDB1 are coupled to the touch detection unit 40 illustrated in FIG. 1 via detection wiring lines TDG. The first conductive portions TDB1 are formed of the same material as the conductive thin wires ML. The structure described above can reduce the resistance in the touch direction by reducing the number of conductive thin wires ML and performing the touch detection by multiple metallic wires ML for a certain area.

Each of the conductive thin wires ML includes portions having an angle θL made by the extending direction of the conductive thin wire ML and the extending direction of the color region, which is described later, (extending direction of the signal lines SGL). Each of the conductive thin wires ML also includes portions having an angle θR made by the extending direction of the conductive thin wire ML and the extending direction of the color region, which is described later. The angles θL and θR according to the basic example are equal to each other, for example. Each of the conductive thin wires ML is a zigzag line or a wavy line, in which the conductive thin wire ML turns at bent portions TDCL and TDCR. The length between the bent portions TDCL and TDCR, being next to the bent portions TDCL, of the conductive thin wire ML in the color region orthogonal direction Dx is a length b between the bent portions. The length b between the bent portions according to the basic example is constant, for example. The conductive thin wire ML preferably has a width in the range from 3 μm to 10 μm. The conductive thin wires ML having a width smaller than 10 μm reduce the area of an opening covered by the conductive thin wires ML in the display area Ad, but not being covered by a black matrix or the scan lines GCL and signal lines SGL, allowing light to be transmitted. The chance of a decreased opening rate is reduced as a result. The conductive thin wires ML having a width larger than 3 μm stabilize the shapes of the conductive thin wires ML and reduce the chance of disconnection thereof.

The conductive thin wire ML of the touch detection electrode TDL is of an electrically conductive metal material, and is formed of a metal material, such as aluminum (Al), copper (Cu), silver (Ag), molybdenum (Mo), chromium (Cr), tungsten (W), or an alloy of these metals. Alternatively, the conductive thin wire ML of the touch detection electrode TDL is formed of an oxide (metal oxide) of aluminum (Al), copper (Cu), silver (Ag), molybdenum (Mo), chromium (Cr), or tungsten (W), and has electric conductivity. The conductive thin wire ML may be a patterned laminated body that has one or more layers of the above-described metal materials and/or the above-described metal oxides. The conductive thin wire ML may be a patterned laminated body that has one or more layers of the metal materials or the metal oxides described above, and/or a translucent conductive oxide such as indium tin oxide (ITO) as a material of translucent electrodes. The conductive thin wire ML has a lower resistance than that of the translucent conductive oxide such as ITO as a material of translucent electrodes. The material of the conductive thin wire ML has a lower transmittance value than that of a material of ITO having the same film thickness. For example, the material of the conductive thin wire ML may have a transmittance value of 10% or less.

As illustrated in FIG. 13, the detection areas TDA are arranged with a certain space between each other. Areas in which the conductive thin wires ML of the touch detection electrode TDL are arranged and areas in which the conductive thin wires ML of the touch detection electrode TDL are not arranged have different levels of light-shielding effect from each other. This may cause the touch detection electrode TDL to be easily visible. Therefore, dummy electrodes TDD that are not coupled to the detection wiring lines TDG are each arranged between the adjacent detection areas TDA on the counter substrate 3. The dummy electrodes TDD are formed of the same material as the conductive thin wires ML of the touch detection electrode TDL. Conductive thin wires MLd of the dummy electrode TDD may be formed of another material as long as the conductive thin wires MLd have a level of the light-shielding effect comparable with that of the touch detection electrode TDL. The dummy electrodes TDD are formed in the same layer as the touch detection electrodes TDL. This structure makes it possible to form the dummy electrodes TDD and the touch detection electrodes TDL in the same processing step, thereby making it possible to reduce the number of manufacturing steps.

The dummy electrode TDD illustrated in FIG. 13 includes the multiple conductive thin wires MLd extending in a plane parallel to the counter substrate 3. The conductive thin wires MLd correspond to the conductive thin wires ML but are not coupled to the first conductive portions TDB1. The conductive thin wires MLd are arranged such that the adjacent conductive thin wires MLd have the conductive thin wire space P therebetween. As a result, the difference in light-shielding effect between the areas in which the touch detection electrode TDL is arranged and the areas in which the touch detection electrode TDL is not arranged becomes small, thereby making it possible to reduce the chance of the touch detection electrode TDL being visually recognized.

Each of the conductive thin wires MLd includes split portions TDDS, which are slits at positions corresponding to the bent portions TDCL and TDCR of the conductive thin wire ML and do not have the same material as the conductive thin wire ML. As a result, each split portion TDDS prevents the portions making different angles with respect to the extending direction of the conductive thin wire MLd from being electrically conducted, thereby generating a difference in capacitance from the touch detection electrode TDL. When a finger approaches both the touch detection electrode TDL and the dummy electrode TDD in the touch detection, an influence of the dummy electrode TDD on the absolute value |ΔV| illustrated in FIG. 6 can be reduced. In this manner, the split portions TDDS split the dummy electrode TDD into portions having a smaller area than that of the conductive thin wire ML of the touch detection electrode TDL, thereby making it possible to reduce the influence of the dummy electrode TDD on the touch detection accuracy. The split portions TDDS may be provided at a part of the positions corresponding to the bent portions TDCL and TDCR of the conductive thin wires ML. For example, the split portions TDDS may be only provided at the positions corresponding to the bent portions TDCL of the conductive thin wire ML.

The following describes a relation between the conductive thin wires ML and the respective color regions 32R, 32G, and 32B with reference to FIG. 14. FIG. 14 is an enlarged view of a part of the conductive thin wires ML illustrated in FIG. 13. As described above, the display area Ad includes the multiple pixels Pix, each of which includes a set of the color regions 32R, 32G, and 32B that correspond to the respective sub-pixels SPix. The pixels Pix are arranged in a matrix along the direction Dx parallel to the scan lines GCL and the direction Dy parallel to the signal lines SGL. The respective color regions are formed in columns extending parallel to the signal lines SGL. The color region orthogonal direction Dx is orthogonal to the extending direction of the respective color regions. The width of each of the respective color regions 32R, 32G, and 32B in the color region orthogonal direction Dx is a color region width d.

The conductive thin wires ML overlap with the display area Ad when viewed from a direction orthogonal to the surface of the display area Ad. The conductive thin wires ML are arranged such that the conductive thin wire space P is smaller than the sum of the length b between the bent portions and the color region width d. In other words, the conductive thin wires ML are arranged such that the following expression (1) is satisfied.

$$P < b+d \tag{1}$$

The conductive thin wire space P is preferably equal to or larger than the length b between the bent portions. In other words, the conductive thin wires ML are preferably arranged such that the following expression (2) is satisfied.

$$b \leq P \tag{2}$$

The conductive thin wire space P is preferably equal to or smaller than 160 µm. In other words, the conductive thin wires ML are preferably arranged such that the following expression (3) is satisfied. When the conductive thin wire space P is equal to or smaller 160 µm, the chance of the conductive thin wires ML being recognized is decreased due to the human eye resolution performance, and thus the conductive thin wires ML are hardly visually recognized.

$$P \leq 160 \text{ µm} \tag{3}$$

As described above, the pixels Pix are arranged in a matrix along the directions parallel to the scan lines GCL and the signal lines SGL. When the scan lines GCL and the signal lines SGL are covered by the black matrix, the black matrix prevents the transmission of light. When the scan lines GCL and the signal lines SGL are not covered by the black matrix, the scan lines GCL and the signal lines SGL prevent the transmission of light. In the basic example, a periodic pattern of a plurality of straight lines along a direction parallel to the scan lines GCL readily appears in the display area Ad. A periodic pattern of a plurality of straight lines along a direction parallel to the signal lines SGL also readily appears in the display area Ad. When the touch detection electrodes TDL are overlapped with the display area Ad in a view from the direction orthogonal to the surface of the display area Ad, a light-dark pattern is formed due to interference between the pattern appearing in the display area Ad and the touch detection electrodes TDL. As a result, a moiré pattern may be visually recognized. In particular, when the conductive thin wires ML have a linear shape parallel to the scan lines GCL or the signal lines SGL, the chance of a moiré pattern being visually recognized is increased. When any of the color regions 32R, 32G, and 32B are shielded by the conductive thin wires ML from light, a difference in brightness occurs among the color regions. As a result, a moiré pattern may be visually recognized.

As illustrated in FIG. 14, the conductive thin wires ML according to the basic example extend in the same direction as the extending direction of the color regions in an overall view and include portions making an angle with respect to the extending direction in a partial view. The extending direction of the color regions is in parallel with the signal lines SGL. The conductive thin wires ML are zigzag lines or wavy lines and include portions making an angle with respect to the scan lines GCL or the signal lines SGL. The display apparatus 1 with the touch detection function according to the basic example thus can further reduce the chance of the moiré pattern being visually recognized than a case where the conductive thin wires ML are straight lines parallel to the scan lines GCL or the signal lines SGL.

As illustrated in FIG. 14, the conductive thin wires ML according to the basic example include portions that cross (overlap) with all of the color columns formed by the color regions 32R, 32G, and 32B in a view from the direction orthogonal to the surface of the display area Ad. As a result, any specific color region out of the color regions 32R, 32G, and 32B is hardly shielded by the conductive thin wires ML from light. Consequently, the display apparatus 1 with the touch detection function according to the basic example hardly causes a difference in brightness among the color regions, thereby making it possible to reduce the chance of the moiré pattern being visually recognized.

The conductive thin wires ML according to the basic example have the same shape and are arranged such that expression (1) is satisfied. The conductive thin wires ML are thus arranged in a regular manner, thereby obscuring the respective conductive thin wires ML. The display apparatus 1 with the touch detection function according to the basic example thus can cause the conductive thin wires ML to be hardly visually recognized by users. When the conductive thin wires ML are arranged such that expression (1) is satisfied, the conductive thin wires ML consistently include portions that cross (overlap) with all of the color columns formed by the color regions 32R, 32G, and 32B in a view from the direction orthogonal to the surface of the display area Ad. As a result, any specific color region out of the color regions 32R, 32G, and 32B is hardly shielded by the conductive thin wires ML from light. Consequently, the display apparatus 1 with the touch detection function according to the basic example hardly causes a difference in brightness among the color regions, thereby making it possible to reduce the chance of the moiré pattern being visually recognized.

In addition, when expression (2) is satisfied, a constant space between the adjacent conductive thin wires ML is maintained. The conductive thin wires ML thus reduces the area of an opening that is covered by the conductive thin wires ML in the display area Ad but not being covered by the black matrix or the scan lines GCL and the signal lines SGL, allowing light to be transmitted. The display apparatus 1 with the touch detection function according to the basic example can reduce the chance of the opening rate being further decreased.

The angles θR and θL are preferably 30 degrees to 40 degrees, or 50 degrees to 60 degrees. The angle made by the conductive thin wire ML and the scan line GCL and the signal line SGL becomes larger than a certain angle, thereby causing the period of the light-dark pattern to be easily shorten to a degree that makes the conductive thin wires ML invisible by human eyes. As a result, the chance of the moiré pattern being visually recognized can be reduced.

First Modification of Basic Example

Figure 15:
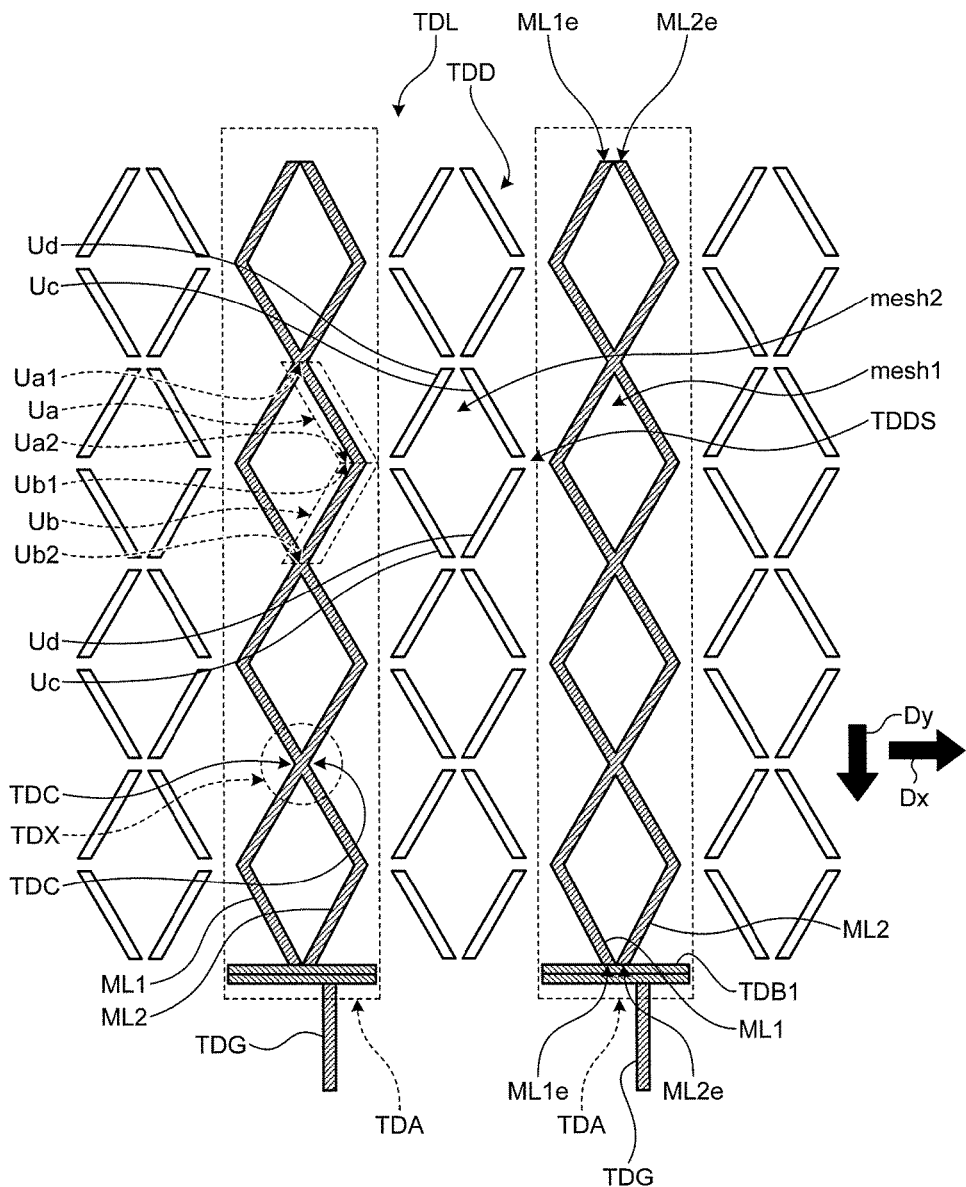
FIG. 15 is a schematic diagram illustrating an arrangement of the touch detection electrodes according to a first modification of the basic example.

The following describes the display apparatus 1 with the touch detection function according to a first modification of the basic example. FIG. 15 is a schematic diagram illustrating an arrangement of the touch detection electrodes according to the first modification of the basic example. The same constituent elements as the basic example are labeled with the same reference numerals, and the duplicated descriptions thereof are omitted.

As illustrated in FIG. 15, each of the touch detection electrodes TDL according to the first modification of the basic example includes a conductive thin wire ML1 and a conductive thin wire ML2 that extend in a pixel arrangement direction Dy in a plane parallel to the counter substrate 3. One set of the conductive thin wires ML1 and ML2 forms the detection area TDA.

The conductive thin wire ML1 corresponds to the conductive thin wire ML illustrated in the basic example. The shapes of the conductive thin wire ML2 and conductive thin wire ML1 are symmetric with respect to a straight line parallel to the pixel arrangement direction Dy as an axis of symmetry. The conductive thin wire ML2 is formed of the same material as the conductive thin wire ML1. The conductive thin wire ML2 is arranged such that intersections TDX, at which the bent portions TDC of the conductive thin wire ML1 are coupled to the bent portions TDC of the conductive thin wire ML2, are formed. The conductive thin wires ML1 and ML2 are conductive with each other at the intersections TDX. As a result, the conductive thin wires ML1 and ML2 form surrounded areas mesh1 surrounded by the thin wire segments Ua and Ub. The conductive thin wires ML1 and ML2 need not be coupled at the bent portions TDC. The conductive thin wires ML1 and ML2 may be coupled to be conductive with each other between intermediate portions of the thin wire segments Ua in the conductive thin wire ML1 and intermediate portions of the thin wire segments Ub in the conductive thin wire ML2, for example.

The conductive thin wire ML includes the thin wire segments Ua and the thin wire segments Ub. Each of the thin wire segments Ua is a pattern that is made of a conductive material and extends making an angle with respect to the pixel arrangement direction Dy, and includes a first end Ua1 and a second end Ua2. In a similar manner, each of the thin wire segments Ub is a pattern that is made of a conductive material and extends in a direction different from the extending direction of the thin wire segment Ua, and includes a first end Ub1 and a second end Ub2. The second end Ua2 of the thin wire segment Ua and the first end Ub1 of the thin wire segment Ub are coupled to each other while the first end Ua1 of the thin wire segment Ua and the second end Ub2 of the thin wire segment Ub are coupled to each other. As a result, the thin wire segments Ua and Ub are conductive with each other.

The coupling between the second end Ua2 of the thin wire segment Ua and the first end Ub1 of the thin wire segment Ub forms a bent portion TDC of the conductive thin wire ML. Thus, the thin wire segments Ua and Ub are bent at a predetermined angle at each bent portion TDC. For example, the thin wire segments Ua and Ub of the conductive thin wire ML according to the first modification of the basic example have the same length. The degree of the angle made between the extending direction of the thin wire segment Ua and the pixel arrangement direction Dy is equal to the degree of the angle made between the extending direction of the thin wire segment Ub and the pixel arrangement direction Dy. The conductive thin wire ML changes the direction of bending in a pixel orthogonal direction Dx at each bent portion TDC.

The dummy electrode TDD includes the thin wire segments Uc and Ud. The thin wire segments Uc are arranged parallel to the thin wire segments Ua while the thin wire segments Ud are arranged parallel to the thin wire segments Ub. The thin wire segments Uc and Ud are arranged such that a surrounded area mesh2, which is surrounded by two thin wire segments Uc and two thin wire segments Ud, has the same area as the surrounded area mesh1. This structure reduces the difference in level of the light-shielding effect between the areas in which the touch detection electrodes TDL are arranged and areas in which the touch detection electrodes TDL are not arranged. As a result, the display apparatus 1 with the touch detection function can reduce the chance of the touch detection electrodes TDL being easily visible.

The display device with the touch detection function according to the first modification of the basic example thus structured can increase probability of the touch detection even if one of the conductive thin wires ML1 and ML2 becomes partly thinner and unreliable in conductivity because the conductive thin wire is coupled to the other conductive thin wire at the intersections TDX.

Second Modification of Basic Example

Figure 16:
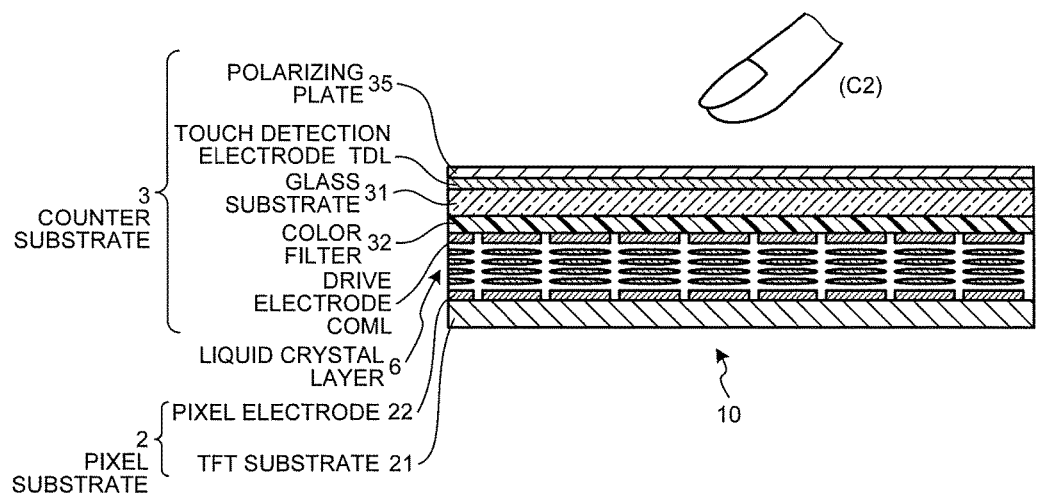
FIG. 16 is a cross-sectional view illustrating a schematic cross-sectional structure of a display device with a touch detection function according to a second modification of the basic example.

FIG. 16 is a cross-sectional view illustrating a schematic cross-sectional structure of a display device with a touch detection function according to a second modification of the basic example. The display apparatus 1 with the touch detection function according to the basic example can be the display device 10 with the touch detection function that is configured by integrating the liquid crystal display device 20 using a liquid crystal of various modes such as FFS and IPS modes and the touch detection device 30. The display device 10 with the touch detection function according to the second modification of the basic example illustrated in FIG. 16 may be configured by integrating a liquid crystal of various modes such as twisted nematic (TN), vertical alignment (VA), and electrically controlled birefringence (ECB) modes, and the touch detection device.

2. First Embodiment

Configuration Example

Overall Configuration Example

Figure 17:
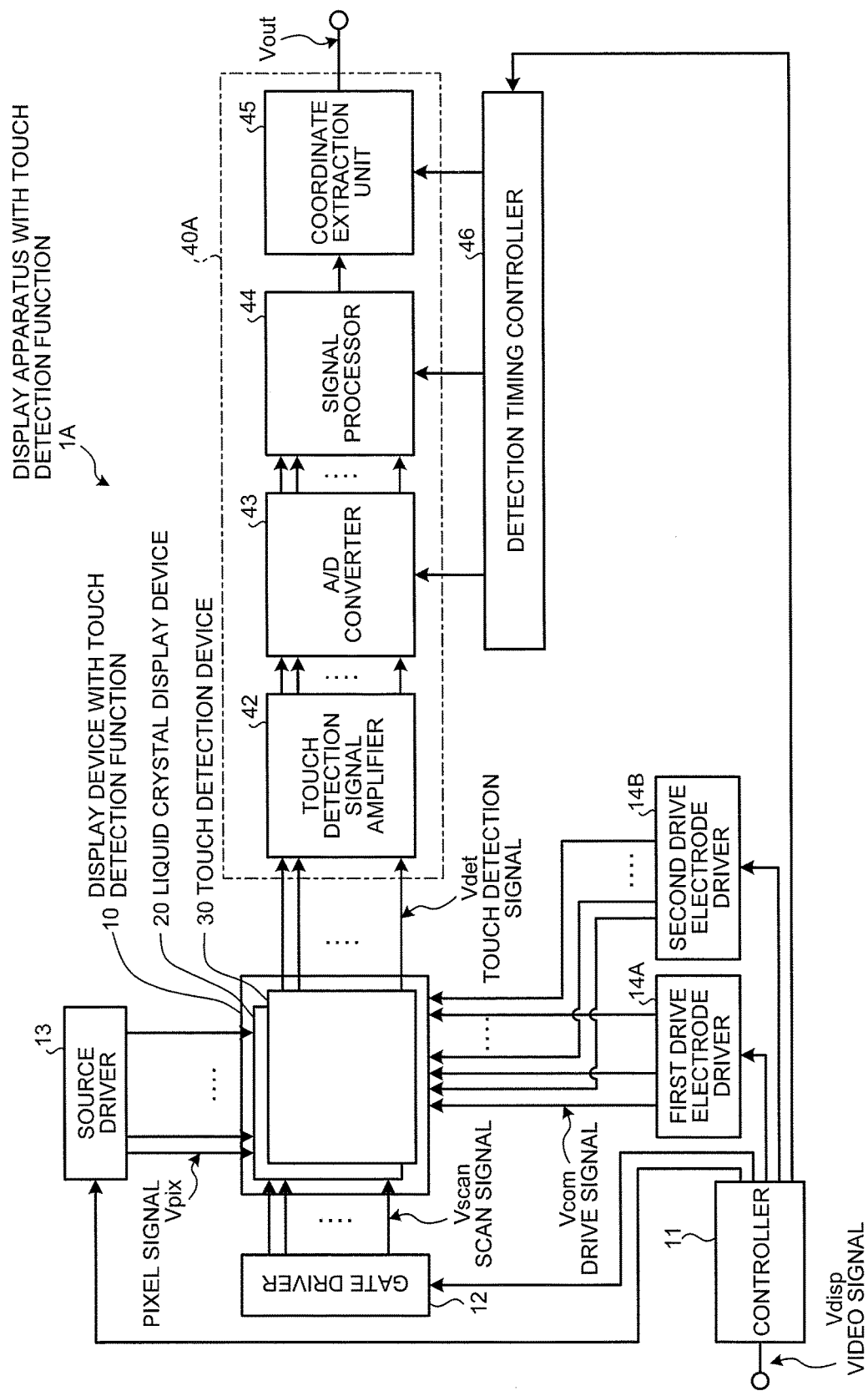
FIG. 17 is a block diagram illustrating an example of a configuration of a display apparatus with a touch detection function according to a first embodiment.

FIG. 17 is a block diagram illustrating an example of a configuration of a display apparatus with a touch detection function according to a first embodiment of the disclosure. A display apparatus 1A with the touch detection function includes a display device 10A with the touch detection function, the controller 11, the gate driver 12, the source driver 13, a first drive electrode driver 14A, a second drive electrode driver 14B, and a touch detection unit 40A. In the display apparatus 1A with the touch detection function, the display device 10A with the touch detection function is a display device having a touch detection function built therein. The display device 10A with the touch detection function is an in-cell type device in which the liquid crystal display device 20 using a liquid crystal element as a display element and a capacitance type touch detection device 30A are integrated. The display device 10A with the touch detection function may be a device in which the capacitance type touch detection device 30A is attached onto the liquid crystal display device 20 using the liquid crystal element as the display element. The liquid crystal display device 20 may be an organic electroluminescence (EL) display device.

The display apparatus 1A with the touch detection function operates in the touch detection period and the display period (refer to FIG. 12) as described above. In the touch detection period, the display apparatus 1A with the touch detection function performs the touch detection on the basis of the mutual capacitance between the drive electrode COML and the touch detection electrodes TDL, as described above. This technique is also referred to as a mutual capacitance method. In the display period, the display apparatus 1A with the touch detection function performs the touch detection on the basis of the mutual capacitance between first group electrodes and second group electrodes, which are grouped from the touch detection electrodes TDL. This structure makes it possible for the display apparatus 1A with the touch detection function to perform the touch detection even in the display period, thereby making it possible to increase responsiveness to the touch and increase a degree of freedom in touch input operation.

Figure 18:
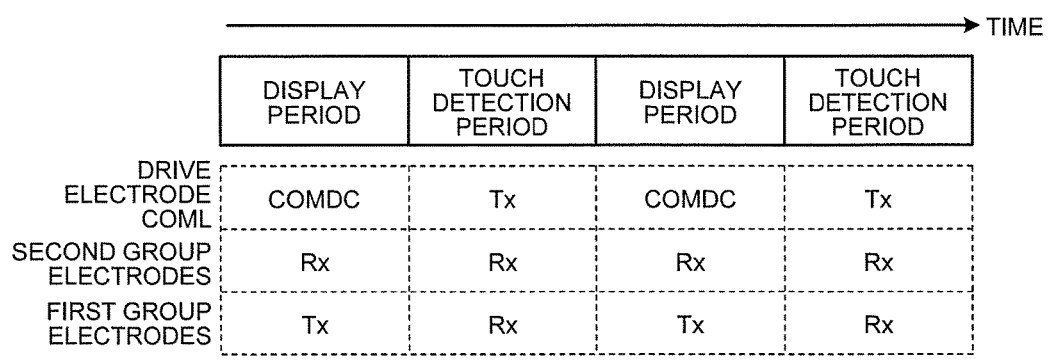
FIG. 18 is a schematic diagram illustrating a brief overview of timing of signals supplied to the drive electrodes, first group electrodes, and second group electrodes in a display period and a touch detection period.

FIG. 18 is a schematic diagram illustrating a brief overview of timing of signals supplied to the drive electrodes, the first group electrodes, and the second group electrodes in the display and touch detection periods. In FIG. 18, the display period and the touch detection period are illustrated uninterruptedly. A period in which neither operation is performed may be present between the display and the touch detection periods.

In the display period, the first drive electrode driver 14A supplies the direct current potential Vcomd (COMDC) for display to the drive electrode COML. As a result, the display apparatus 1A with the touch detection function performs the image display. In the touch detection period, the first drive electrode driver 14A supplies the drive signal Vcomt (Tx) for touch detection to the drive electrode COML. As a result, the display apparatus 1A with the touch detection function performs the touch detection on the basis of the mutual capacitance between the drive electrode COML and the touch detection electrodes TDL.

In the display period, the second drive electrode driver 14B supplies the drive signal Vcomt (Tx) for touch detection to the first group electrodes out of the electrodes of two groups included in the touch detection electrodes TDL. As a result, the display apparatus 1A with the touch detection function performs the touch detection by detecting the touch detection signal Vdet (Rx) output from the second group electrodes via capacitance generated between the first group electrodes and the second group electrodes. The second drive electrode driver 14B does not operate in the touch detection period and supplies no signal to the first group electrodes.

Touch Detection Device

Figure 19:
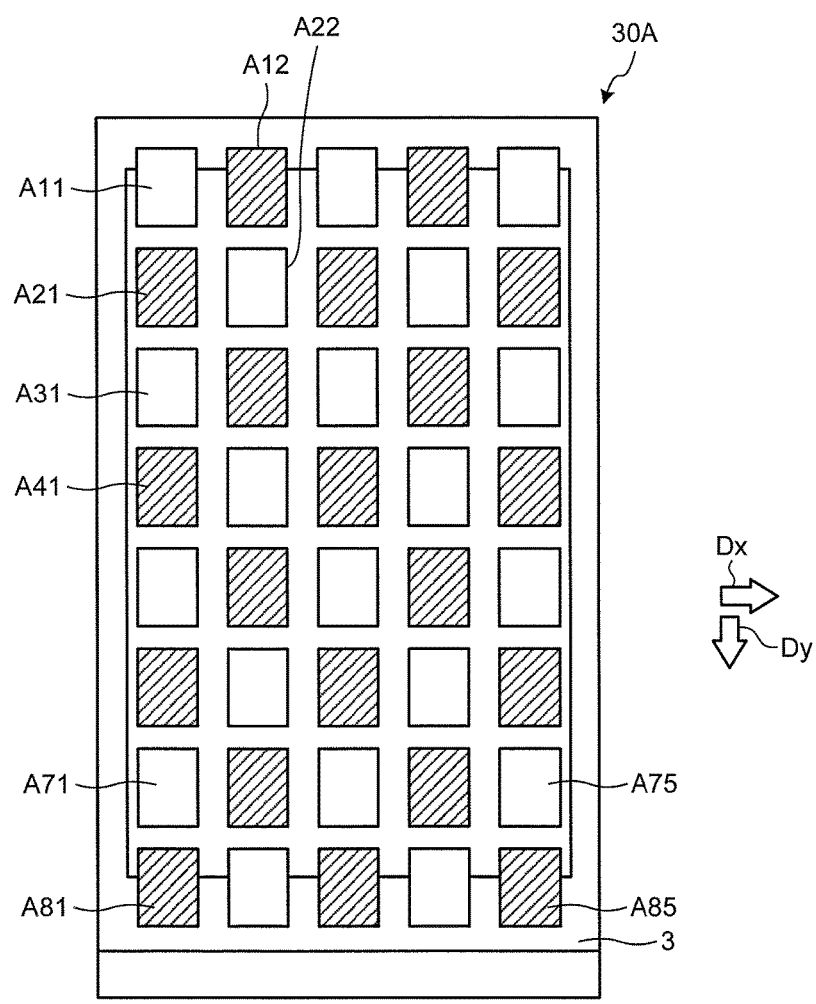
FIG. 19 is a schematic plan view of the touch detection device viewed from a direction orthogonal to a principal surface of the touch detection device in the display period.

The following describes a configuration example of the touch detection device 30A in detail. FIG. 19 is a schematic plan view of the touch detection device viewed from a direction orthogonal to the principal surface of the touch detection device in the display period. On the counter substrate 3 of the touch detection device 30A, a plurality of small electrode portions A11, A21, . . . , and A85 are formed in a matrix of 8 rows in the pixel arrangement direction Dy (extending direction of the signal lines SGL) and 5 columns in the direction Dx (extending direction of the scan lines GCL) orthogonal to the pixel arrangement direction. The small electrode portions correspond to the touch detection electrodes TDL. In the embodiment, the small electrode portions are formed in a matrix of 8 rows and 5 columns. The number of small electrode portions is not limited to the example. The small electrode portions may be formed in a larger number than that of the example. In the embodiment, the small electrode portions are formed in a matrix. The arrangement is not limited to the example. For example, each row may be shifted from the adjacent row in the direction Dx or each column may be shifted from the adjacent column in the direction Dy.

The small electrode portions are grouped into the first group electrodes and the second group electrodes. The first group electrodes are composed of the small electrode portions A11, A31, . . . , A71, A22, . . . , and A75. The second group electrodes are composed of the small electrode portions A21, A41, . . . , A81, A12, . . . , and A85. In this manner, the first group electrodes and the second group electrodes form a checkerboard pattern on the counter substrate 3. In the embodiment, the first group electrodes and the second group electrodes form a checkerboard pattern on the counter substrate 3. The arrangement pattern is not limited to the example. Preferably, the number of small electrode portions included in the first group electrodes and the number of small electrode portions included in the second group electrodes are about the same number.

Figure 20:
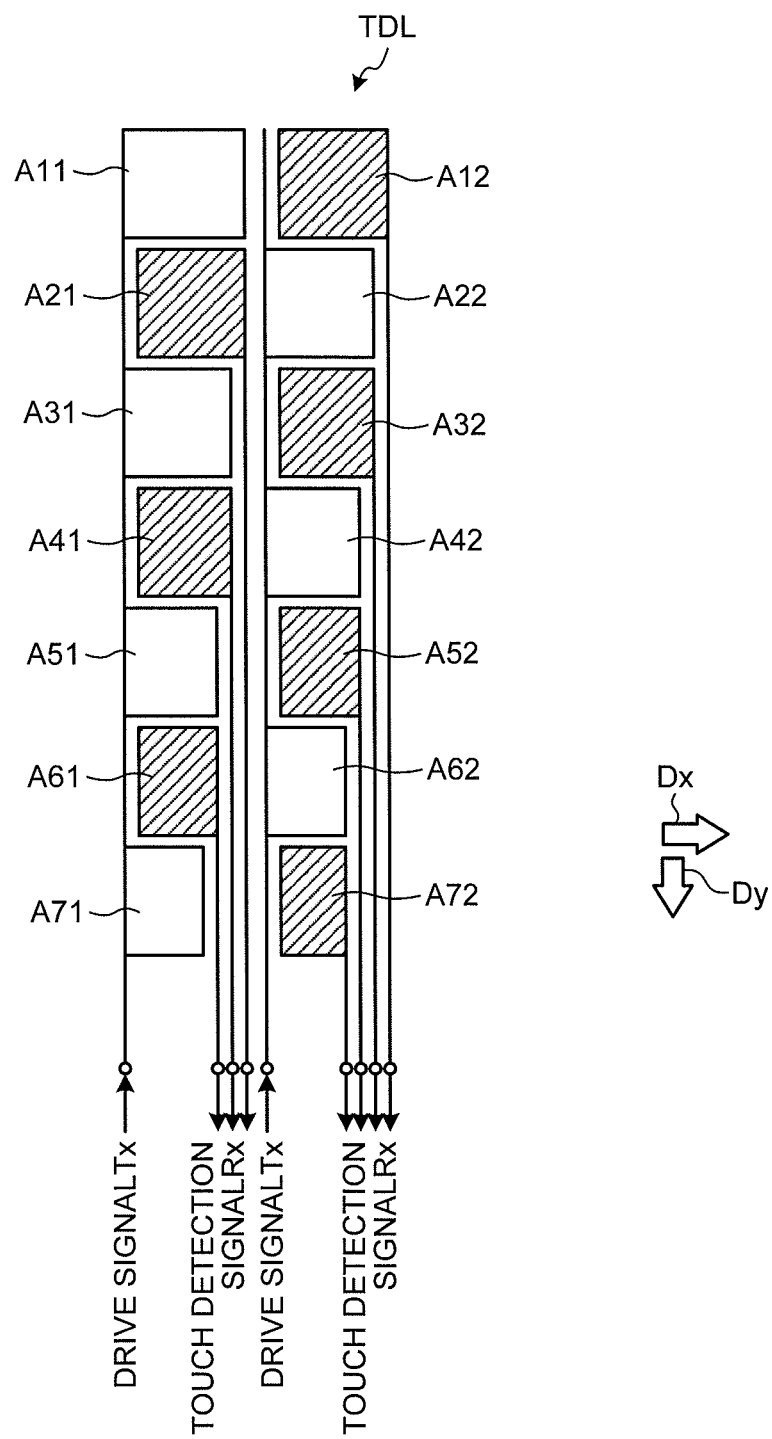
FIG. 20 is a schematic plan view illustrating a part of the touch detection device in the display period.

FIG. 20 is a schematic plan view illustrating a part of the touch detection device in the display period. In the display period, the second drive electrode driver 14B supplies the drive signal Tx to the small electrode portions A11, A31, A51, A71, A22, A42, and A62 grouped as the first group electrodes. The drive signal Tx is transmitted to the small electrode portions A21, A41, A61, A12, A32, A52, and A72 grouped as the second group electrodes via capacitance generated between the first group electrodes and the second group electrodes. As a result, the touch detection signal Rx (Vdet) is output from the second group electrodes to the touch detection signal amplifier 42. The waveform of the touch detection signal Rx in the display detection period corresponds to the touch detection signal Vdet in the above-described basic principle of touch detection. The A/D converter 43 performs the touch detection by A/D-converting the touch detection signal Rx in the display detection period. The first group electrodes correspond to the drive electrode E1 in the above-described basic principle of touch detection while the second group electrodes correspond to the touch detection electrode E2. The touch detection device 30A detects the touch in accordance with the basic principle in the display period. The position where the external proximate object is in contact with or in proximity of the touch detection device can be detected by individually amplifying, A-D converting, and signal processing the touch detection signal Rx output from each of the small electrode portions A21, A41, A61, A12, A32, A52, and A72 grouped as the second group electrodes.

Figure 21:
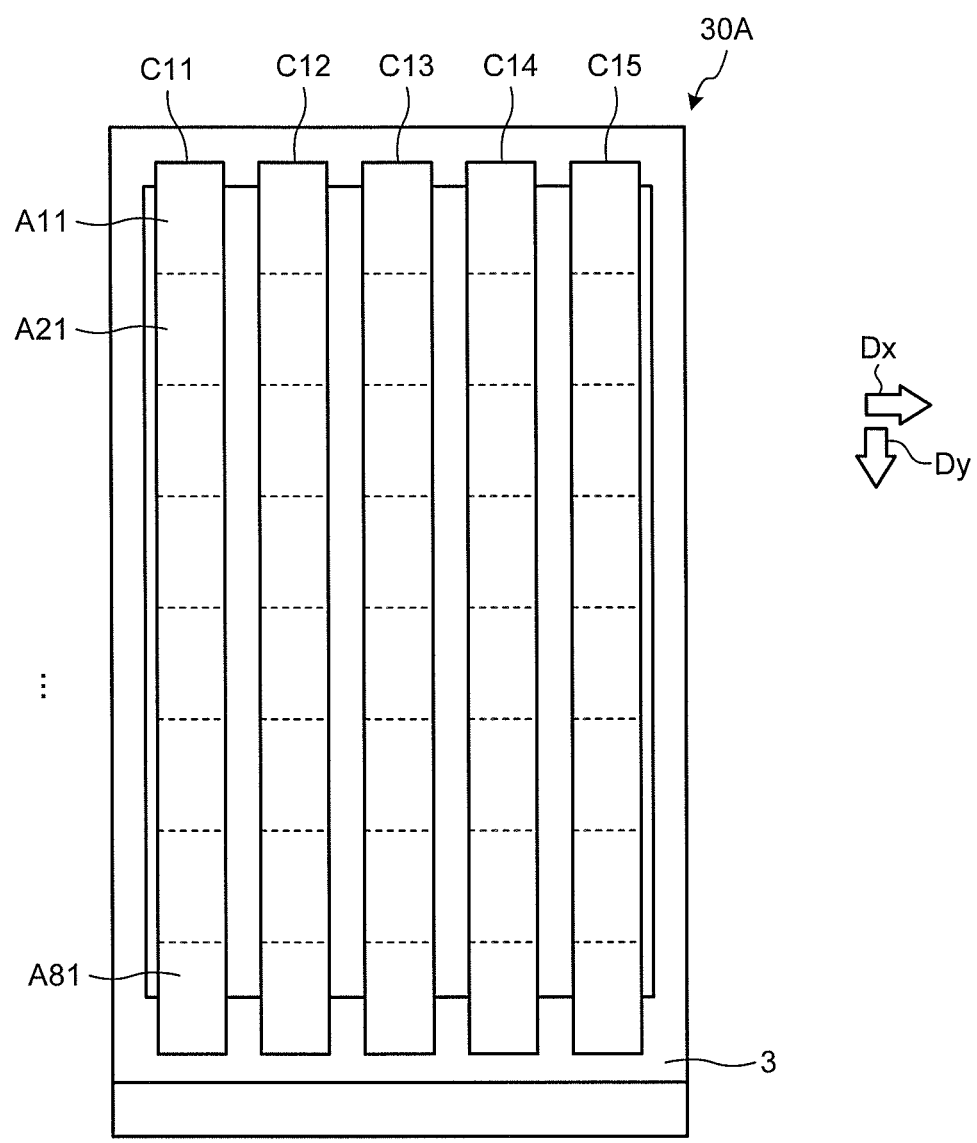
FIG. 21 is a schematic plan view of the touch detection device viewed from the direction orthogonal to the principal surface of the touch detection device in the touch detection period.

FIG. 21 is a schematic plan view of the touch detection device viewed from the direction orthogonal to the principal surface of the touch detection device in the touch detection period. In the touch detection period, the small electrode portions A11, A21, . . . , and A81 of the first column form a virtual touch detection electrode C11 extending in the direction Dy. In a similar manner, the small electrode portions of the second column form a virtual touch detection electrode C12 extending in the direction Dy, the small electrode portions of the third column form a virtual touch detection electrode C13 extending in the direction Dy, the small electrode portions of the fourth column form a virtual touch detection electrode C14 extending in the direction Dy, and the small electrode portions of the fifth column form a virtual touch detection electrode C15 extending in the direction Dy. The touch detection electrodes C11 to C15 correspond to the touch detection electrodes TDL.

Figure 22:
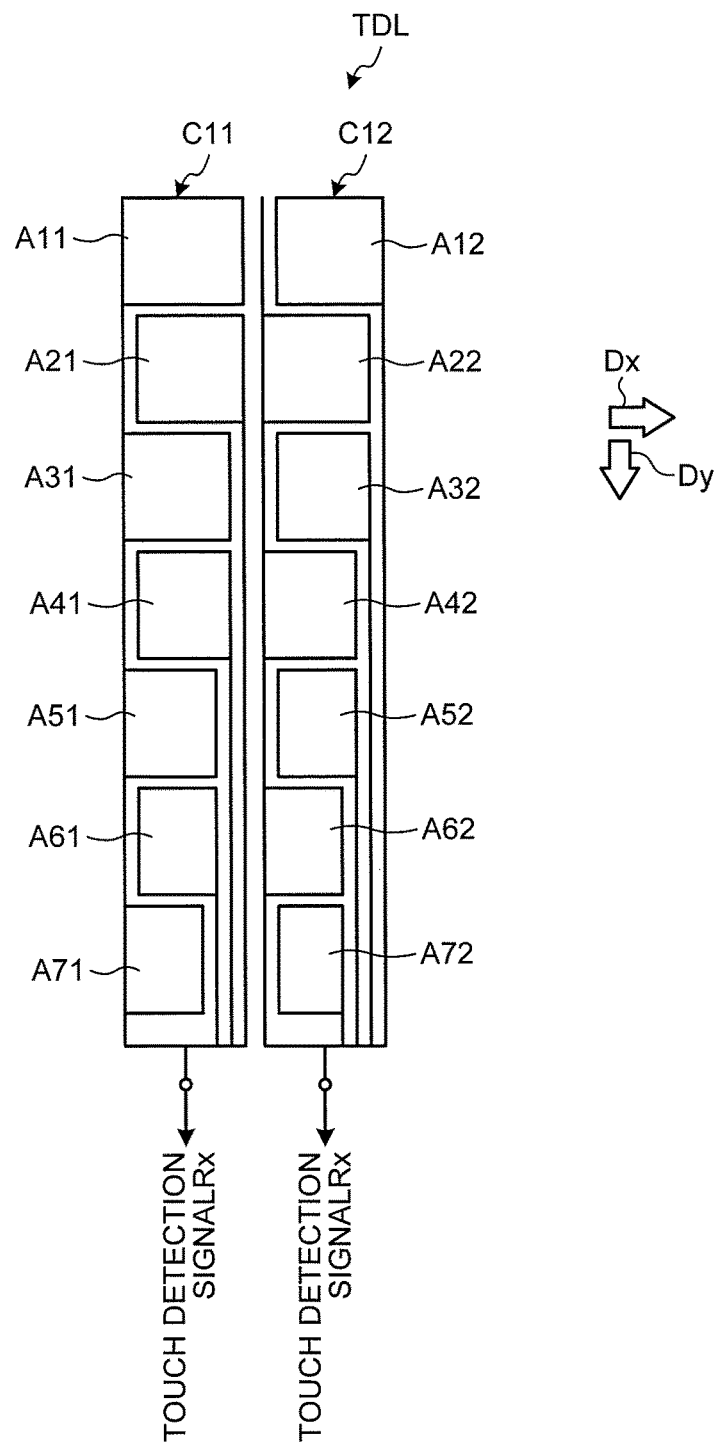
FIG. 22 is a schematic plan view illustrating a part of the touch detection device in the touch detection period.

FIG. 22 is a schematic plan view illustrating a part of the touch detection device in the touch detection period. The small electrode portions A11, A21, A31, A41, A51, A61, and A71, which are arranged in the first column, are electrically coupled and form the virtual touch detection electrode C11 extending in the direction Dy in the touch detection period. In a similar manner, the small electrode portions A12, A22, A32, A42, A52, A62, and A72, which are arranged in the second column, are electrically coupled and form the virtual touch detection electrode C12 extending in the direction Dy in the touch detection period. In the touch detection period, capacitance is generated between the touch detection electrodes C11 and C12 and the drive electrode COML, which is apart from the touch detection electrodes C11 and C12 in a direction orthogonal to the principal surface of the touch detection device and intersects the touch detection electrodes C11 and C12 (refer to FIGS. 9, 11, and 16).

As described above, the drive electrode COML functions as the drive electrode of the liquid crystal display device 20 and also functions as the drive electrode of the touch detection device 30A. Referring to FIG. 9, the drive electrode COML faces the pixel electrodes 22 in the direction orthogonal to the surface of the TFT substrate 21. The touch detection device 30A is composed of the drive electrodes COML provided on the pixel substrate 2 and the touch detection electrodes TDL (the touch detection electrodes C11 to C15) provided on the counter substrate 3. Referring to FIG. 11, the touch detection electrodes TDL are composed of the stripe electrode patterns (the touch detection electrodes C11 to C15) extending in a direction intersecting the extending direction of the electrode patterns of the drive electrodes COML. The touch detection electrodes TDL face the drive electrodes COML in the direction orthogonal to the surface of the TFT substrate 21. The electrode patterns (the touch detection electrodes C11 to C15) of the touch detection electrodes TDL are coupled to the respective corresponding inputs of the touch detection signal amplifier 42 of the touch detection unit 40A. Capacitance is generated between the drive electrodes COML and the electrode patterns of the touch detection electrodes TDL intersecting with one another at respective intersecting portions of the electrode patterns of the drive electrodes COML and the touch detection electrodes TDL.

On the basis of the structure described above, for each touch detection period, the first drive electrode driver 14A of the touch detection device 30A drives the drive electrode block such that one of the drive electrode blocks is scanned in a time-division manner, thereby sequentially scanning the electrode blocks line by line. The detection blocks of the drive electrodes COML thus are sequentially selected in the scan direction Scan block by block. The touch detection signal Rx (Vdet) is output from the touch detection electrodes TDL (the touch detection electrodes C11 to C15). This is how the touch detection device 30A performs the touch detection for one detection block. The drive electrode block corresponds to the drive electrode E1 in the above-described basic principle of touch detection while the touch detection electrodes TDL (the touch detection electrodes C11 to C15) correspond to the touch detection electrode E2. The touch detection device 30A detects the touch in accordance with the basic principle in the touch detection period. As illustrated in FIG. 11, the electrode patterns intersecting with one another form capacitive touch sensors in a matrix. The touch detection device 30A thus can also detect the position where the external proximate object is in contact with or in proximate of the touch detection device by scanning the entire touch detection surface of the touch detection device 30A.

The coupling between the respective small electrode portions and the first drive electrode driver 14A, the respective small electrode portions and the second drive electrode driver 14B, or the coupling between the respective small electrode portions and the touch detection signal amplifier 42 may be switched by switching elements under the control of the controller 11. The switching elements may be provided on the wiring between the respective small electrode portions and the first drive electrode driver 14A, the second drive electrode driver 14B, or the touch detection signal amplifier 42. Alternatively, the coupling may be switched by output stages (output buffers) of the first drive electrode driver 14A and the second drive electrode driver 14B, and an input stage (input buffer) of the touch detection signal amplifier 42.

Arrangement of Touch Detection Electrodes

Figure 23:
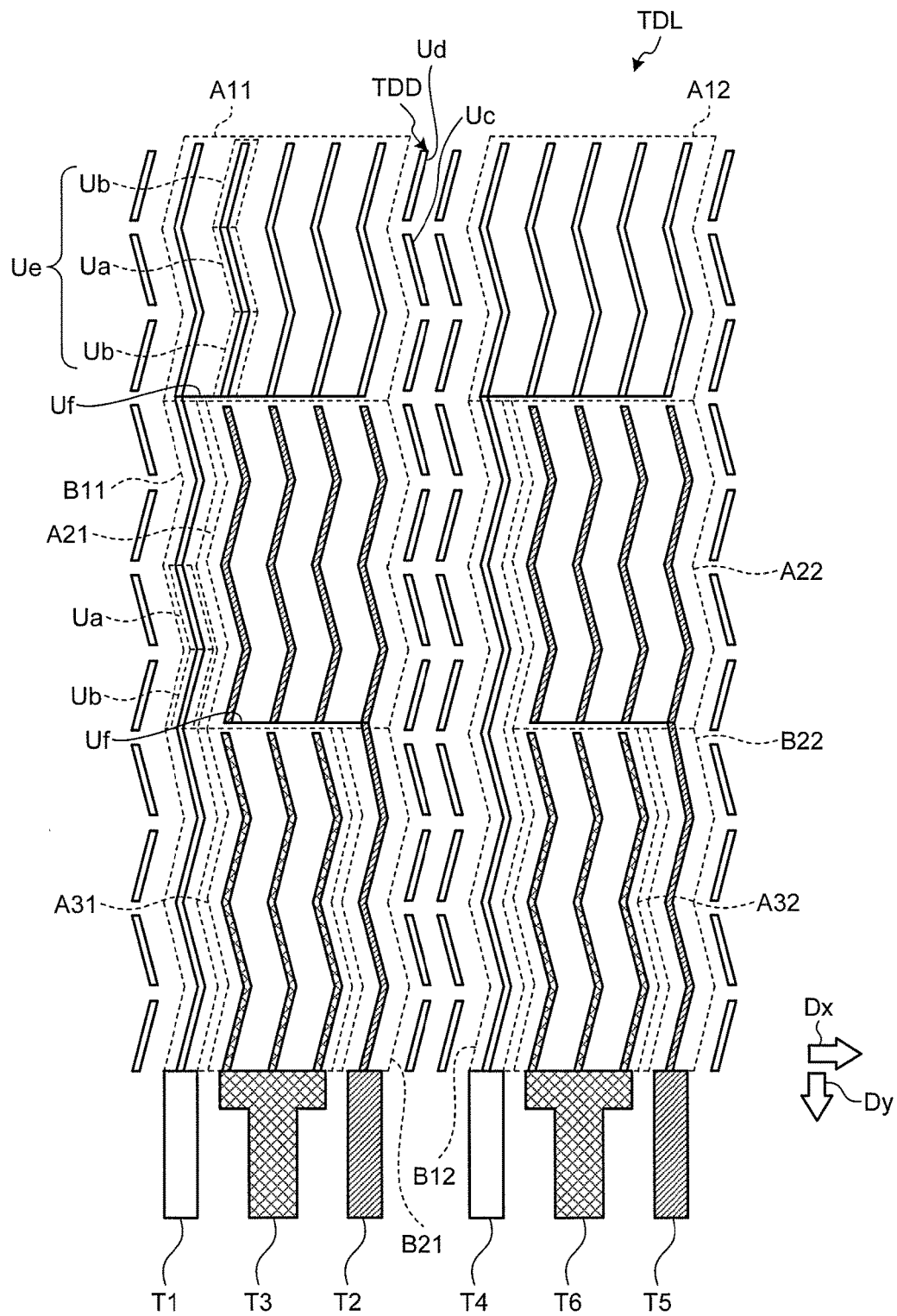
FIG. 23 is a schematic diagram illustrating an example of an arrangement of the touch detection electrodes.

FIG. 23 is a schematic diagram illustrating an example of the arrangement of the touch detection electrodes. The same constituent elements as the basic example are labeled with the same reference numerals, and duplicated descriptions thereof are omitted.

As illustrated in FIG. 23, each of the touch detection electrodes TDL includes the small electrode portions A11, A21, A31, A12, A22, and A32. The small electrode portion A11 includes a plurality of conductive thin wires Ue extending in the pixel arrangement direction Dy (extending direction of the signal lines SGL) in a plane parallel to the counter substrate 3. Each of the conductive thin wires Ue is composed of the thin wire segments Ua and Ub that are arranged and coupled to one another in the direction Dy. The shapes of the thin wire segments Ua and Ub are symmetric with a straight line parallel to the direction Dy as an axis of symmetry, for example. The conductive thin wires Ue are provided in the direction Dx (extending direction of the scan lines GCL) orthogonal to the pixel arrangement direction with a space between each other. The space (pitch) between the adjacent conductive thin wires Ue in the direction Dx is constant, for example. The extending direction of the conductive thin wires Ue is a direction of a straight line connecting one end and the other end of the conductive thin wire Ue. The extending direction of the conductive thin wires Ue may be the longitudinal direction of the conductive thin wire Ue. Each of the conductive thin wires Ue is a zigzag line or a wavy line. The respective ends in the direction Dy of the conductive thin wires Ue are coupled to one another by a thin wire segment Uf extending in the direction Dx. In the embodiment, the thin wire segment Uf is provided at the ends of the conductive thin wires Ue. The thin wire segment Uf is however not limited to being provided at the ends. The thin wire segment Uf may be provided at a portion other than the ends of the conductive thin wires Ue, e.g., at the central portions of the conductive thin wires Ue. The small electrode portions A21, A31, A12, A22, and A32 also have the same structure as the small electrode portion A11.

The small electrode portion A11 is coupled to a terminal T1 formed on a frame of the touch detection device 30A by a wiring portion B11 extending from the small electrode portion A11 to the frame outside the display area in the direction Dy. The wiring portion B11 is formed by the thin wire segments Ua and Ub that are alternately arranged and coupled to one another in the direction Dy. The space between the wiring portion B11 and the conductive thin wire included in each of the small electrode portions A21 and A31 is the same as the space between the conductive thin wires Ue. The small electrode portion A21 is coupled to a terminal T2 formed on the frame of the touch detection device 30A by a wiring portion B21 extending from the small electrode portion A21 to the frame outside the display area in the direction Dy. The wiring portion B21 is formed by the thin wire segments Ua and Ub that are alternately arranged and coupled to one another in the direction Dy. The space between the wiring portion B21 and the conductive thin wire included in the small electrode portion A31 is the same as the space between the conductive thin wires Ue.

The small electrode portion A12 is coupled to a terminal T4 formed on the frame of the touch detection device 30A by a wiring portion B12 extending from the small electrode portion A12 to the frame in the direction Dy. The wiring portion B12 is formed by the thin wire segments Ua and Ub that are alternately arranged and coupled to one another in the direction Dy. The space between the wiring portion B12 and the conductive thin wire included in each of the small electrode portions A22 and A32 is the same as the space between the conductive thin wires Ue. The small electrode portion A22 is coupled to a terminal T5 formed on the frame of the touch detection device 30A by a wiring portion B22 extending from the small electrode portion A22 to the frame in the direction Dy. The wiring portion B22 is formed by the thin wire segments Ua and Ub that are alternately arranged and coupled to one another in the direction Dy. The space between the wiring portion B22 and the conductive thin wire included in the small electrode portion A32 is the same as the space between the conductive thin wires Ue. As a result, the difference in light-shielding effect between the area in which the small electrode portions are arranged and the area in which the wiring portions are arranged becomes small, thereby making it possible to reduce the chance of the touch detection electrode TDL being visually recognized.

The conductive thin wires Ue included in the small electrode portion A31 are directly coupled to a terminal T3 formed on the frame of the touch detection device 30A without the wiring portion because the small electrode portion A31 is located at the end of the display area Ad. In a similar manner, the conductive thin wires Ue included in the small electrode portion A32 are directly coupled to a terminal T6 formed on the frame of the touch detection device 30A without the wiring portion because the small electrode portion A32 is located at the end of the display area Ad.

The thin wire segments Ua, Ub and Uf preferably have a width in the range from 3 μm to 10 μm. The thin wire segments Ua, Ub and Uf having a width smaller than 10 μm reduce the area of an opening covered by the thin wire segments Ua, Ub and Uf in the display area Ad but not being covered by a black matrix or the scan lines GCL and signal lines SGL, allowing light to be transmitted. As a result, the chance of an opening rate being decreased is reduced. The thin wire segments Ua, Ub and Uf having a width larger than 3 μm stabilize the shapes of the thin wire segments Ua and Ub and reduce the chance of disconnection thereof.

The thin wire segments Ua, Ub and Uf are of an electrically conductive metal material, and are formed of a metal material, such as aluminum (Al), copper (Cu), silver (Ag), molybdenum (Mo), chromium (Cr), tungsten (W), or an alloy of these metals. Alternatively, the thin wire segments Ua, Ub and Uf are formed of an oxide (metal oxide) of aluminum (Al), copper (Cu), silver (Ag), molybdenum (Mo), chromium (Cr), or tungsten (W), and have electric conductivity. The thin wire segments Ua, Ub, and Uf may be a patterned laminated body that has one or more layers of the above-described metal materials and/or the above-described metal oxides. The thin wire segments Ua, Ub, and Uf may be a patterned laminated body that has one or more layers of the metal materials or the metal oxides described above, and/or a translucent conductive oxide such as ITO as a material of translucent electrodes. The thin wire segments Ua, Ub, and Uf have a lower resistance than that of the translucent conductive oxide such as ITO as a material of translucent electrodes. The material of the thin wire segments Ua, Ub, and Uf has a lower transmittance value than that of a material of ITO having the same film thickness. For example, the material of the thin wire segments Ua, Ub, and Uf may have a transmittance value of 10% or less.

As illustrated in FIG. 23, the column including the small electrode portions A11, A21, and A31 and the column including the small electrode portions A12, A22, and A32 are disposed with a certain space therebetween. Areas in which the conductive thin wires Ue of the touch detection electrode TDL are arranged and areas in which the conductive thin wires Ue of the touch detection electrode TDL are not arranged have different levels of light-shielding effect from each other. This can cause the touch detection electrode TDL to be easily visible. Therefore, dummy electrodes TDD that are not coupled to the terminals T1 to T6 are each arranged between the adjacent columns of the small electrode portions on the counter substrate 3. The dummy electrodes TDD are formed of the same material as the conductive thin wires Ue of the touch detection electrodes TDL. The dummy electrodes TDD may be formed of another material as long as the dummy electrodes TDD have a level of the light-shielding effect comparable with that of the touch detection electrode TDL. The dummy electrodes TDD are formed in the same layer as the touch detection electrodes TDL. This structure makes it possible to form the dummy electrodes TDD and the touch detection electrode TDL in the same processing step, thereby making it possible to reduce the number of manufacturing steps.

The dummy electrode TDD illustrated in FIG. 23 includes the multiple thin wire segments Uc and Ud extending in a plane parallel to the counter substrate 3. The thin wire segments Uc and Ud are not coupled to the terminals T1 to T6. The thin wire segments Uc and Ua have about the same shape. The thin wire segments Ud and Ub have about the same shape. The thin wire segments Uc are arranged parallel to the thin wire segments Ua, and the thin wire segments Ud are arranged parallel to the thin wire segments Ub. The space between the adjacent thin wire segments Uc in the direction Dx is constant, for example, and is the same as the space between the adjacent conductive thin wires Ue in the direction Dx. The space between the thin wire segments Ua and Uc adjacent to each other in the direction Dx is constant, for example, and is the same as the space between the adjacent conductive thin wires Ue in the direction Dx. The space between the adjacent thin wire segments Ud in the direction Dx is constant, for example, and is the same as the space between the adjacent conductive thin wires Ue in the direction Dx. The space between the thin wire segments Ub and Ud adjacent to each other in the direction Dx is constant, for example, and is the same as the space between the adjacent conductive thin wires Ue in the direction Dx. As a result, the difference in light-shielding effect between the area in which the touch detection electrode TDL is arranged and area in which the touch detection electrode TDL is not arranged become a small, thereby making it possible to reduce the chance of the touch detection electrode TDL being visually recognized.

A slit is provided between each of the thin wire segments Uc and Ud. The material of the thin wire segments Ua, Ub, and Uf is not present in the slit. As a result, each slit prevents the electrical conduction between the portions making different angles with respect to the extending direction of the thin wire segments Uc and Ud, thereby generating a difference in capacitance from the touch detection electrode TDL. When a finger approaches both the touch detection electrode TDL and the dummy electrode TDD in the touch detection, an influence of the dummy electrode TDD on the absolute value |ΔV| illustrated in FIG. 6 can be reduced. In this manner, the slits split the dummy electrode TDD into portions having a smaller area than that of the conductive thin wire Ue of the touch detection electrode TDL, thereby making it possible to reduce the influence of the dummy electrode TDD on the touch detection accuracy. The thin wire segments Uc and Ud are divided by the slits. Alternatively, a pair of thin wire segments Uc and Ud may be coupled as a conductive thin wire, and a plurality of conductive thin wires may be arranged in the direction Dy with a space between each other.

The relation between the conductive thin wires Ue and the color regions 32R, 32G, and 32B can be set to that described with reference to FIG. 14. The conductive thin wires Ue in the embodiment correspond to the conductive thin wires ML of FIG. 14.

Referring to FIG. 14, the display area Ad includes the multiple pixels Pix, each of which includes a set of the color regions 32R, 32G, and 32B that correspond to the respective sub pixels SPix. The pixels Pix are arranged in a matrix along the direction Dx parallel to the scan lines GCL and the direction Dy parallel to the signal lines SGL. The respective color regions are formed in columns extending parallel to the signal lines SGL. The color region orthogonal direction Dx is orthogonal to the extending direction of the respective color regions. The width of each of the respective color regions 32R, 32G, and 32B in the color region orthogonal direction Dx is the color region width d.

The conductive thin wires ML (Ue) overlap with the display area Ad when viewed from a direction orthogonal to the surface of the display area Ad. The conductive thin wires ML (Ue) are arranged such that the conductive thin wire space P is smaller than the sum of the length b between the bent portions and the color region width d. In other words, the conductive thin wires ML (Ue) are arranged such that the following expression (1) is satisfied.

$$P < b + d \qquad (1)$$

The conductive thin wire space P is preferably equal to or larger than the length b between the bent portions. In other words, the conductive thin wires ML (Ue) are preferably arranged such that the following expression (2) is satisfied.

$$b \leq P \qquad (2)$$

The conductive thin wire space P is preferably equal to or smaller than 160 μm. In other words, the conductive thin wires ML (Ue) are preferably arranged such that the following expression (3) is satisfied. When the conductive thin wire space P is equal to or smaller 160 μm, the chance of the conductive thin wires ML (Ue) being recognized is decreased due to the human eye resolution performance, and thus the conductive thin wires ML are hardly visually recognized.

$$P \leq 160 \ \mu m \qquad (3)$$

The glass substrate 31 corresponds to a specific example of a "substrate" in the present disclosure. The pixel Pix corresponds to a specific example of a "pixel" in the present disclosure. The display area Ad corresponds to a specific example of a "display area" in the present disclosure. The small electrode portions A11 to A85 correspond to a specific example of the "small electrode portions" in the present disclosure. The small electrode portions A11, A31, ..., and A75 correspond to a specific example of the "first group electrodes" in the present disclosure. The small electrode portions A21, A41, ..., and A85 correspond to a specific example of the "second group electrodes" in the present disclosure. The terminals T1 to T6 correspond to a specific example of the "terminal" in the present disclosure. The wiring portions B11, B21, B22, and B12 correspond to a specific example of the "wiring portions" in the present disclosure. The thin wire segment Ua corresponds to a specific example of the "first thin wire segment" in the present disclosure. The thin wire segment Ub corresponds to a specific example of the "second thin wire segment" in the present disclosure. The conductive thin wires Ue correspond to a specific example of the "conductive thin wires" in the present disclosure. The direction Dy corresponds to a specific example of the "first direction" in the present disclosure. The direction Dx corresponds to a specific example of the "second direction" in the present disclosure. The touch detection electrode TDL corresponds to a specific example of a "touch detection electrode" in the present disclosure. The drive electrode COML corresponds to a specific example of a "drive electrode" in the present disclosure.

As described above, the pixels Pix are arranged in a matrix along the direction Dx parallel to the scan line GCL and the direction Dy parallel to the signal lines SGL. If the scan lines GCL and the signal lines SGL are covered with a black matrix, the black matrix keeps light from transmitting. If the scan lines GCL and the signal lines SGL are not covered with a black matrix, the scan lines GCL and the signal lines SGL keeps light from transmitting. In the present embodiment, a periodic pattern of a plurality of straight lines along the direction Dx parallel to the scan lines GCL is likely to appear in the display area Ad. In addition, a periodic pattern of a plurality of straight lines along the direction Dy parallel to the scan lines GCL readily appears in the display area Ad. Therefore, when the touch detection electrodes TDL are superimposed in a direction orthogonal to a surface of the display area Ad, the patterns appearing in the display area Ad interfere the touch detection electrodes TDL to form a light-dark pattern, whereby the moiré pattern can be seen. In particular, when the conductive thin wires Ue and the wiring portions that are included in the small electrode portions have a linear shape parallel to the scan line GCL or the signal lines SGL, the chance of a moiré pattern being visually recognized is increased. When any of the color regions 32R, 32G, and 32B is shielded by the conductive thin wires Ue from light, a difference in brightness occurs among the color regions. As a result, a moiré pattern may be visually recognized.

As illustrated in FIG. 14, the conductive thin wires ML (Ue) according to the embodiment extend in the same direction as the direction Dy in which the color regions extend in an overall view, and include the portions making an angle with respect to the extending direction in a partial view. The extending direction Dy in which the color regions extend is in parallel with the signal lines SGL. The conductive thin wires Ue are zigzag lines or wavy lines and include the portions making an angle with respect to the scan lines GCL or the signal lines SGL. The display apparatus 1A with the touch detection function according to the embodiment thus can further reduce the chance of the moiré pattern being visually recognized than a case where the conductive thin wires Ue are straight lines parallel to the scan lines GCL or the signal lines SGL.

The conductive thin wires Ue according to the embodiment include portions that cross (overlap) with all of the color columns formed by the color regions 32R, 32G, and 32B in a view from the direction orthogonal to the surface of the display area Ad (refer to FIG. 14). As a result, any specific color region out of the color regions 32R, 32G, and 32B is hardly shielded by the conductive thin wires Ue from light. Consequently, the display apparatus 1A with the touch detection function according to the embodiment hardly causes a difference in brightness among the color regions, thereby making it possible to reduce the chance of the moiré pattern being visually recognized.

All of the conductive thin wires Ue according to the embodiment are formed by the thin wire segments Ua and Ub coupled to one another and arranged such that equation (1) is satisfied. The conductive thin wires Ue are thus arranged in a regular manner, thereby obscuring the respective conductive thin wires Ue. The display apparatus 1A with the touch detection function according to the embodiment thus can cause the conductive thin wires Ue to be hardly visually recognized by users. When the conductive thin wires Ue are arranged such that expression (1) is satisfied, the conductive thin wires Ue consistently include portions that cross (overlap) with all of the color columns formed by the color regions 32R, 32G, and 32B in a view from the direction orthogonal to the surface of the display area Ad. As a result, any specific color region out of the color regions 32R, 32G, and 32B is hardly shielded by the conductive thin wires Ue from light. Consequently, the display apparatus 1A with the touch detection function according to the embodiment hardly causes a difference in brightness among the color regions, thereby making it possible to reduce the chance of the moiré pattern being visually recognized.

In addition, when expression (2) is satisfied, a constant space between the adjacent conductive thin wires Ue is maintained. The conductive thin wires Ue thus reduces the area of an opening that is covered by the conductive thin wires Ue in the display area Ad but not being covered by the black matrix or the scan lines GCL and the signal lines SGL, allowing light to be transmitted. The display apparatus 1A with the touch detection function according to the embodiment can reduce the chance of the opening rate being further decreased.

The angles θR and θL (refer to FIG. 14) are preferably 30 degrees to 40 degrees, or 50 degrees to 60 degrees. An angle made by the conductive thin wire Ue and the scan line GCL and the signal line SGL becomes larger than a certain angle, thereby causing the period of the light-dark pattern to be easily shorten to a degree that makes the conductive thin wires Ue invisible by human eyes. As a result, the chance of the moiré pattern being visually recognized can be reduced.

The wiring portions that couple the small electrode portions and the terminals are each formed by the thin wire segments Ua and Ub coupled to one another in the same manner as the small electrode portions. As a result, the light shielding by the thin wire segments Ua and Ub in the small electrode portions is about the same level as the light shielding by the thin wire segments Ua and Ub in the wiring portions. The display apparatus 1A with the touch detection function according to the embodiment thus can reduce the chance of the moiré pattern, which is due to a difference between the small electrode portions and the wiring portions, being visually recognized.

The display apparatus 1A with the touch detection function can perform the touch detection in the following manner. The touch detection electrodes TDL are grouped into two groups of the first group electrodes and the second group of electrodes. In the display period, the drive signal Tx is supplied to the first group electrodes, and the touch detection signal Rx output from the second group electrodes is detected via capacitance generated between the first group electrodes and the second group of electrodes. This structure makes it possible for the display apparatus 1A with the touch detection function to perform the touch detection even in the display period, thereby making it possible to increase responsiveness to the touch and increase a degree of freedom in touch input operation.

Modification of First Embodiment

Figure 24:
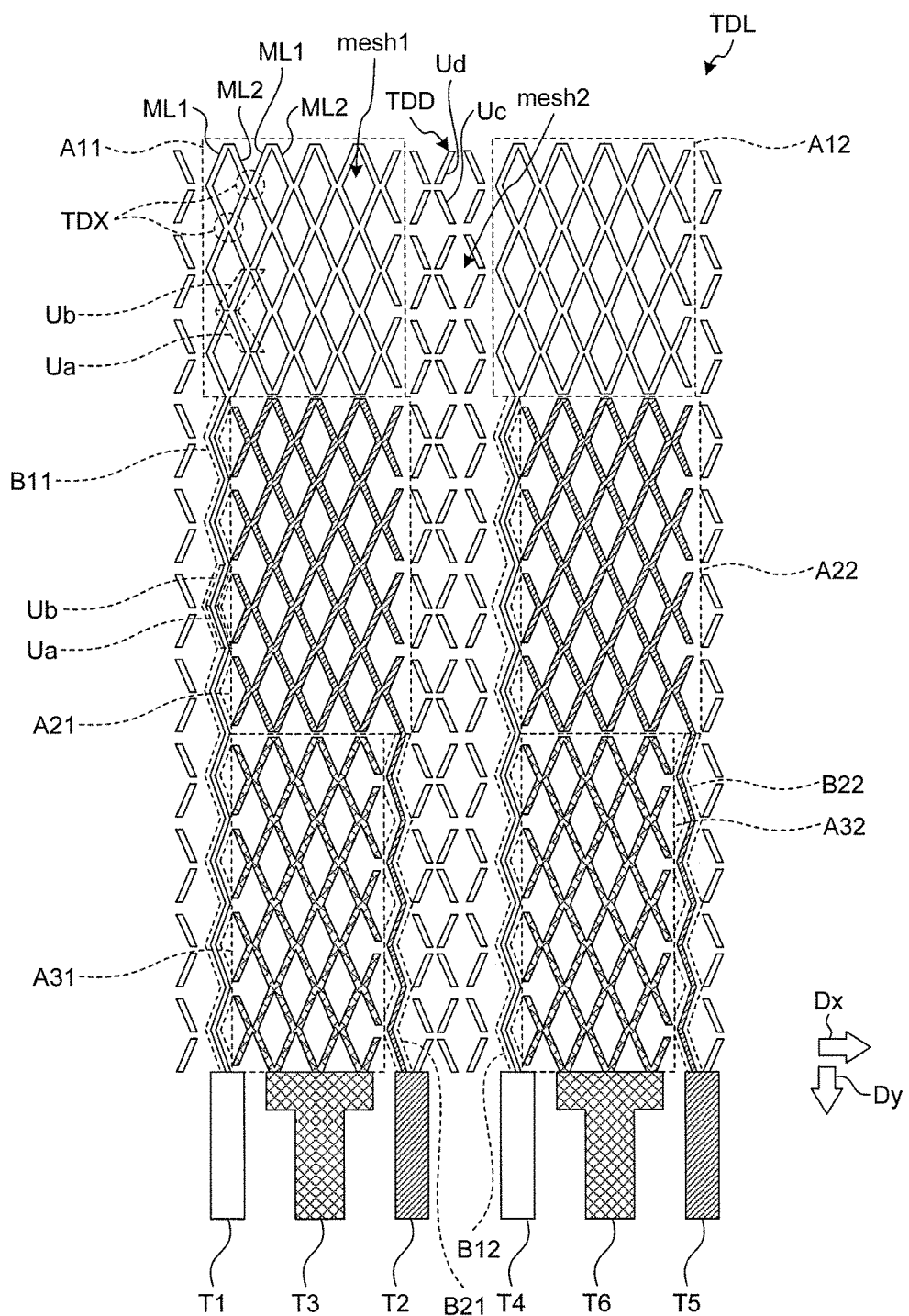
FIG. 24 is a schematic diagram illustrating an arrangement of the touch detection electrodes according to a modification of the first embodiment.

The following describes a display apparatus with a touch detection function according to a modification of the first embodiment. FIG. 24 is a schematic diagram illustrating an arrangement of the touch detection electrodes according to the modification of the first embodiment. The same constituent elements as those described in the basic example above will be given the same numerals, and duplicate description thereof will be omitted.

As illustrated in FIG. 24, each of the touch detection electrodes TDL according to the modification of the first embodiment includes the small electrode portions A11, A21, A31, A12, A22, and A32. The small electrode portion A11 includes the multiple conductive thin wires ML1 and the multiple conductive thin wires ML2 that extend in the pixel arrangement direction Dy (extending direction of the signal lines SGL) in a plane parallel to the counter substrate 3. The conductive thin wires ML1 and ML2 are alternately arranged and coupled to one another in the direction Dx (extending direction of the scan lines GCL) orthogonal to the pixel arrangement direction.

The conductive thin wire ML1 corresponds to the conductive thin wire ML illustrated in the first modification of the basic example. The conductive thin wire ML2 has a shape axisymmetric to the conductive thin wire ML1 with respect to a straight line parallel to the direction Dy as an axis of symmetry. The conductive thin wire ML2 is formed of the same material as that of the conductive thin wire ML1. The conductive thin wire ML2 is arranged so as to form intersections TDX at which the bent portions of the conductive thin wire ML1 are coupled with the bent portions of the conductive thin wire ML2. The conductive thin wires ML1 and ML2 are conductive with each other at the intersections TDX. This leads the conductive thin wires ML1 and ML2 to form surrounded areas mesh1 surrounded by the thin wire segments Ua and Ub. The conductive thin wires ML1 and ML2 need not be coupled at the bent portions. The conductive thin wires ML1 and ML2 may be coupled to be conductive with each other, for example, between intermediate portions of the thin wire segments Ua in the conductive thin wire ML1 and intermediate portions of the thin wire segments Ub in the conductive thin wire ML2, respectively. The extending direction of the conductive thin wires ML1 and ML2 is a direction of a straight line connecting one end and the other end of each of the conductive thin wires ML1 and ML2. The extending direction of the conductive thin wires ML1 and ML2 may be the longitudinal direction of each of the conductive thin wires ML1 and ML2. Each of the conductive thin wires ML1 and ML2 is a zigzag line or a wavy line. The small electrode portions A21, A31, A12, A22, and A32 also have the same structure as the small electrode portion A11.

The small electrode portion A11 is coupled to the terminal T1 formed on the frame of the touch detection device 30A by the wiring portion B11 extending from the small electrode portion A11 to the frame in the direction Dy. The wiring portion B11 is formed by the thin wire segments Ua and Ub that are alternately arranged and coupled to one another in the direction Dy. The small electrode portion A21 is coupled to the terminal T2 formed on the frame of the touch detection device 30A by the wiring portion B21 extending from the small electrode portion A21 to the frame in the direction Dy. The small electrode portion A12 is coupled to the terminal T4 formed on the frame of the touch detection device 30A by the wiring portion B12 extending from the small electrode portion A12 to the frame in the direction Dy. The small electrode portion A22 is coupled to the terminal T5 formed on the frame of the touch detection device 30A by the wiring portion B22 extending from the small electrode portion A22 to the frame in the direction Dy. The wiring portions B21, B12, and B22 are each formed by the thin wire segments Ua and Ub that are alternately arranged and coupled to one another in the direction Dy in the same manner as the wiring portion B11. The conductive thin wires ML1 and ML2 included in the small electrode portion A31 are directly coupled to the terminal T3 formed on the frame of the touch detection device 30A without the wiring portion because the small electrode portion A31 is located at the end of the display area Ad. In a similar manner, the conductive thin wires ML1 and ML2 included in the small electrode portion A32 are directly coupled to the terminal T6 formed on the frame of the touch detection device 30A without the wiring portion because the small electrode portion A32 is located at the end of the display area Ad.

The dummy electrode TDD includes the thin wire segments Uc and Ud. The thin wire segments Uc and the Ua have about the same shape. The thin wire segments Ud and the Ub have about the same shape. The thin wire segments Uc are arranged parallel to the thin wire segments Ua, and the thin wire segments Ud are arranged parallel to the thin wire segments Ub. The thin wire segments Uc and Ud are arranged so that a surrounded area mesh2 surrounded by two of the thin wire segments Uc and two of the thin wire segments Ud has the same area as that of each of the surrounded areas mesh1. This structure reduces the difference in level of the light-shielding effect between the area in which the touch detection electrode TDL is arranged and area in which the touch detection electrode TDL is not arranged. As a result, the display apparatus 1A with the touch detection function can reduce the chance of the touch detection electrode TDL being readily visually recognized.

When one of the conductive thin wires ML1 and ML2 becomes partly thinner and unreliable in conductivity in the display apparatus with the touch detection function according to the modification of the first embodiment, the above-described configuration can increase probability of the touch detection by coupling the conductive thin wire to the other conductive thin wire at the intersections TDX.

3. Second Embodiment

Configuration Example

Overall Configuration Example

Figure 25:
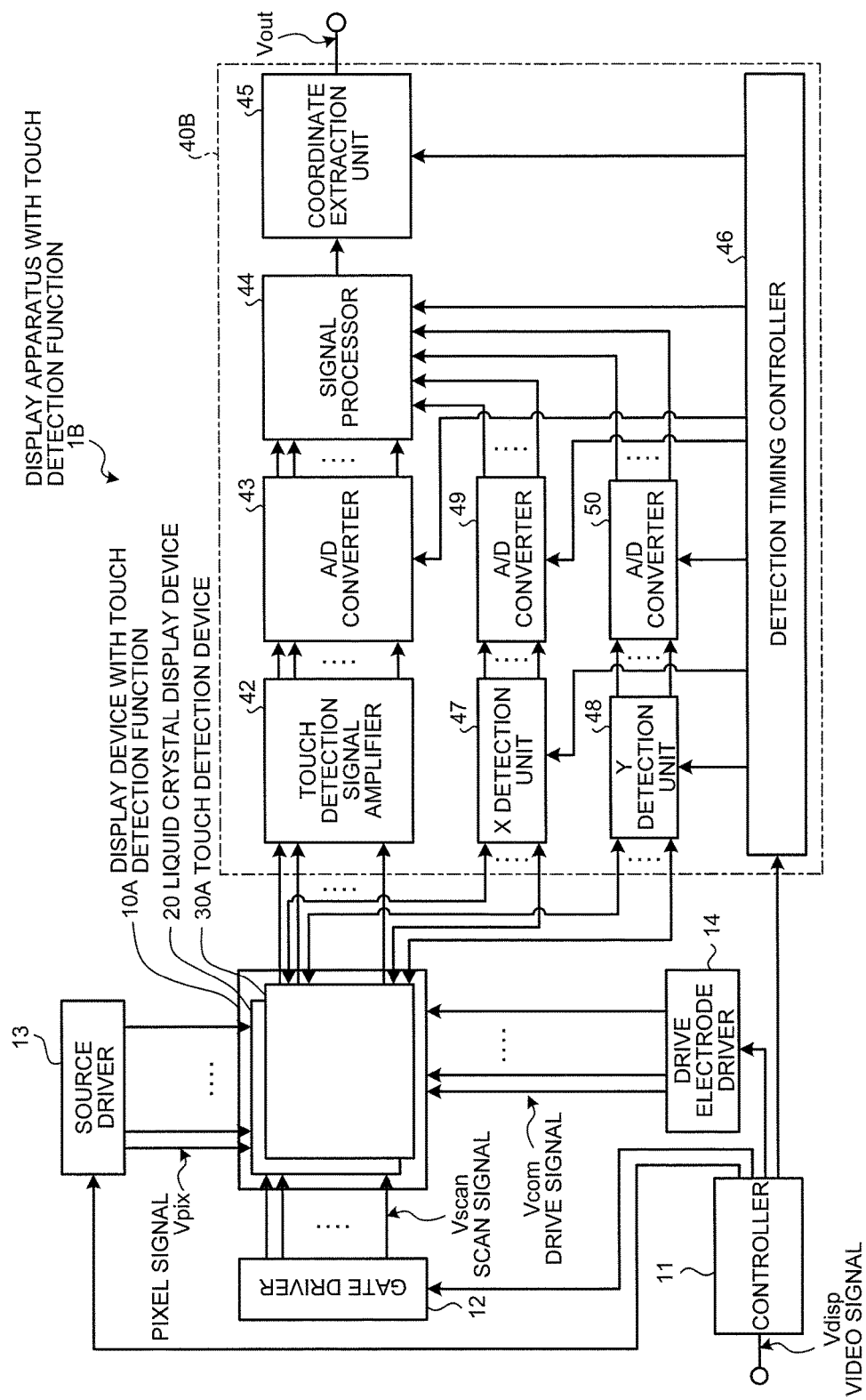
FIG. 25 is a block diagram illustrating an example of a configuration of a display apparatus with a touch detection function according to a second embodiment of the disclosure.

FIG. 25 is a block diagram illustrating an example of a configuration of a display apparatus with a touch detection function according to a second embodiment of the disclosure. A display apparatus 1B with the touch detection function includes the display device 10A with the touch detection function, the controller 11, the gate driver 12, the source driver 13, the drive electrode driver 14, and a touch detection unit 40B. The touch detection unit 40B is a circuit that detects existence of a touch (state of touch to or proximity of) to the touch detection device 30A on the basis of the control signal supplied from the controller 11 and the touch detection signals Vdet supplied from the touch detection device 30A of the display device 10A with the touch detection function, and obtains the coordinates of the touch in a touch detection region when the touch exists. The touch detection unit 40B includes the touch detection signal amplifier 42, the A/D converter 43, the signal processor 44, the coordinate extraction unit 45, the detection timing controller 46, an X detection unit 47, a Y detection unit 48, an A/D converter 49, and an A/D converter 50.

The display apparatus 1B with the touch detection function operates in the touch detection period and the display period (refer to FIG. 12) as described above. In the touch detection period, the display apparatus 1B with the touch detection function performs the touch detection using the touch detection signal amplifier 42, the A/D converter 43, the signal processor 44, the coordinate extraction unit 45, and the detection timing controller 46 on the basis of mutual capacitance between the drive electrode COML and the touch detection electrodes TDL, as described above. In the display period, the display apparatus 1B with the touch detection function detects a Y coordinate of the touch using the Y detection unit 48, the A/D converter 50, the signal processor 44, and the coordinate extraction unit 45 on the basis of self-capacitance of the first group electrodes, which are included in one of the two groups grouped from the touch detection electrodes TDL. This technique is also referred to as a self-capacitance method. In the display period, the display apparatus 1B with the touch detection function detects an X coordinate of the touch using the X detection unit 47, the A/D converter 49, the signal processor 44, and the coordinate extraction unit 45 on the basis of the self-capacitance of the second group electrodes, which are included in the other one of the two groups grouped from the touch detection electrodes TDL. This structure makes it possible for the display apparatus 1B with the touch detection function to perform the touch detection even in the display period, thereby making it possible to increase responsiveness to the touch and increase a degree of freedom in touch input operation.

Figures 26, 27:
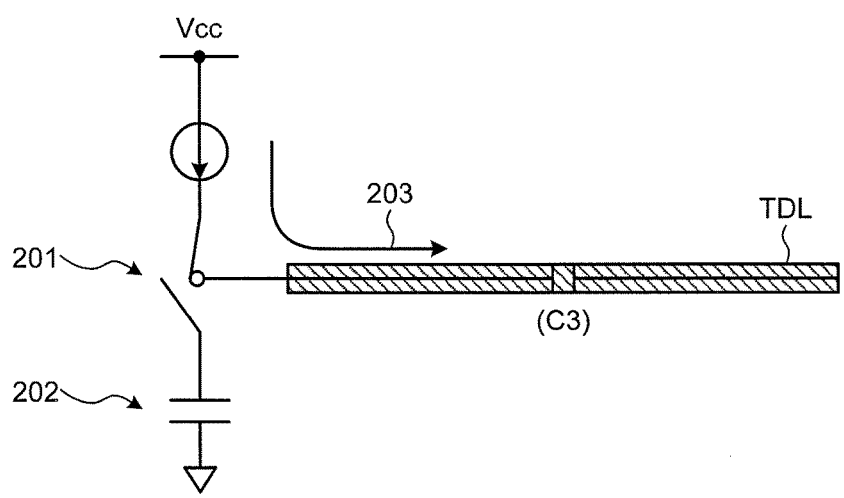
FIG. 26 is a schematic diagram illustrating a brief overview of timing of signals supplied to the drive electrodes, the first group electrodes, and the second group electrodes in the display period and the touch detection period.
FIG. 27 is a schematic diagram for explaining a basic principle of a self-capacitance type touch detection and a state in which a finger is neither in contact with nor in proximity of the device.

FIG. 26 is a schematic diagram illustrating a brief overview of timing of signals supplied to the drive electrodes, the first group electrodes, and the second group electrodes in the display and touch detection periods. In FIG. 26, the display period and the touch detection period are illustrated uninterruptedly. A period in which neither operation is performed may be present between the display and the touch detection periods.

In the display period, the drive electrode driver 14 supplies the direct current potential Vcomd (COMDC) for display to the drive electrode COML. As a result, the display apparatus 1B with the touch detection function performs the image display. In the touch detection period, the drive electrode driver 14 supplies the drive signal Vcomt (Tx) for touch detection to the drive electrode COML. As a result, the display apparatus 1B with the touch detection function performs the touch detection on the basis of the mutual capacitance between the drive electrode COML and the touch detection electrodes TDL.

In the display period, the X detection unit 47 supplies charges to the second group electrodes and thereafter detects the charges charged in the self-capacitance of the second group electrodes, and then outputs a signal to the A/D converter 49. The A/D converter 49 A/D converts the signal input from the X detection unit 47 to output the resulting signal to the signal processor 44. The signal processor 44 is a logic circuit that detects the existence of a touch to the touch detection device 30A on the basis of the output signal from the A/D converter 49. The signal processor 44 extracts only the difference in voltage caused by a finger. The signal processor 44 compares the detected difference in voltage caused by the finger with a certain threshold voltage. The signal processor 44 determines that the external proximate object approaching from the outside is in a contact state when the difference in voltage is equal to or larger than the threshold voltage. The signal processor 44 determines that the external proximate object is not in a contact state when the difference in voltage is smaller than the threshold voltage. In this manner, the touch detection unit 40B can perform the touch detection. The coordinate extraction unit 45 is a logic circuit that obtains touch panel coordinates of a touch when the touch is detected by the signal processor 44. The coordinate extraction unit 45 outputs the X coordinate of the touch panel. The X detection unit 47 does not operate in the touch detection period and supplies no charges to the second group electrodes.

In the display period, the Y detection unit 48 supplies charges to the first group electrodes and thereafter detects the charges charged in the self-capacitance of the first group electrodes, and then outputs a signal to the A/D converter 50. The A/D converter 50 A/D converts the signal input from the Y detection unit 48 to output the resulting signal to the signal processor 44. The signal processor 44 is a logic circuit that detects the existence of a touch to the touch detection device 30A on the basis of the output signal from the A/D converter 50. The signal processor 44 extracts only the difference in voltage caused by the touch of a finger. The signal processor 44 compares the detected difference in voltage caused by the finger with a certain threshold voltage. The signal processor 44 determines that the external proximate object approaching from the outside is in a contact state when the difference in voltage is equal to or larger than the threshold voltage. The signal processor 44 determines that the external proximate object is not in a contact state when the difference in voltage is smaller than the threshold voltage. In this manner, the touch detection unit 40B can perform the touch detection. The coordinate extraction unit 45 is a logic circuit that obtains touch panel coordinates of a touch when the touch is detected by the signal processor 44. The coordinate extraction unit 45 outputs the Y coordinate of the touch panel. The Y detection unit 48 does not operate in the touch detection period and supplies no charges to the first group electrodes.

In the display period, the touch detection signal amplifier 42 and the A/D converter 43 do not operate because the X detection unit 47, the Y detection unit 48, and the A/D converters 49 and 50 operate to detect the touch.

Basic Principle of Self-Capacitance Type Touch Detection

Figure 28:
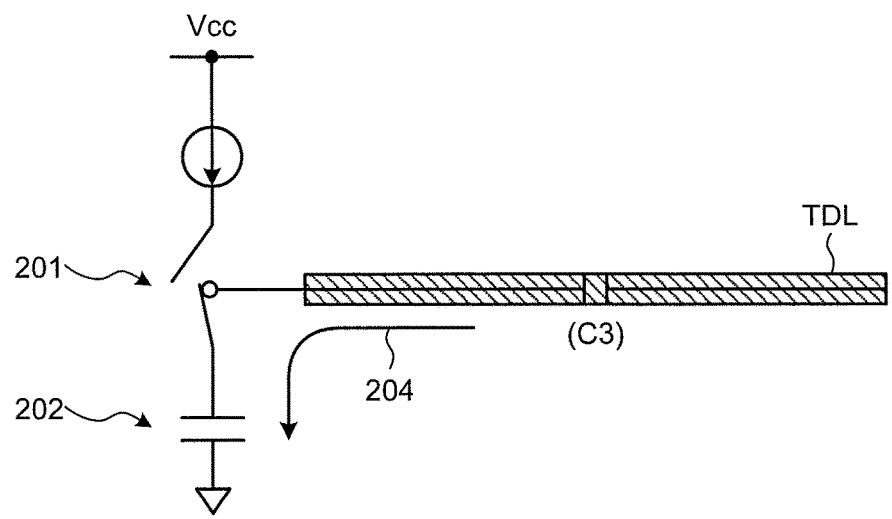
FIG. 28 is a schematic diagram for explaining the basic principle of the self-capacitance type touch detection and a state in which a finger is neither in contact with nor in proximity of the device.
Figure 29:
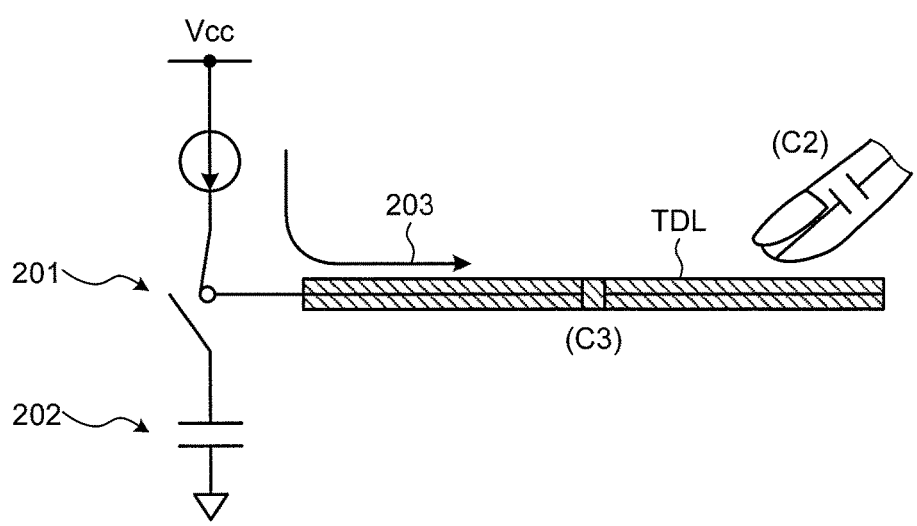
FIG. 29 is a schematic diagram for explaining the basic principle of the self-capacitance type touch detection and a state in which a finger is in contact with or in proximity of the device.
Figure 30:
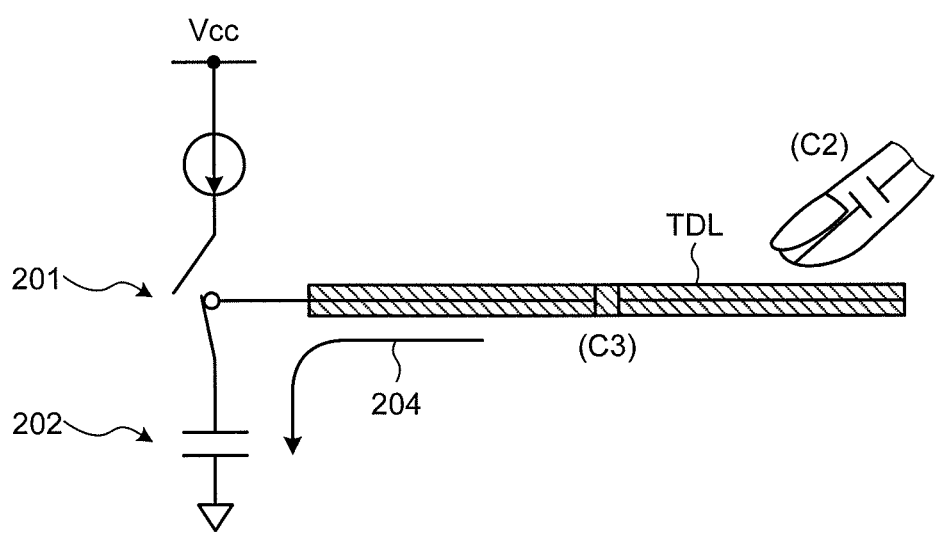
FIG. 30 is a schematic diagram for explaining the basic principle of the self-capacitance type touch detection and a state in which a finger is in contact with or in proximity of the device.

In the display period, the X detection unit 47 and the Y detection unit 48 operate on the basis of the basic principle of the self-capacitance type touch detection to detect the existence of the touch. The following describes the basic principle of the self-capacitance type touch detection in the display apparatus 1B with the touch detection function of the embodiment with reference to FIGS. 27 to 30. FIGS. 27 and 28 are schematic diagrams for explaining a basic principle of the self-capacitance type touch detection and a state in which a finger is neither in contact with nor in proximity of the device. FIGS. 29 and 30 are schematic diagrams for explaining a basic principle of the self-capacitance type touch detection and a state in which a finger is in contact with or in proximity of the device.

As illustrated in FIG. 27, the touch detection electrode TDL is coupled to a power source voltage Vcc by a switch 201. The touch detection electrode TDL has capacitance C3. Charges flow from the power source potential Vcc to the touch detection electrode TDL in a direction indicated with an arrow 203. As a result, the touch detection electrode TDL is charged with charges in accordance with the capacitance C3.

As illustrated in FIG. 28, the touch detection electrode TDL is then coupled to a detection circuit 202 by switching the switch 201. The charges charged in the touch detection electrode TDL flow to the detection circuit 202 in a direction indicated with an arrow 204. The detection circuit 202 can detect the capacitance C3 of the touch detection electrode TDL by measuring the charges flowing from the touch detection electrode TDL.

The following describes a case where a finger is in contact with or in proximity of the touch detection electrode TDL. When a finger is in contact with or in proximity of the touch detection electrode TDL as illustrated in FIG. 29, capacitance C2 of the finger is added to the capacitance C3 of the touch detection electrode TDL. When the touch detection electrode TDL is coupled to the power source voltage Vcc by the switch 201, charges flow from the power source potential Vcc to the touch detection electrode TDL in the direction indicated with the arrow 203. As a result, the touch detection electrode TDL and the finger are charged with charges in accordance with the capacitance C3 and the capacitance C2, respectively.

As illustrated in FIG. 30, the touch detection electrode TDL is then coupled to the detection circuit 202 by switching the switch 201. The charges charged in the touch detection electrode TDL and the finger flow to the detection circuit 202 in the direction indicated with the arrow 204. The detection circuit 202 can detect the capacitance of the touch detection electrode TDL and the finger by measuring the charges flowing from the touch detection electrode TDL and the finger.

Touch Detection Device

Figure 31:
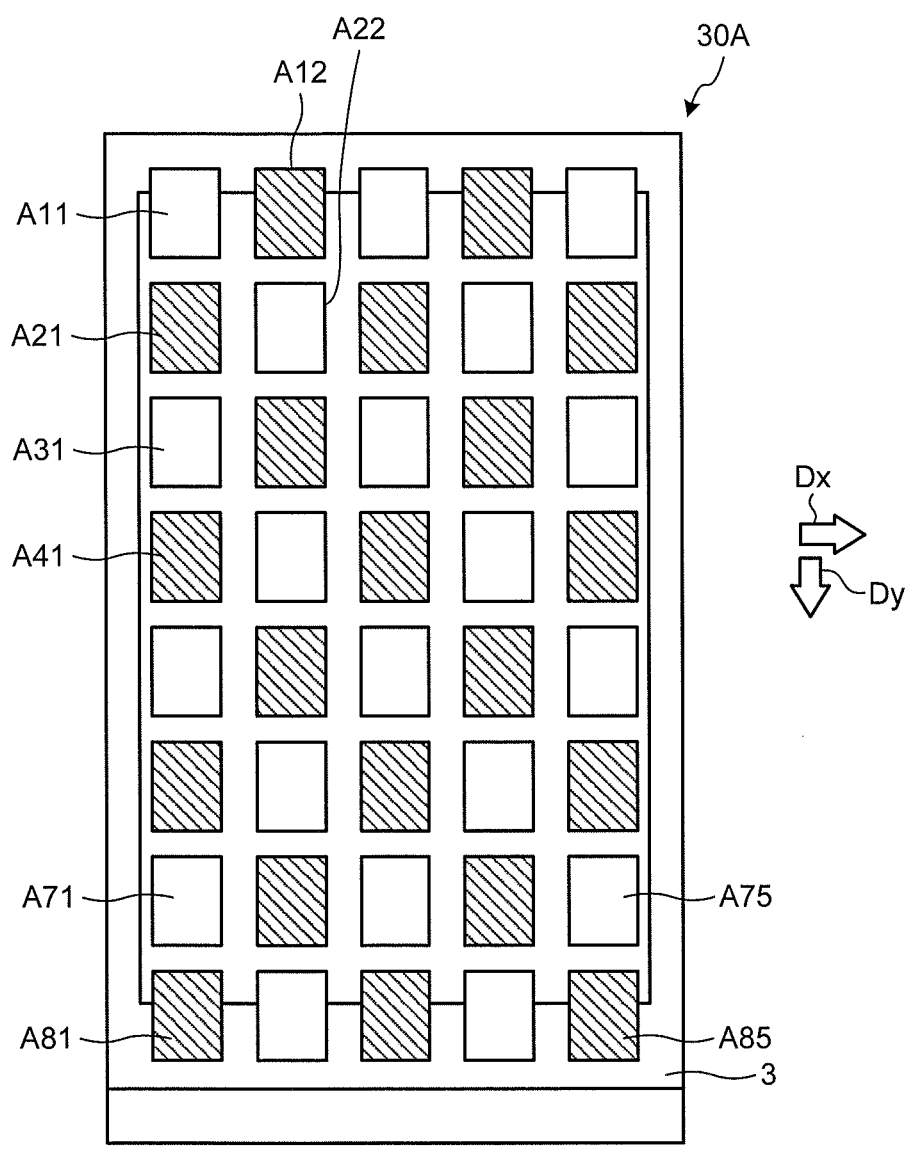
FIG. 31 is a schematic plan view of the touch detection device viewed from a direction orthogonal to a principal surface of the touch detection device in the display period.

The following describes a configuration example of the touch detection device 30A in detail. FIG. 31 is a schematic plan view of the touch detection device viewed from the direction orthogonal to the principal surface of the touch detection device in the display period. On the counter substrate 3 of the touch detection device 30A, the multiple small electrode portions A11, A21, . . . , and A85 are formed in a matrix of 8 rows in the pixel arrangement direction Dy (extending direction of the signal lines SGL) and 5 columns in the direction Dx (extending direction of the scan lines GCL) orthogonal to the pixel arrangement direction. The small electrode portions correspond to the touch detection electrodes TDL. In the embodiment, the small electrode portions are formed in a matrix of 8 rows and 5 columns. The number of small electrode portions is not limited to the example. The small electrode portions may be formed in a larger number than that of the example. In the embodiment, the small electrode portions are formed in a matrix. The arrangement is not limited to the example. For example, each row may be shifted from the adjacent row in the direction Dx or each column may be shifted from the adjacent column in the direction Dy.

The small electrode portions are grouped into the first group electrodes and the second group electrodes. The first group electrodes are composed of the small electrode portions A11, A31, . . . , A71, A22, . . . , and A75. The second group electrodes are composed of the small electrode portions A21, A41, . . . , A81, A12, . . . , and A85. In this manner, the first group electrodes and the second group electrodes form a checkerboard pattern on the counter substrate 3. In the embodiment, the first group electrodes and the second group electrodes form a checkerboard pattern on the counter substrate 3. The arrangement pattern is not limited to the example. Preferably, the number of small electrode portions included in the first group electrodes and the number of small electrode portions included in the second group electrodes are about the same number.

Figure 32:
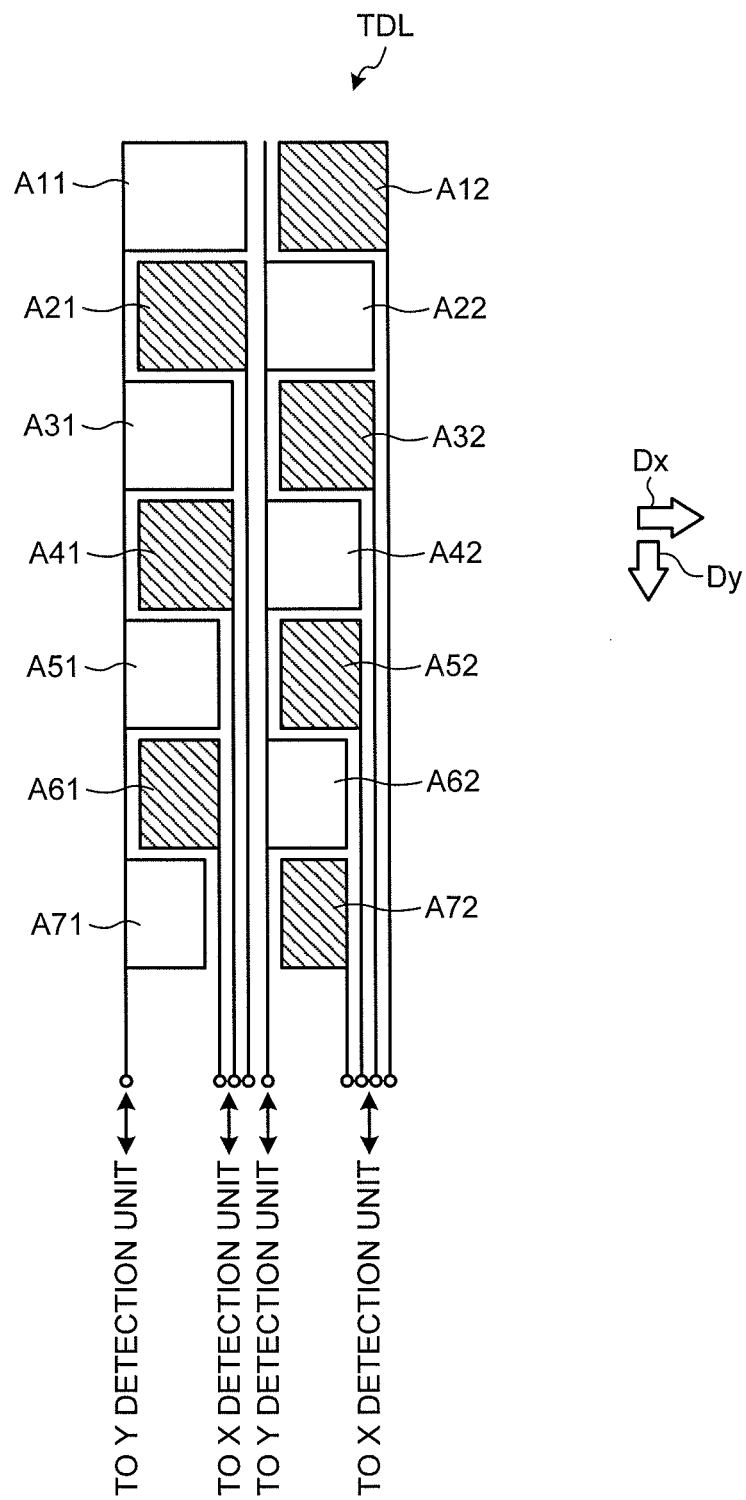
FIG. 32 is a schematic plan view illustrating a part of the touch detection device in the display period.

FIG. 32 is a schematic plan view illustrating a part of the touch detection device in the display period. In the display period, the Y detection unit 48 supplies charges to the small electrode portions A11, A31, A51, A71, A22, A42, and A62 grouped as the first group electrodes. The Y detection unit 48 detects the charges charged in the self-capacitance of the first group electrodes and outputs the charges to the A/D converter 50. The A/D converter 50 A/D converts the charges charged in the self-capacitance of the first group electrodes to detect the touch. In the display period, the touch detection device 30A detects the Y coordinate of the touch in accordance with the basic principle of the self-capacitance type touch detection described above.

In the display period, the X detection unit 47 supplies charges to the small electrode portions A21, A41, A61, A12, A32, A52, and A72 grouped as the second group electrodes. The X detection unit 47 detects the charges charged in the self-capacitance of the second group electrodes and outputs the charges to the A/D converter 49. The A/D converter 49 A/D converts the charges charged in the self-capacitance of the second group electrodes to detect the touch. In the display period, the touch detection device 30A detects the X coordinate of the touch in accordance with the basic principle of the self-capacitance type touch detection described above.

Figure 33:
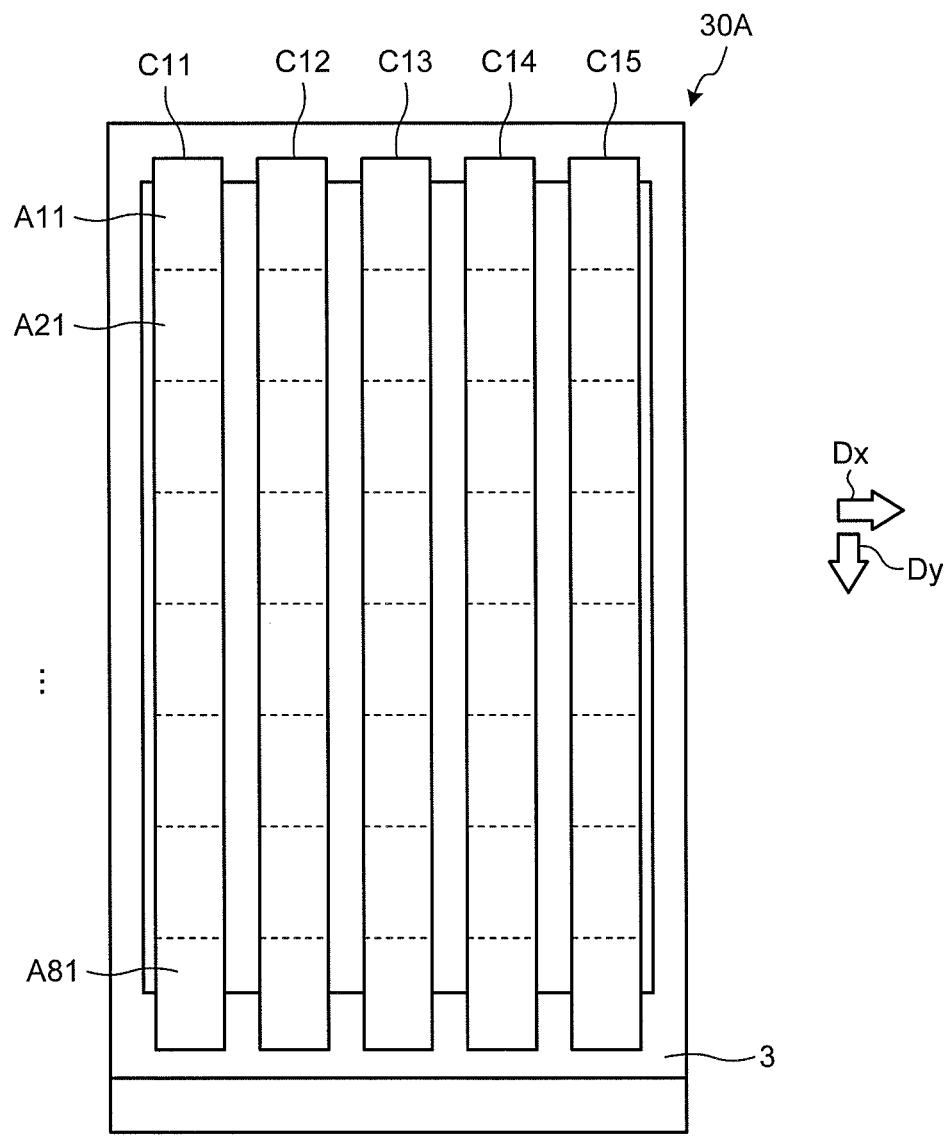
FIG. 33 is a schematic plan view of the touch detection device viewed from a direction orthogonal to the principal surface of the touch detection device in the touch detection period.

FIG. 33 is a schematic plan view of the touch detection device viewed from the direction orthogonal to the principal surface of the touch detection device in the touch detection period. In the touch detection period, the small electrode portions A11, A21, . . . , and A81 of the first column form the virtual touch detection electrode C11 extending in the direction Dy. In a similar manner, the small electrode portions of the second column form the virtual touch detection electrode C12 extending in the direction Dy, the small electrode portions of the third column form the virtual touch detection electrode C13 extending in the direction Dy, the small electrode portions of the fourth column form the virtual touch detection electrode C14 extending in the direction Dy, and the small electrode portions of the fifth column form the virtual touch detection electrode C15 extending in the direction Dy. The touch detection electrodes C11 to C15 correspond to the touch detection electrodes TDL.

Figure 34:
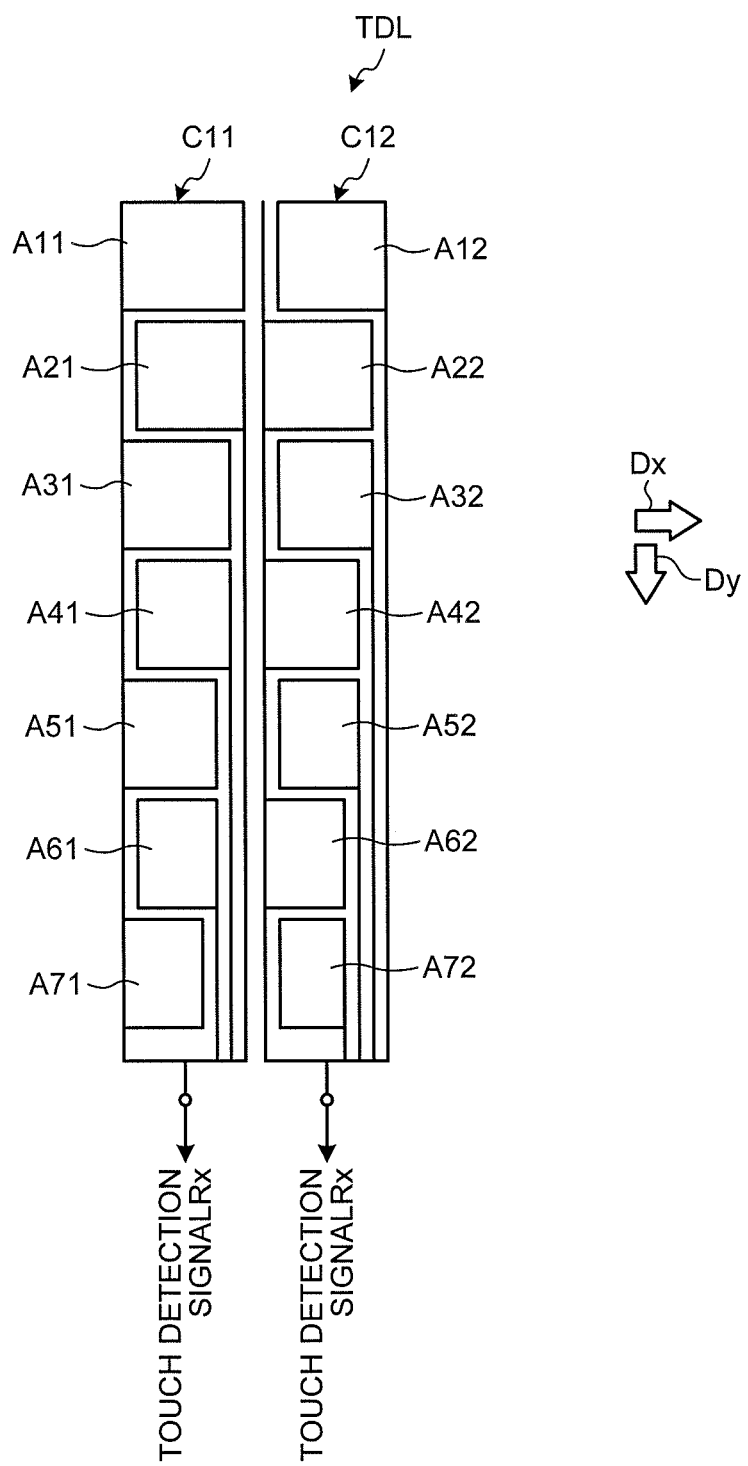
FIG. 34 is a schematic plan view illustrating a part of the touch detection device in the display period.

FIG. 34 is a schematic plan view illustrating a part of the touch detection device in the touch detection period. The small electrode portions A11, A21, A31, A41, A51, A61, and A71, which are arranged in the first column, are electrically coupled and form the virtual touch detection electrode C11 extending in the direction Dy in the touch detection period. In a similar manner, the small electrode portions A12, A22, A32, A42, A52, A62, and A72, which are arranged in the second column, are electrically coupled and form the virtual touch detection electrode C12 extending in the direction Dy in the touch detection period. In the touch detection period, capacitance is generated between the touch detection electrodes C11 and C12 and the drive electrode COML, which is apart from the touch detection electrodes C11 and C12 in the direction orthogonal to the principal surface of the touch detection device and intersects the touch detection electrodes C11 and C12 (refer to FIGS. 9, 11, and 16).

As described above, the drive electrode COML functions as the drive electrode of the liquid crystal display device 20 and also functions as the drive electrode of the touch detection device 30A. Referring to FIG. 9, the drive electrode COML faces the pixel electrodes 22 in the direction orthogonal to the surface of the TFT substrate 21. The touch detection device 30 is composed of the drive electrodes COML provided on the pixel substrate 2 and the touch detection electrodes TDL (the touch detection electrodes C11 to C15) provided on the counter substrate 3. Referring to FIG. 11, the touch detection electrodes TDL are composed of the stripe electrode patterns (the touch detection electrodes C11 to C15) extending in a direction intersecting the extending direction of the electrode patterns of the drive electrodes COML. The touch detection electrodes TDL face the drive electrodes COML in the direction orthogonal to the surface of the TFT substrate 21. The electrode patterns (the touch detection electrodes C11 to C15) of the touch detection electrodes TDL are coupled to the respective corresponding inputs of the touch detection signal amplifier 42 of the touch detection unit 40B. Capacitance is generated between the drive electrodes COML and the electrode patterns of the touch detection electrodes TDL intersecting with one another at respective intersecting portions of the electrode patterns of the drive electrodes COML and the touch detection electrodes TDL.

On the basis of the structure described above, for each touch detection period, the drive electrode driver 14A of the touch detection device 30A drives the drive electrode block such that one of the drive electrode blocks is scanned in a time-division manner, thereby sequentially scanning the electrode blocks line by line. The detection blocks of the drive electrodes COML thus are sequentially selected in the scan direction Scan block by block. The touch detection signal Rx (Vdet) is output from the touch detection electrodes TDL (the touch detection electrodes C11 to C15). This is how the touch detection device 30A performs the touch detection for one detection block. The drive electrode block corresponds to the drive electrode E1 in the above-described basic principle of touch detection while the touch detection electrodes TDL (the touch detection electrodes C11 to C15) correspond to the touch detection electrode E2. The touch detection device 30A detects the touch in accordance with the basic principle in the touch detection period. As illustrated in FIG. 11, the electrode patterns intersecting with one another form capacitive touch sensors in a matrix. The touch detection device 30A thus can also detect the position where the external proximate object is in contact with or in proximate of the touch detection device by scanning the entire touch detection surface of the touch detection device 30A.

The coupling between the respective small electrode portions and the X detection unit 47, between the respective small electrode portions and the Y detection unit 48, or between the respective small electrode portions and the touch detection signal amplifier 42 may be switched by switching elements under the control of the controller 11. The switching elements may be provided on the wiring between the respective small electrode portions and the X detection unit 47, the Y detection unit 48, or the touch detection signal amplifier 42. Alternatively, the coupling may be switched by input-output stages (input-output buffers) of the X detection unit 47 and the Y detection unit 48, and an input stage (input buffer) of the touch detection signal amplifier 42.

Arrangement of Touch Detection Electrodes

The small electrode portions A11 to A85 have the same internal structure as the first embodiment (refer to FIG. 23) or the modification of the first embodiment (refer to FIG. 24).

The display apparatus 1B with the touch detection function according to the embodiment has the following effects in addition to the same effects as the display apparatus 1A with the touch detection function according to the first embodiment. In the display period, the display apparatus 1B with the touch detection function according to the embodiment detects the X coordinate of the touch on the basis of the self-capacitance of the second group electrodes, and the Y coordinate of the touch on the basis of the self-capacitance of the first group electrodes. The self-capacitance method is effective for what is called hovering input in which a pen tip or a finger is located above a touch surface without coming into contact with the touch surface. In the touch detection period, the display apparatus 1B with the touch detection function detects the X coordinate and the Y coordinate of the touch on the basis of the mutual capacitance between the drive electrode COML and the touch detection electrodes TDL (including the first group electrodes and the second group electrodes). The mutual capacitance method is more effective for input using a pen and what is called multiple touch input in which a plurality of places are touched simultaneously than the self-capacitance method. The display apparatus 1B with the touch detection function alternately repeats the self-capacitance method effective for what is called hovering input (in display period) and the mutual capacitance method effective for input using a pen and what is called multiple touch input (in the touch detection period), thereby making it possible to effectively detect what is called hovering input, input using a pen, and what is called multiple touch input. As a result, display apparatus 1B with the touch detection function can increase a freedom in touch input operation.

4. Third Embodiment

Configuration Example

Overall Configuration Example

Figure 35:
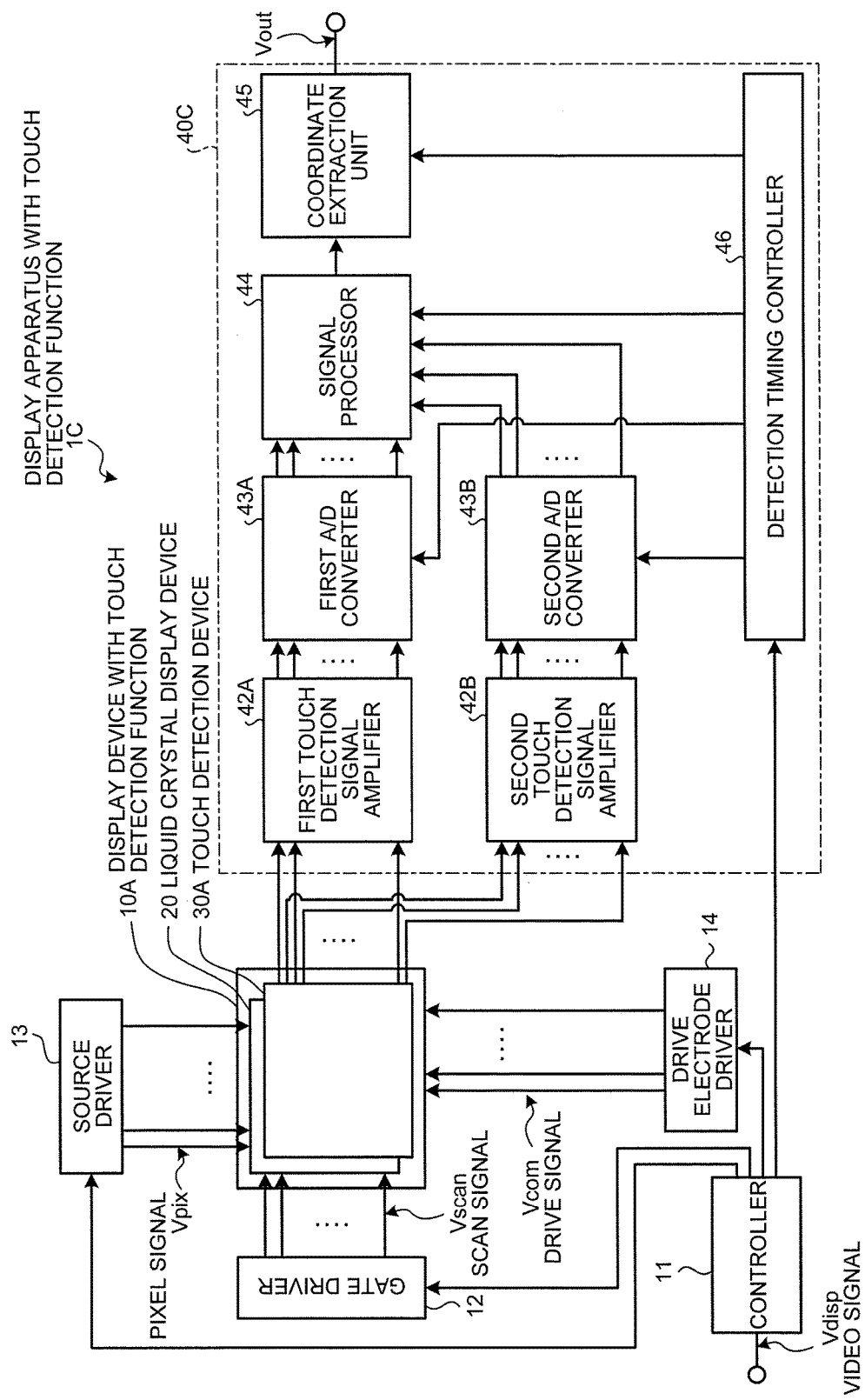
FIG. 35 is a block diagram illustrating an example of a configuration of a display apparatus with a touch detection function according to a third embodiment of the disclosure.

FIG. 35 is a block diagram illustrating an example of a configuration of a display apparatus with a touch detection function according to a third embodiment of the disclosure. A display apparatus 1C with a touch detection function includes the display device 10A with the touch detection function, the controller 11, the gate driver 12, the source driver 13, the drive electrode driver 14, and a touch detection unit 40C. The touch detection unit 40C is a circuit that detects existence of a touch (the state of touch to or proximity of) to the touch detection device 30A on the basis of the control signal supplied from the controller 11 and the touch detection signals Vdet supplied from the touch detection device 30A of the display device 10A with the touch detection function, and obtains the coordinates of the touch in a touch detection region when the touch exists. The touch detection unit 40C includes a first touch detection signal amplifier 42A, a second touch detection signal amplifier 42B, a first A/D converter 43A, a second A/D converter 43B, the signal processor 44, the coordinate extraction unit 45, and the detection timing controller 46.

The display apparatus 1C with the touch detection function operates in the touch detection period and the display period (refer to FIG. 12) as described above. The display apparatus 1C with the touch detection function has a high resolution touch detection mode in which the touch is detected with high resolution and a low resolution touch detection mode in which the touch is detected with low resolution in the touch detection period. In the low resolution touch detection mode, the display apparatus 1C with the touch detection function performs the touch detection on the basis of the mutual capacitance between the first group electrodes, which are a part of a plurality of small electrodes portions included in the touch detection electrodes TDL, and the drive electrode COML. In the high resolution touch detection mode, the display apparatus 1C with the touch detection function performs the touch detection on the basis of the mutual capacitance between the drive electrode COML and the first group electrodes and the second group electrodes, which are the electrodes in the touch detection electrodes TDL other than the first group electrodes.

The first touch detection signal amplifier 42A amplifies the touch detection signal Rx (Vdet) supplied from the first group electrodes of the touch detection device 30A. The first touch detection signal amplifier 42A may include a low pass analog filter that removes high frequency components (noise components) included in the touch detection signals Rx and extracts touch components and outputs each of the touch components. The first A/D converter 43A is a circuit that samples each analog signal output from the first touch detection signal amplifier 42A and converts the analog signal into a digital signal in synchronization with the drive signal Vcom. The first group electrodes are used in both the high resolution touch detection mode and the low resolution touch detection mode. Thus, the first touch detection signal amplifier 42A and the first A/D converter 43A operate in both the high resolution touch detection mode and the low resolution touch detection mode.

The second touch detection signal amplifier 42B amplifies the touch detection signal Rx (Vdet) supplied from the second group electrodes of the touch detection device 30A. The second touch detection signal amplifier 42B may include a low pass analog filter that removes high frequency components (noise components) included in the touch detection signals Rx and extracts touch components and outputs each of the touch components. The second A/D converter 43B is a circuit that samples each analog signal output from the second touch detection signal amplifier 42B and converts the analog signal into a digital signal in synchronization with the drive signal Vcom. The second group electrodes are used in the high resolution touch detection mode. Thus, the second touch detection signal amplifier 42B and the second A/D converter 43B operate in the high resolution touch detection mode. The second touch detection signal amplifier 42B does not operate in the low resolution touch detection mode.

Touch Detection Device

Figure 36:
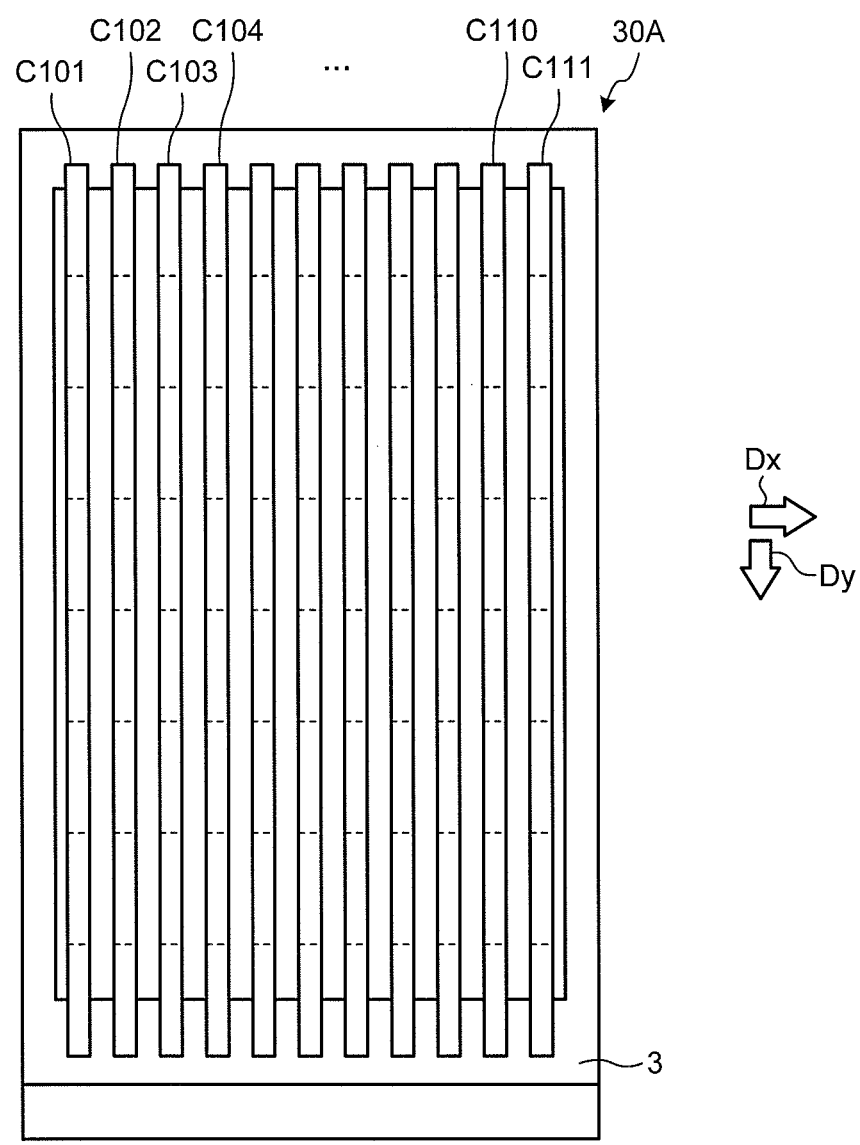
FIG. 36 is a schematic plan view of the touch detection device viewed from a direction orthogonal to the principal surface of the touch detection device in a high resolution touch detection mode.

The following describes a configuration example of the touch detection device 30A in detail. FIG. 36 is a schematic plan view of the touch detection device viewed from the direction orthogonal to the principal surface of the touch detection device in the high resolution touch detection mode. On the counter substrate 3 of the touch detection device 30A, a plurality of touch detection electrodes C101 to C111 extending along the pixel arrangement direction Dy (extending direction of the signal lines SGL) are formed. Each of the touch detection electrodes C101 to C111 is composed of a plurality of small electrode portions arranged in the direction Dy. The touch detection electrodes C101, C103, . . . , and C111 form the first group electrodes while the touch detection electrodes C102, C104, . . . , and C110 form the second group electrodes.

In the embodiment, the first group electrodes and the second group electrodes are alternately arranged one by one. The arrangement manner is not limited to this manner. The first group electrodes and the second group electrodes may be alternately arranged on a two or more basis.

Figure 37:
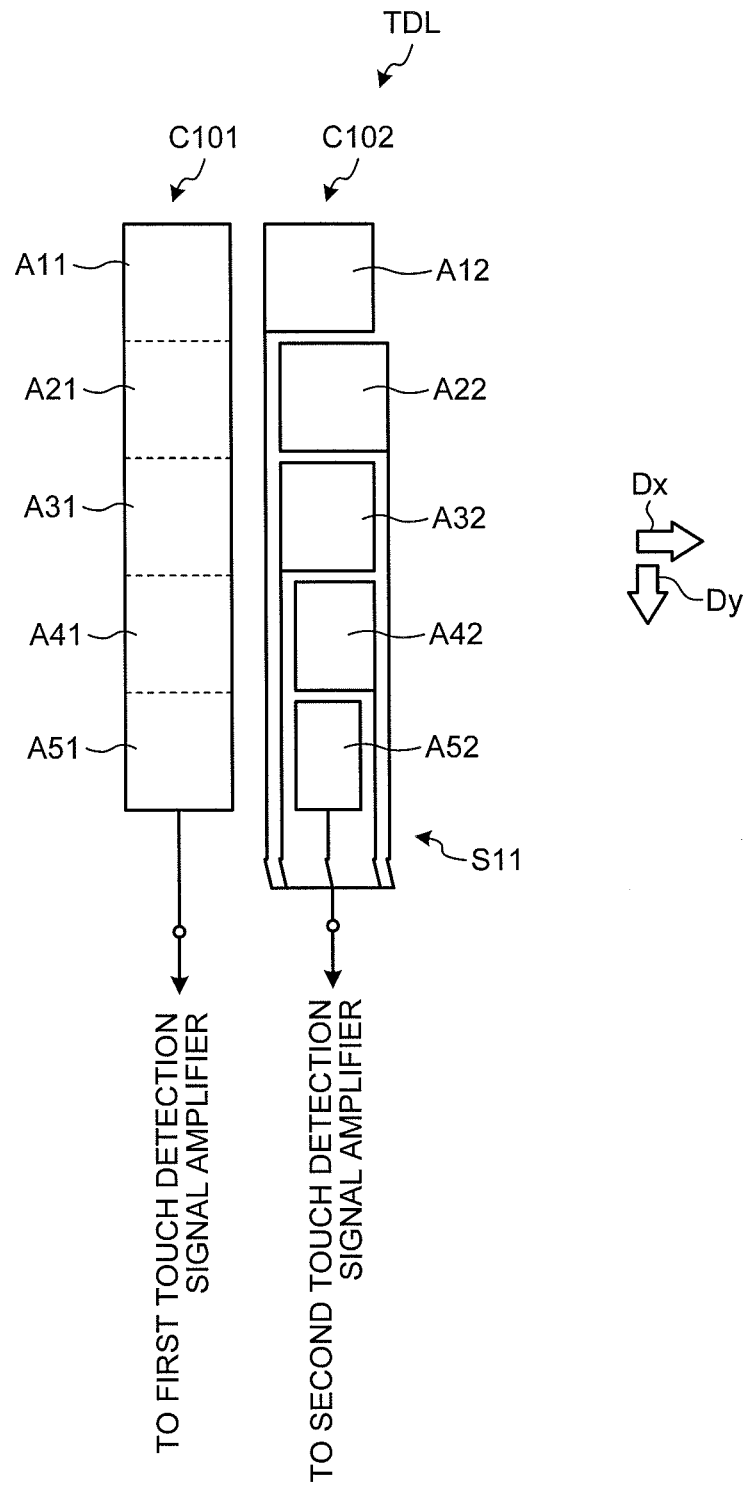
FIG. 37 is a schematic plan view illustrating a part of the touch detection device in the high resolution touch detection mode.

FIG. 37 is a schematic plan view illustrating a part of the touch detection device in the high resolution touch detection mode. The small electrode portions A11, A21, A31, A41, and A51 of the first column are electrically coupled and form the virtual touch detection electrode C101 extending in the direction Dy in the high resolution touch detection mode. The touch detection electrode C101 is coupled to the first touch detection signal amplifier 42A and outputs the touch detection signal Rx (Vdet) to the first touch detection signal amplifier 42A. In a similar manner, the small electrode portions A12, A22, A32, A42, and A52 of the second column form the virtual touch detection electrode C102 extending in the direction Dy. The touch detection electrode C102 is coupled to the second touch detection signal amplifier 42B and outputs the touch detection signal Rx (Vdet) to the second touch detection signal amplifier 42B.

Figure 38:
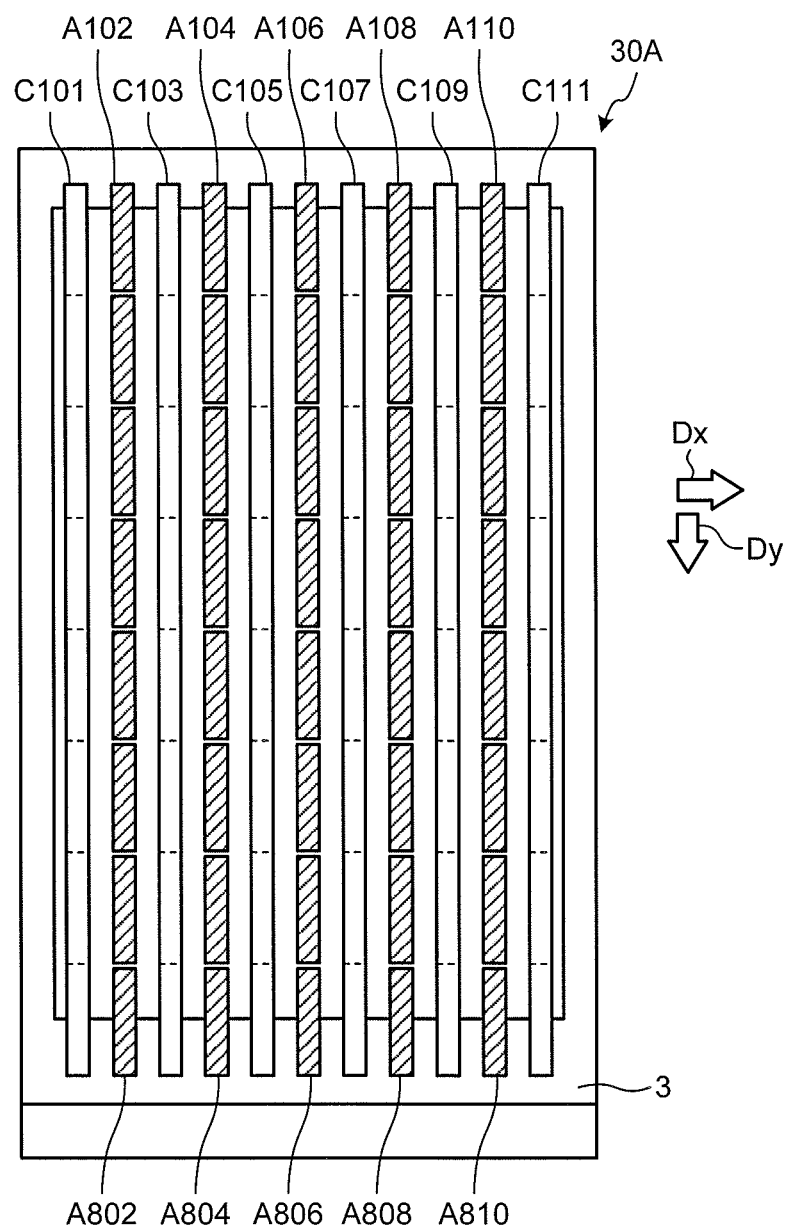
FIG. 38 is a schematic plan view of the touch detection device viewed from a direction orthogonal to the principal surface of the touch detection device in a low resolution touch detection mode.

FIG. 38 is a schematic plan view of the touch detection device viewed from the direction orthogonal to the principal surface of the touch detection device in the low resolution touch detection mode. In the low resolution touch detection mode, the small electrode portions of the first column form the virtual touch detection electrode C101 extending in the direction Dy. In a similar manner, the small electrode portions of the third column form the virtual touch detection electrode C103 extending in the direction Dy, the small electrode portions of the fifth column form the virtual touch detection electrode C105 extending in the direction Dy, the small electrode portions of the seventh column form the virtual touch detection electrode C107 extending in the direction Dy, the small electrode portions of the ninth column form the virtual touch detection electrode C109 extending in the direction Dy, and the small electrode portions of the eleventh column form the virtual touch detection electrode C111 extending in the direction Dy. The touch detection electrodes C101, C103, C105, C107, C109, and C111 form the first group electrodes.

In the low resolution touch detection mode, small electrode portions A102 to A802 of the second column become an electrically floating state. In a similar manner, small electrode portions A104 to A804 of the fourth column, small electrode portions A106 to A806 of the sixth column, small electrode portions A108 to A808 of the eighth column, and the small electrode portions A110 to A810 of the tenth column become an electrically floating state.

Figure 39:
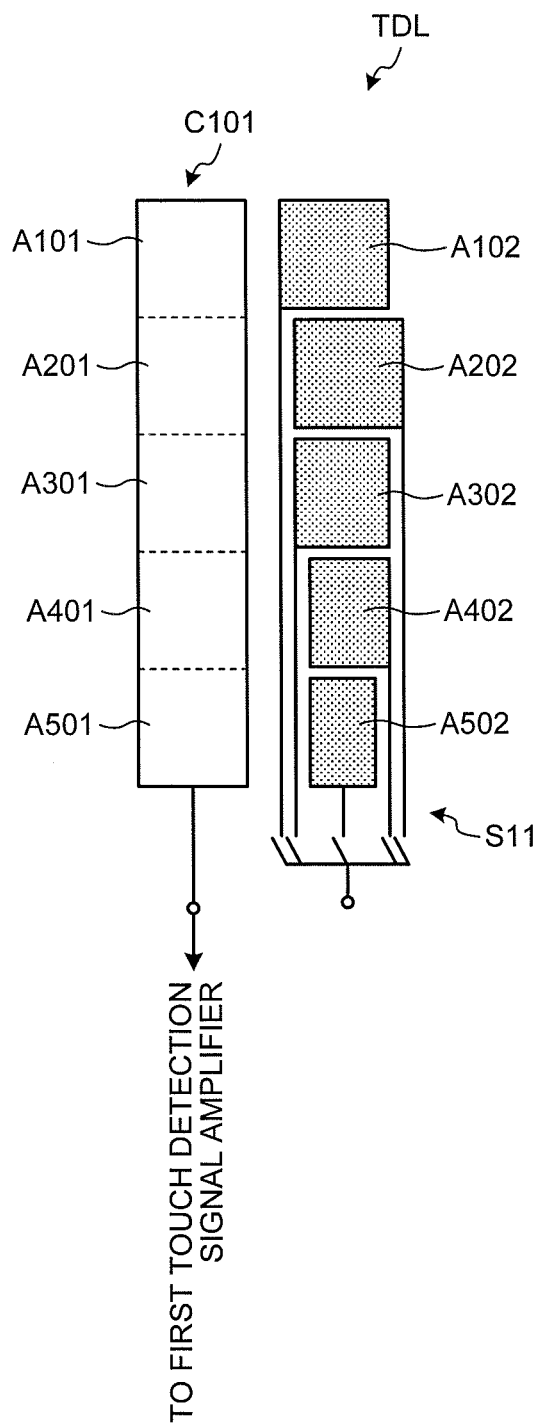
FIG. 39 is a schematic plan view illustrating a part of the touch detection device in the low resolution touch detection mode.

FIG. 39 is a schematic plan view illustrating a part of the touch detection device in the low resolution touch detection mode. The small electrode portions A101, A201, A301, A401, and A501 of the first column are electrically coupled and form the virtual touch detection electrode C101 extending in the direction Dy in the low resolution touch detection mode. The touch detection electrode C101 is coupled to the first touch detection signal amplifier 42A and outputs the touch detection signal Rx (Vdet) to the first touch detection signal amplifier 42A.

In the low resolution touch detection mode, the small electrode portions A102, A202, A302, A402, and A502 of the second column become an electrically floating state.

The coupling and uncoupling between the second touch detection signal amplifier 42B and the small electrode portions A102, A202, A302, A402, and A502 of the second column may be switched by a switching element S11 (refer to FIGS. 37 and 39) under the control of the controller 11, the switching element S11 being provided on the wiring between the second touch detection signal amplifier 42B and the small electrode portions A102, A202, A302, A402, and A502 of the second column, or may by an input stage (input buffer) of the second touch detection signal amplifier 42B.

As described above, the drive electrode COML functions as the drive electrode of the liquid crystal display device 20 and also functions as the drive electrode of the touch detection device 30A. In the high resolution touch detection mode, the touch detection electrodes C101 to C111 included in the touch detection electrodes TDL face the drive electrode COML in the direction orthogonal to the surface of the TFT substrate 21 (refer to FIG. 9). The respective first group electrodes (the touch detection electrodes C101, C103, . . . , and C111) of the touch detection electrodes TDL are coupled to the input of the first touch detection signal amplifier 42A. Capacitance is generated at the intersections of the electrode patterns of the drive electrode COML and the first group electrodes (the touch detection electrodes C101, C103, . . . , and C111). In a similar manner, the respective second group electrodes (the touch detection electrodes C102, C104, . . . , and C110) of the touch detection electrodes TDL are coupled to the input of the second touch detection signal amplifier 42B. Capacitance is generated at the intersections of the electrode patterns of the drive electrode COML and the second group electrodes (the touch detection electrodes C102, C104, . . . , and C110).

On the basis of the structure described above, for each high resolution touch detection mode, the drive electrode driver 14 of the touch detection device 30A drives the drive electrode block such that one of the drive electrode blocks is scanned in a time-division manner, thereby sequentially scanning the electrode blocks line by line. The detection blocks of the drive electrodes COML thus are sequentially selected in the scan direction Scan block by block (refer to FIG. 11). The touch detection signal Rx (Vdet) is output from the touch detection electrodes TDL (the touch detection electrodes C101 to C111). This is how the touch detection device 30A performs the touch detection for one detection block. The drive electrode block corresponds to the drive electrode E1 in the above-described basic principle of touch detection while the touch detection electrodes TDL (the touch detection electrodes C101 to C111) correspond to the touch detection electrode E2. The touch detection device 30A detects the touch in accordance with the basic principle in the high resolution touch detection mode. As illustrated in FIG. 11, the electrode patterns intersecting with one another form capacitive touch sensors in a matrix. The touch detection device 30A thus can also detect the position where the external proximate object is in contact with or in proximate of the touch detection device by scanning the entire touch detection surface of the touch detection device 30A.

In the low resolution touch detection mode, the first group electrodes (the touch detection electrodes C101, C103, . . . , and C111) included in the touch detection electrodes TDL face the drive electrode COML in the direction orthogonal to the surface of the TFT substrate 21 (refer to FIG. 9). The respective first group electrodes (the touch detection electrodes C101, C103, . . . , and C111) of the touch detection electrodes TDL are coupled to the input of the first touch detection signal amplifier 42A. Capacitance is generated at the intersections of the electrode patterns of the drive electrode COML and the first group electrodes (the touch detection electrodes C101, C103, . . . , and C111).

On the basis of the structure described above, for each low resolution touch detection mode, the drive electrode driver 14 of the touch detection device 30A drives the drive electrode block such that one of the drive electrode blocks is scanned in a time-division manner, thereby sequentially scanning the electrode blocks line by line. The detection blocks of the drive electrodes COML thus are sequentially selected in the scan direction Scan block by block (refer to FIG. 11). The touch detection signal Rx (Vdet) is output from the first group electrodes (the touch detection electrodes C101, C103, . . . , and C111) included in the touch detection electrodes TDL. This is how the touch detection device 30A performs the touch detection for one detection block. The drive electrode block corresponds to the drive electrode E1 in the above-described basic principle of touch detection while the first group electrodes (the touch detection electrodes C101, C103, . . . , and C111) included in the touch detection electrodes TDL correspond to the touch detection electrode E2. The touch detection device 30A detects the touch in accordance with the basic principle in the low resolution touch detection mode. As illustrated in FIG. 11, the electrode patterns intersecting with one another form capacitive touch sensors in a matrix. The touch detection device 30A thus can also detect the position where the external proximate object is in contact with or in proximate of the touch detection device by scanning the entire touch detection surface of the touch detection device 30A.

The high resolution touch detection mode and the low resolution touch detection mode can be switched by the touch detection unit 42C under the control of the controller 11 when the controller 11 receives a switching control signal from an application processor (host CPU) of an electronic apparatus that receives an instruction input from a user.

Arrangement of Touch Detection Electrodes

The small electrode portions have the same internal structure as the first embodiment (refer to FIG. 23) or the modification of the first embodiment (refer to FIG. 24).

The high resolution touch detection mode corresponds to a specific example of the "first mode" in the present disclosure. The low resolution touch detection mode corresponds to a specific example of the "second mode" in the present disclosure.

The display apparatus 1C with the touch detection function according to the embodiment has the following effects in addition to the same effects as the display apparatus 1 with the touch detection function according to the basic example. In the high resolution touch detection mode, the display apparatus 1C with the touch detection function according to the embodiment performs the touch detection on the basis of the mutual capacitance between the drive electrode COML and the first group electrodes and the second group electrodes. As a result, the display apparatus 1C with the touch detection function can perform the high resolution touch detection. For example, the high resolution touch detection is effective for the detection of a touch by a pen having a thin tip. In the low resolution touch detection mode, the display apparatus 1C with the touch detection function performs the touch detection on the basis of the mutual capacitance between the drive electrode COML and the first group electrodes. In the detection, the second group electrodes are in an electrically floating state. A fringing field between the drive electrode COML and the first group electrodes thus readily passes through the portion occupied by the second group electrodes and reaches till over the touch surface. The low resolution touch detection is effective for what is called hovering input in which a pen tip or a finger is located above a touch surface without coming into contact with the touch surface. The display apparatus 1C with the touch detection function can increase a freedom in touch input operation by switching the high resolution touch detection mode capable of detecting the touch with high resolution and the low resolution touch detection mode effective for what is called hovering input.

The first to the third embodiments are in common in that the multiple small electrode portions are grouped into two groups and the respective groups are used in different ways. The first to the third embodiments, thus, can be combined. In such a combination, one group of the electrodes, which is a part of the small electrode portions, can correspond to the second group electrodes in the first embodiment, the first group electrodes or the second group electrodes in the second embodiment, or the first group electrodes in the third embodiment. One group of the electrodes, which is a part of the small electrode portions, can be used consistently as the touch detection electrodes. The other group of the electrodes, which is the other part of the small electrode portions, can correspond to the first group electrodes in the first embodiment, the first group electrodes or the second group electrodes in the second embodiment, or the second group electrodes in the third embodiment. The other group of the electrodes, which is the other part of the small electrode portions, can be used as the touch detection electrodes, the drive electrodes, or the floating electrodes.

5. Application Examples (Electronic Apparatuses)

With reference to FIGS. 40 to 52, a description will be made below of application examples of the display apparatus with the touch detection function described in the present embodiments and the modifications thereof. FIGS. 40 to 52 are diagrams each illustrating an example of an electronic apparatus to which the display apparatus with the touch detection function or the display apparatus according to any of the above-mentioned embodiments is applied. The display apparatus with the touch detection function or the display apparatus according to any of the above-mentioned embodiments and the modifications thereof can be applied to electronic apparatuses in all fields, such as television devices, digital cameras, laptop computers, portable electronic apparatuses including mobile phones, and video cameras. In other words, the display apparatus with the touch detection function or the display apparatus according to any of the above-described embodiments and the modifications thereof can be applied to electronic apparatuses in all fields that display externally received video signals or internally generated video signals as images or video pictures.

Application Example 1

Figure 40:
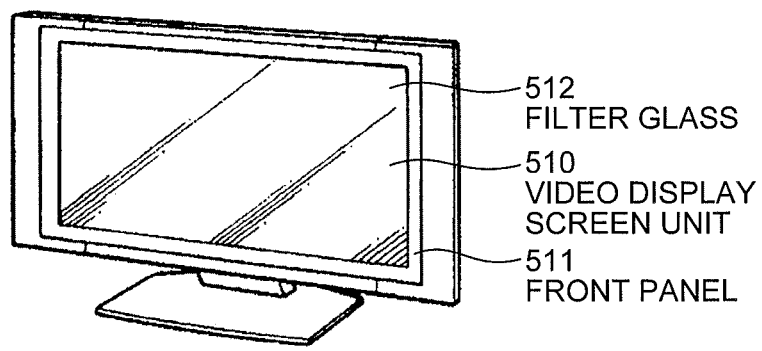
FIG. 40 is a diagram illustrating an example of an electronic apparatus to which the display apparatus with the touch detection function or the display apparatus according to any of the above-mentioned embodiments is applied.

The electronic apparatus illustrated in FIG. 40 is a television device to which the display apparatus with the touch detection function or the display apparatus according to any of the present embodiments and the modifications thereof is applied. This television device includes, for example, a video display screen unit 510 that includes a front panel 511 and a filter glass 512. The video display screen unit 510 corresponds to the display apparatus with the touch detection function or the display apparatus according to any of the present embodiments and the modifications thereof.

Application Example 2

Figure 41:
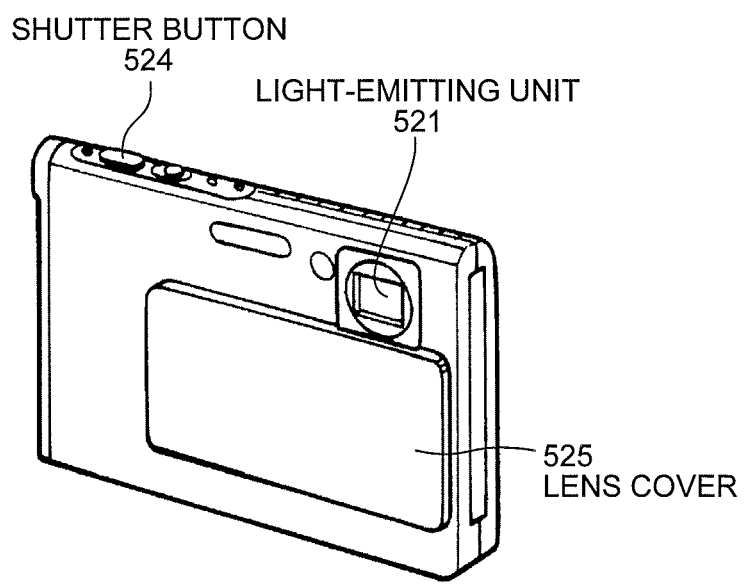
FIG. 41 is a diagram illustrating an example of an electronic apparatus to which the display apparatus with the touch detection function or the display apparatus according to any of the above-mentioned embodiments is applied.
Figure 42:
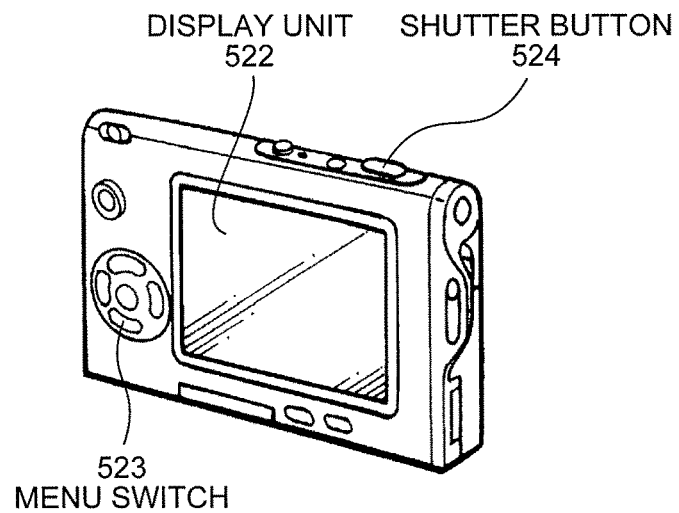
FIG. 42 is a diagram illustrating an example of an electronic apparatus to which the display apparatus with the touch detection function or the display apparatus according to any of the above-mentioned embodiments is applied.

The electronic apparatus illustrated in FIGS. 41 and 42 is a digital camera to which the display apparatus with the touch detection function or the display apparatus according to any of the present embodiments and the modifications thereof is applied. The digital camera includes, for example, a light-emitting unit 521 for flash, a display unit 522, a menu switch 523, and a shutter button 524. The display unit 522 corresponds to the display apparatus 1 with the touch detection function or the display apparatus according to any of the present embodiments and the modifications thereof. As illustrated in FIG. 41, the digital camera has a lens cover 525, which allows an imaging lens to appear by being slid. The digital camera can take a digital photograph by capturing light entering from the imaging lens.

Application Example 3

Figure 43:
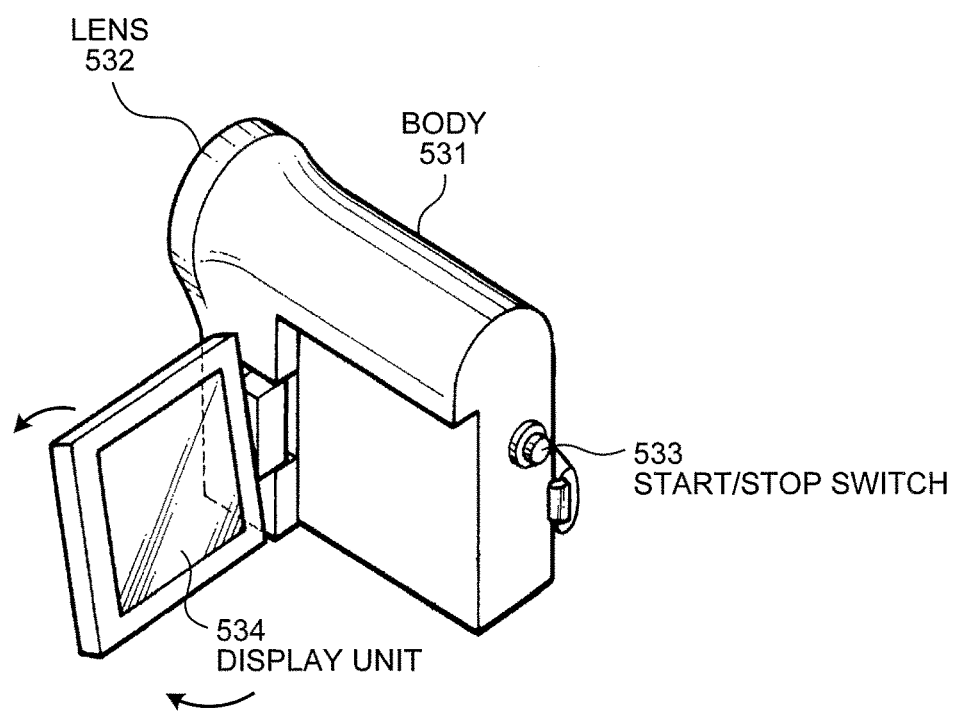
FIG. 43 is a diagram illustrating an example of an electronic apparatus to which the display apparatus with the touch detection function or the display apparatus according to any of the above-mentioned embodiments is applied.

The electronic apparatus illustrated in FIG. 43 represents an external appearance of a video camera to which the display apparatus with the touch detection function or the display apparatus according to any of the present embodiments and the modifications thereof is applied. The video camera includes, for example, a body 531, a lens 532 for photographing a subject provided on the front side face of the body 531, and a start/stop switch 533 for photographing, and a display unit 534. The display unit 534 corresponds to the display apparatus with the touch detection function or the display apparatus according to any of the present embodiments and the modifications thereof.

Application Example 4

Figure 44:
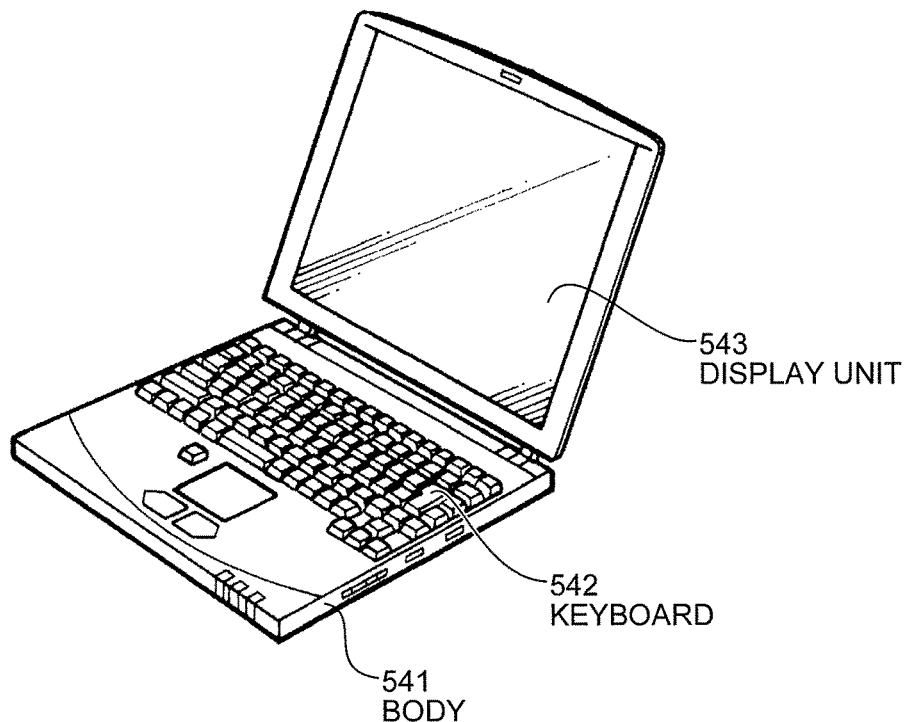
FIG. 44 is a diagram illustrating an example of an electronic apparatus to which the display apparatus with the touch detection function or the display apparatus according to any of the above-mentioned embodiments is applied.
Figure 45:
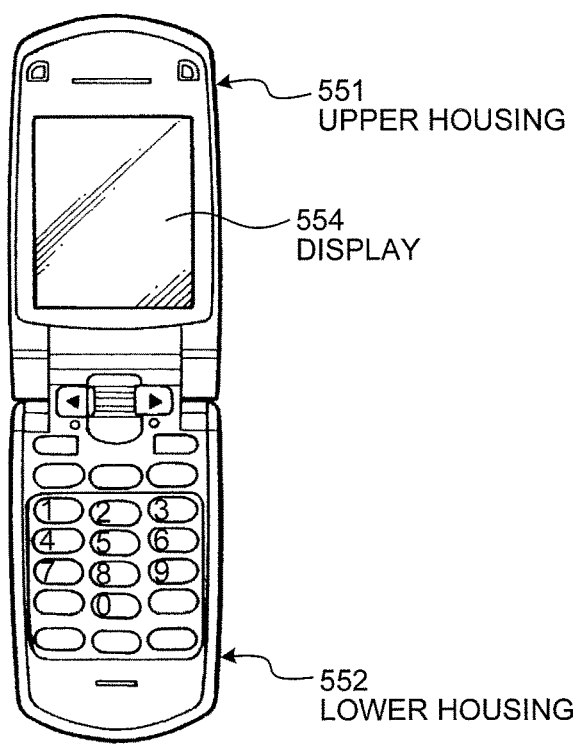
FIG. 45 is a diagram illustrating an example of an electronic apparatus to which the display apparatus with the touch detection function or the display apparatus according to any of the above-mentioned embodiments is applied.
Figure 46:
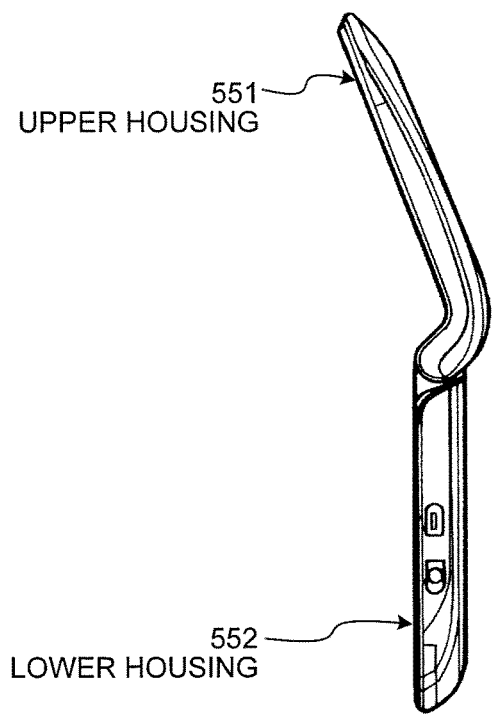
FIG. 46 is a diagram illustrating an example of an electronic apparatus to which the display apparatus with the touch detection function or the display apparatus according to any of the above-mentioned embodiments is applied.
Figure 47:
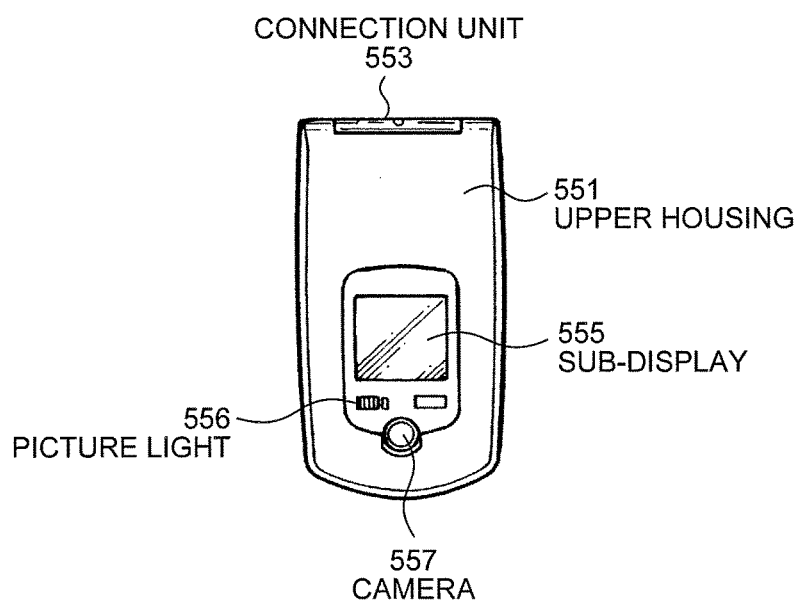
FIG. 47 is a diagram illustrating an example of an electronic apparatus to which the display apparatus with the touch detection function or the display apparatus according to any of the above-mentioned embodiments is applied.
Figure 48:
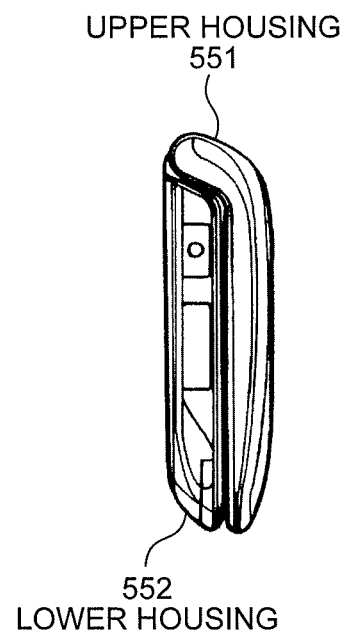
FIG. 48 is a diagram illustrating an example of an electronic apparatus to which the display apparatus with the touch detection function or the display apparatus according to any of the above-mentioned embodiments is applied.
Figure 49:
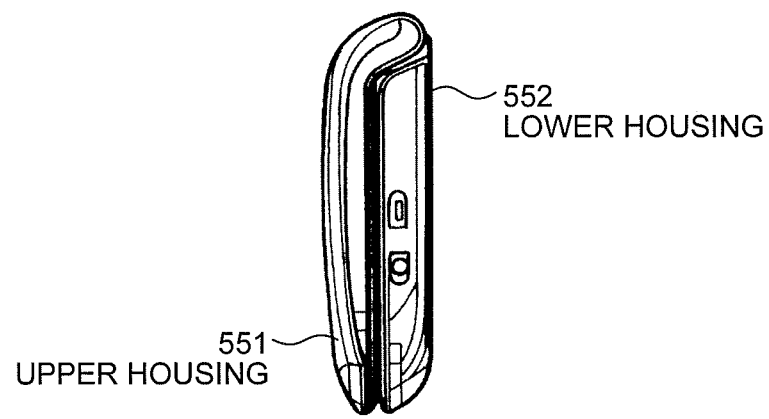
FIG. 49 is a diagram illustrating an example of an electronic apparatus to which the display apparatus with the touch detection function or the display apparatus according to any of the above-mentioned embodiments is applied.
Figure 50:
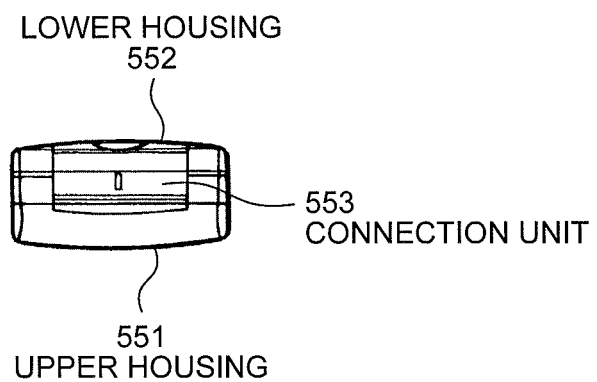
FIG. 50 is a diagram illustrating an example of an electronic apparatus to which the display apparatus with the touch detection function or the display apparatus according to any of the above-mentioned embodiments is applied.
Figure 51:
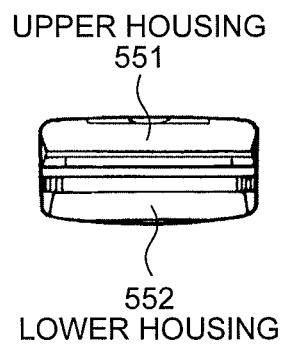
FIG. 51 is a diagram illustrating an example of an electronic apparatus to which the display apparatus with the touch detection function or the display apparatus according to any of the above-mentioned embodiments is applied.

The electronic apparatus illustrated in FIG. 44 is a laptop computer to which the display apparatus with the touch detection function or the display apparatus according to any of the present embodiments and the modifications thereof is applied. The laptop computer includes, for example, a body 541, a keyboard 542 for input operation of characters, for example, and a display unit 543 that displays images. The display unit 543 corresponds to the display apparatus with the touch detection function or the display apparatus according to any of the present embodiments and the modifications thereof.

Application Example 5

The electronic apparatus illustrated in FIGS. 45 to 51 is a mobile phone to which the display apparatus with the touch detection function or the display apparatus according to any of the present embodiments and the modifications thereof is applied. The mobile phone is, for example, composed of an upper housing 551 and a lower housing 552 connected to each other by a connection unit (hinge unit) 553, and includes a display 554, a subdisplay 555, a picture light 556, and a camera 557. The display 554 and/or the subdisplay 555 correspond(s) to the display apparatus with the touch detection function or the display apparatus according to any of the present embodiments and the modifications thereof.

Application Example 6

Figure 52:
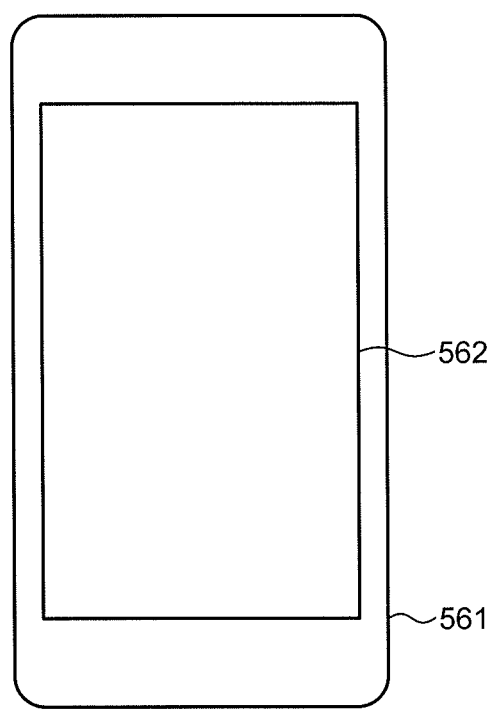
FIG. 52 is a diagram illustrating an example of an electronic apparatus to which the display apparatus with the touch detection function or the display apparatus according to any of the above-mentioned embodiments is applied.

The electronic apparatus illustrated in FIG. 52 is a portable information terminal that operates as a portable computer, a multifunctional mobile phone, a portable computer with voice call capability, or a portable computer with communication capability, and that is sometimes called a smartphone or a tablet. The portable information terminal includes, for example, a display unit 562 on a surface of a housing 561. The display unit 562 corresponds to the display apparatus with the touch detection function or the display apparatus according to any of the present embodiments and the modifications thereof.

The present disclosure can employ the following configurations.

(1) A display apparatus with a touch detection function includes a substrate, a display area having a plurality of pixels arranged in a plane parallel to a principal surface of the substrate, a plurality of small electrode portions arranged in a plane parallel to the principal surface of the substrate, and a plurality of drive electrodes that form capacitance between the drive electrodes and the small electrode portions. One group of the electrodes that are a part of the small electrode portions are used as touch detection electrodes. The other group of the electrodes that are the other part of the small electrode portions are used as touch detection electrodes, second drive electrodes, or floating electrodes.

An electronic apparatus of the present disclosure includes any one of the above-described display apparatuses with the touch detection function. Examples of the electronic apparatus of the present disclosure include, but are not limited to, a television device, a digital camera, a personal computer, a video camera, and a portable electronic apparatus such as a mobile phone.

Aspects of Present Disclosure (1) A display apparatus with a touch detection function including:
a substrate;
a display area that includes a plurality of pixels arranged in a plane parallel to a principal surface of the substrate;
a touch detection electrode that includes a plurality of small electrode portions arranged in a plane parallel to the principal surface of the substrate;
a plurality of wiring portions that electrically couple the small electrode portions to a terminal portion formed outside the display area; and
a plurality of drive electrodes that form capacitance between the drive electrodes and the touch detection electrode, wherein
the small electrode portions each include at least one conductive thin wire in which at least one first thin wire segment and at least one second thin wire segment are coupled in a first direction, the first thin wire segment making a first angle with respect to the first direction, the second thin wire segment making a second angle with respect to the first direction, and
the wiring portions each include the at least one first thin wire segment and the at least one second thin wire segment that are coupled in the first direction.

(2) The display apparatus with the touch detection function according to (1), wherein
the small electrode portions each include two or more of the conductive thin wires, and
the conductive thin wires are arranged with a certain space between the conductive thin wires in a second direction intersecting the first direction.

(3) The display apparatus with the touch detection function according to (1), wherein
the small electrode portions are arranged in a matrix, and
the wiring portions are each disposed such that the wiring portion is apart, with the certain space, from the conductive thin wire included in the small electrode portion located in the first direction side of the small electrode portion to which the wiring portion is coupled.

(4) The display apparatus with the touch detection function according to (1), wherein shapes of the first thin wire segment and the second thin wire segment are symmetric with respect to a symmetric axis in the first direction.

(5) The display apparatus with the touch detection function according to (1), further including:
a drive signal driver that supplies a drive signal to first group electrodes that are a part of the small electrode portions in a period in which an image is displayed in the display area; and
a touch detection unit that detects contact or proximity of an object on the basis of a signal appearing on second group electrodes via mutual capacitance between the first group electrodes and the second group electrodes, the second group electrodes being another part of the small electrode portions, in the period in which an image is displayed in the display area.

(6) The display apparatus with the touch detection function according to (1), further including:
an X detection unit that supplies charges to first group electrodes and thereafter detects an X coordinate of a position where an object is in contact with or in proximity of the display apparatus on the basis of charges charged in the first group electrodes, the first group electrodes being a part of the small electrode portions, in a period in which an image is displayed in the display area; and a Y detection unit that supplies charges to second group electrodes and thereafter detects a Y coordinate of a position where an object is in contact with or in proximity of the display apparatus on the basis of charges charged in the second group electrodes, the second group electrodes being another part of the small electrode portions, in a period in which an image is displayed in the display area.

(7) The display apparatus with the touch detection function according to (1), further including:

a drive electrode driver that supplies a drive signal to the drive electrodes in both a first mode and a second mode, the display apparatus detecting contact or proximity of an object in the first and the second modes using different detection characteristics in a period in which no image is displayed in the display area;

a first touch detection signal amplifier that detects contact or proximity of an object on the basis of a signal appearing on first group electrodes via mutual capacitance between the drive electrodes and the first group electrodes, the first group electrodes being a part of the small electrode portions, in both the first and the second modes; and a second touch detection signal amplifier that detects contact or proximity of an object on the basis of a signal appearing on second group electrodes via mutual capacitance between the drive electrodes and the second group electrodes, the second group electrodes being another part of the small electrode portions, in the second mode.

(8) The display apparatus with the touch detection function according to (7), wherein the second group electrodes are in an electrically floating state in the second mode.

(9) An electronic apparatus including:

a display apparatus with a touch detection function that includes:

a substrate;

a display area that includes a plurality of pixels arranged in a plane parallel to a principal surface of the substrate;

a touch detection electrode that includes a plurality of small electrode portions arranged in a plane parallel to the principal surface of the substrate;

a plurality of wiring portions that electrically couple the small electrode portions to a terminal portion formed outside the display area; and a plurality of drive electrodes that form capacitance between the drive electrodes and the touch detection electrode, wherein the small electrode portions each include at least one conductive thin wire in which at least one first thin wire segment and at least one second thin wire segment are coupled in a first direction, the first thin wire segment making a first angle with respect to the first direction, the second thin wire segment making a second angle with respect to the first direction, and the wiring portions each include the at least one first thin wire segment and the at least one second thin wire segment that are coupled in the first direction.

What is claimed is:

1. A display apparatus comprising:
a substrate;
a display area that includes a plurality of pixels arranged in a plane parallel to a principal surface of the substrate;
a detection electrode that includes a plurality of first detection electrodes and a plurality of second detection electrodes each of which is a part of a plurality of small electrode portions arranged in a plane parallel to the principal surface of the substrate, the small electrode portions each including a plurality of conductive thin wires, wherein each of the conductive thin wires includes a first thin wire segment and a second thin wire segment that are coupled in a first direction, the first thin wire segment makes a first angle with respect to the first direction, and the second thin wire segment makes a second angle with respect to the first direction;

a plurality of wiring portions that electrically couple to the small electrode portions, each of the wiring portions including the first thin wire segment and the second thin wire segment that are coupled in the first direction;

a plurality of drive electrodes configured to form capacitance between the drive electrodes and the detection electrode;

a drive electrode driver configured to supply a drive signal to the drive electrodes in both a first mode and a second mode that is different from the first mode;

a first detection signal amplifier configured to receive a first signal from the first detection electrodes in both the first mode and the second mode; and a second detection signal amplifier configured to receive a second signal from the second detection electrodes in the second mode, and not to receive the second signal from the second detection electrodes in the first mode.

2. The display apparatus according to claim 1, further comprising:
a plurality of switches arranged between the second detection electrodes and the second detection signal amplifier,
wherein the switches are configured to electrically couple the second detection- electrodes to the second detection signal amplifier.

3. The display apparatus according to claim 2, wherein the plurality of switches are configured not to electrically couple the second detection electrodes to the second detection signal amplifier in the first mode.

4. The display apparatus according to claim 1, wherein the second detection electrodes are in an electrically floating state in the first mode.

5. The display apparatus according to claim 1, wherein the plurality of wiring portions include a plurality of first wiring portions and a plurality of second wiring portions,
each of the first detection electrodes is electrically coupled to each of the first wiring portions, and
each of the small electrode portions included in each of the second detection electrodes is electrically coupled to corresponding one of the second wiring portions.

6. The display apparatus according to claim 1, wherein each of the second detection electrodes and the first detection electrodes has the small electrode portions aligned in the first direction,
the small electrode portions have a rectangular shape including a first side and a second side that extend in the first direction,
in each of the second detection electrodes, each of the wiring portions is connected to a corresponding one of the small electrode portions in such a manner that the wiring portions are connected to the small electrode portions alternately at the first side and the second side of the small electrode portions.

7. The display apparatus according to claim 1, wherein
the small electrode portions are arranged in a matrix in the plane parallel to the principal surface of the substrate.

8. The display apparatus according to claim 1, wherein
each of the pixels corresponds to one of a plurality of colors,
the pixels adjacent to each other in the first direction correspond to a same color,
the pixels adjacent to each other in a second direction crossing the first direction correspond to different colors.

9. The display apparatus according to claim 8, wherein
the conductive thin wires include a first conductive thin wire and a second conductive thin wire adjacent to the first conductive thin wire in the second direction,
the plurality of pixels include a first pixel and a second pixel that correspond to a same color and that are adjacent to each other in the second direction,
an overlapped position of the first direction in which the first conductive wire overlaps the first pixel is different from an overlapped position of the first direction in which the second conductive wire overlaps the second pixel.

10. The display apparatus according to claim 8, wherein
the conductive thin wires include a first conductive thin wire and a second conductive thin wire adjacent to the first conductive thin wire in the second direction,
the plurality of pixels include a first pixel and a second pixel that correspond to a same color and that are adjacent to each other in the second direction,
an area in which the first pixel is overlapped by the first conductive thin wire is different from an area in which that the second pixel is overlapped by the second conductive thin wire.

11. The display apparatus according to claim 1, wherein
the first mode and the second mode are in a detection period in which no image is displayed in the display area.

12. The display apparatus according to claim 1, further comprising:
a dummy electrode portion extending in a first direction and being disposed between the small electrode portions that are adjacent in a second direction intersecting the first direction,
wherein the dummy electrode portion includes a plurality of dummy electrodes comprising thin wire fragments disposed separately from each other.

13. A display apparatus comprising:
a substrate;
a display area that includes a plurality of pixels arranged in a plane parallel to a principal surface of the substrate;
a detection electrode that includes a plurality of first detection electrodes and a plurality of second detection electrodes each of which is a part of a plurality of small electrode portions arranged in a plane parallel to the principal surface of the substrate;
a plurality of wiring portions that electrically couple the small electrode portions to a terminal portion formed outside the display area;
a first detection signal amplifier configured to receive a first signal from the first detection electrodes in both a first mode and a second mode;
a second detection signal amplifier configured to receive a second signal from the second detection electrodes in the second mode; and
a plurality of switches arranged between the second detection of electrodes and the second detection signal amplifier, the switches being configured to electrically couple the second detection of electrodes to the second detection signal amplifier, wherein
each of the second detection electrodes and the first detection electrodes has the small electrode portions aligned in a first direction,
the small electrode portions have a rectangular shape including a first side and a second side that are extending in the first direction, and
in each of the second detection electrodes, each of the wiring portions is connected to corresponding one of the small electrode portions in such a manner that the wiring portions are connected to the small electrode portions alternately at the first side and the second side of the small electrode portions.

14. The display apparatus according to claim 13, wherein
the plurality of switches are configured not to electrically couple the second detection electrodes to the second detection signal amplifier in the first mode.

15. The display apparatus according to claim 13, wherein
the plurality of wiring portions include a plurality of first wiring portions and a plurality of second wiring portions,
each of the first detection electrodes is electrically coupled to each of the first wiring portions, and
each of the small electrode portions included in each of the second detection electrodes is electrically coupled to corresponding one of the second wiring portions.

16. The display apparatus according to claim 13, wherein
each of the pixels corresponds to one of a plurality of colors,
the pixels adjacent to each other in the first direction correspond to a same color,
the pixels adjacent to each other in a second direction crossing the first direction correspond to different colors.

17. The display apparatus according to claim 16, wherein
each of the small electrode portions includes a plurality of conductive thin wires,
the conductive thin wires include a first conductive thin wire and a second conductive thin wire adjacent to the first conductive thin wire in the second direction,
the plurality of pixels include a first pixel and a second pixel that correspond to a same color and that are adjacent to each other in the second direction,
an overlapped position of the first direction in which the first conductive wire overlaps the first pixel is different from an overlapped position of the first direction in which the second conductive wire overlaps the second pixel.

18. The display apparatus according to claim 16, wherein
each of the small electrode portions includes a plurality of conductive thin wires,
the conductive thin wires include a first conductive thin wire and a second conductive thin wire adjacent to the first conductive thin wire in the second direction,
the plurality of pixels include a first pixel and a second pixel that correspond to a same color and that are adjacent to each other in the second direction,
an area in which the first pixel is overlapped by the first conductive thin wire is different from an area in which that the second pixel is overlapped by the second conductive thin wire.

19. The display apparatus according to claim 13, further comprising:
  a dummy electrode portion extending in a first direction and being disposed between the small electrode portions that are adjacent in a second direction intersecting the first direction,
  wherein the dummy electrode portion includes a plurality of dummy electrodes comprising thin wire fragments disposed separately from each other.

* * * * *

UNITED STATES PATENT AND TRADEMARK OFFICE
CERTIFICATE OF CORRECTION

PATENT NO. : 10,185,426 B2
APPLICATION NO. : 15/631710
DATED : January 22, 2019
INVENTOR(S) : Hayato Kurasawa et al.

Page 1 of 1

It is certified that error appears in the above-identified patent and that said Letters Patent is hereby corrected as shown below:

Foreign Patent Documents:
Please replace "JP 20069-244958," with --JP 2009-244958--

Signed and Sealed this
Twenty-sixth Day of March, 2019

Andrei Iancu
*Director of the United States Patent and Trademark Office*